United States Patent [19]

Ishimoto et al.

[11] Patent Number: 5,675,696
[45] Date of Patent: Oct. 7, 1997

[54] DIGITAL VIDEO SIGNAL RECORDING AND REPRODUCING APPARATUS

[75] Inventors: Junko Ishimoto; Haruhisa Inoue; Makoto Kumano; Sadayuki Inoue, all of Nagaokakyo, Japan

[73] Assignee: Mitsubishi Denki Kabsuhiki Kaisha, Tokyo, Japan

[21] Appl. No.: 546,841

[22] Filed: Oct. 23, 1995

Related U.S. Application Data

[63] Continuation of Ser. No. 91,840, Jul. 13, 1993, abandoned.

[30] Foreign Application Priority Data

Jul. 14, 1992 [JP] Japan ................................ 4-186840
Jul. 15, 1992 [JP] Japan ................................ 4-188058

[51] Int. Cl.$^6$ ........................ H04N 5/926; H04N 5/92
[52] U.S. Cl. ........................ 386/112; 386/122; 386/124
[58] Field of Search ...................... 358/335, 310, 358/342; 360/32, 8, 48, 33.1, 35.1; 348/704, 705; 386/109, 111–112, 122, 124, 27, 33, 34, 36, 40; H04N 5/76, 9/79, 5/92

[56] References Cited

U.S. PATENT DOCUMENTS

| | | | |
|---|---|---|---|
| 4,949,179 | 8/1990 | Hosono | 348/705 |
| 5,136,391 | 8/1992 | Minami | 358/310 |
| 5,168,363 | 12/1992 | Kojima et al. | 348/704 |
| 5,175,631 | 12/1992 | Juri et al. | 358/335 |
| 5,179,449 | 1/1993 | Doi | 358/311 |
| 5,236,424 | 8/1993 | Nishino et al. | 358/310 |

FOREIGN PATENT DOCUMENTS

| | | | |
|---|---|---|---|
| 2219385 | 8/1990 | Japan | H04N 5/92 |
| 486183 | 3/1992 | Japan | H04N 5/92 |

*Primary Examiner*—Thai Tran

[57] ABSTRACT

A digital video signal recording and reproducing apparatus which obtains a favorable reproduced picture even when the data overwritten by edited data is interpolated with the data of the preceding field or preceding frame by recording the video data of the visually inconspicuous peripheral area on a track that is possibly overwritten by the editing data at a cut-in point or cut-out point in assemble editing or insert editing. The apparatus further obtains a natural picture without any fixed error even in speed search mode by exchanging the recording order of the video data of one field on plural tracks according to the head scanning trace in the speed search.

45 Claims, 66 Drawing Sheets

TIME

▨  MACRO BLOCK DATA OF PREVIOUS FIELD

Fig. 14
Prior Art
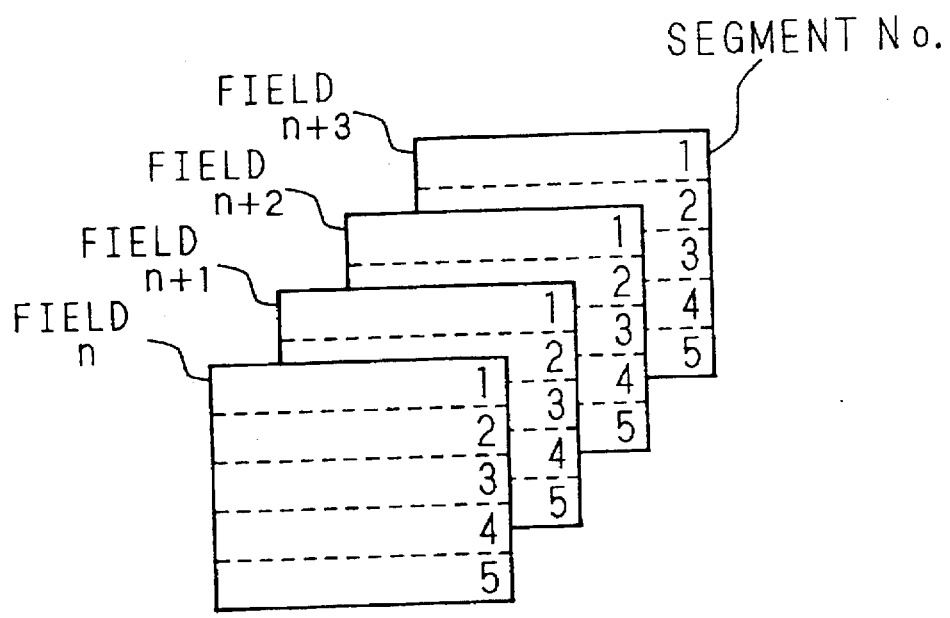
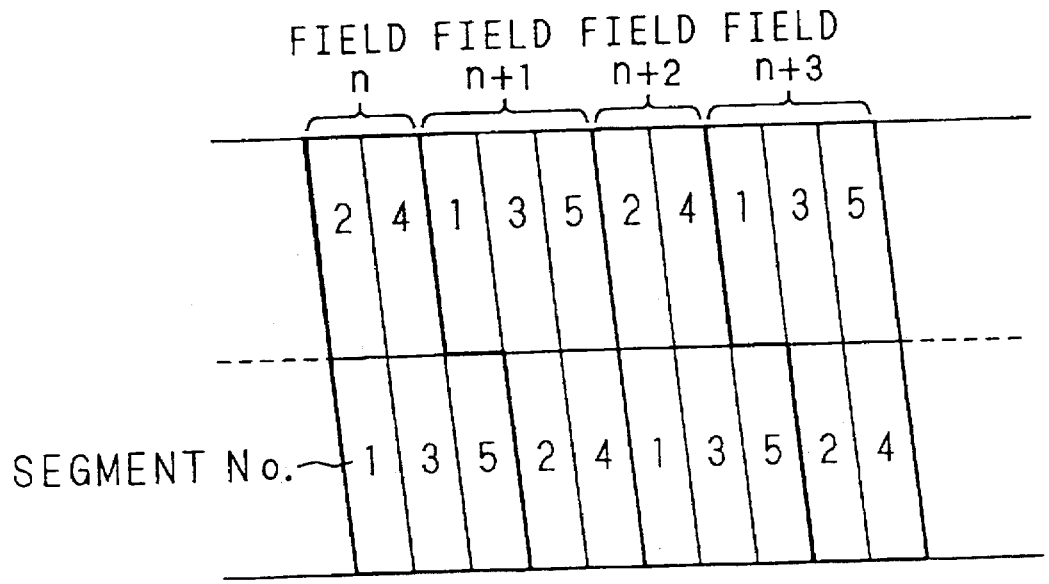

CORRESPONDING RECORDING POSITION ON TAPE
TO FIELD PORTION

Fig. 21
Prior Art

| PATTERN | 1 | | 2 | | 3 | | 4 | |
|---|---|---|---|---|---|---|---|---|
| FIELD PORTION | LEFT | RIGHT | LEFT | RIGHT | LEFT | RIGHT | LEFT | RIGHT |
| 1 | 2 | 0 | x | 2 | 5 | x | 7 | 7 |
| 2 | 0 | 0 | 3 | 3 | 5 | 5 | x | x |
| 3 | 0 | 0 | x | x | 3 | 5 | 6 | 6 |
| 4 | 1 | 0 | 3 | 3 | x | x | 6 | 6 |
| 5 | x | x | 1 | 1 | 4 | 4 | 6 | 6 |

SEGMENT No.

Fig. 22
Prior Art

| PATTERN | 1 | | 2 | | 3 | | 4 | |
|---|---|---|---|---|---|---|---|---|
| REFERENCE FIELD | 0 | | 2 | | 4 | | 6 | |
| FIELD PORTION / SEGMENT No. | LEFT | RIGHT | LEFT | RIGHT | LEFT | RIGHT | LEFT | RIGHT |
| 1 | +2 | 0 | × | 0 | +1 | +1 | +1 | +1 |
| 2 | 0 | 0 | +1 | +1 | +1 | +1 | × | × |
| 3 | 0 | 0 | × | × | −1 | × | 0 | 0 |
| 4 | +1 | 0 | +1 | +1 | × | 0 | 0 | 0 |
| 5 | × | × | −1 | −1 | 0 | 0 | 0 | 0 |

Fig. 50
CONVENTIONAL
 RECORDING FORMAT
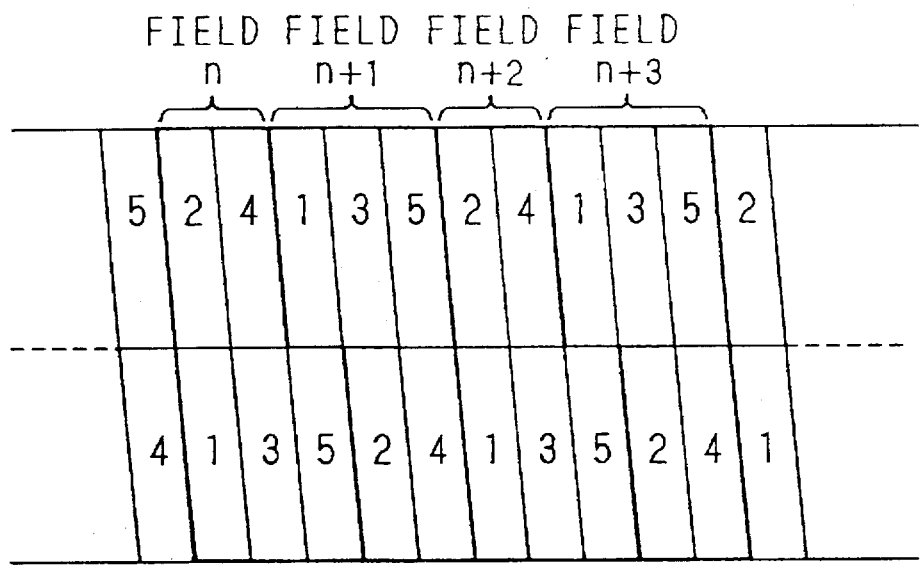
RECORDING FORMAT OF
 THIS INVENTION
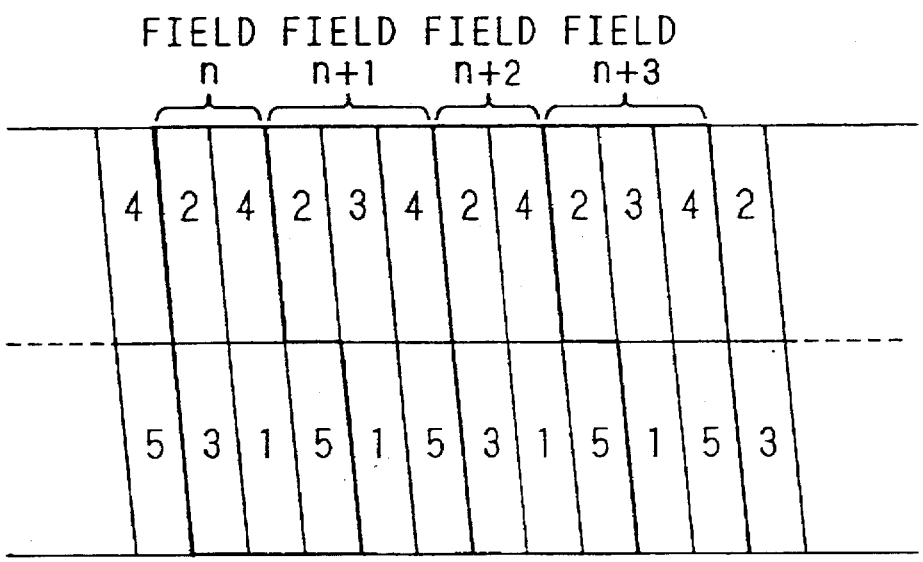

Fig. 53(a)

(PATTERN 1)

| FIELD | | EVEN | | | | | ODD | | | | |
|---|---|---|---|---|---|---|---|---|---|---|---|
| SEGMENT CHARACTER | | A | B | C | D | E | A | B | C | D | E |
| SCANNING CONDITIONS | WHOLE | ○ | ○ | ○ | ○ | | | | | | |
| | UPPER | | | | | | | | | | |
| | LOWER | ○ | | | | | | | | ○ | |
| SEGMENT NO. | | 1 | 2 | 3 | 4 | 5 | 1 2 3 4 5 | 1 2 3 4 5 | 1 2 3 4 5 | X X X X X | 1 2 3 4 5 |

Fig. 53(b)

(PATTERN 2)

| FIELD | | EVEN | | | | | ODD | | | | |
|---|---|---|---|---|---|---|---|---|---|---|---|
| SEGMENT CHARACTER | | A | B | C | D | E | A | B | C | D | E |
| SCANNING CONDITIONS | WHOLE | | ○ | | | | ○ | | ○ | ○ | ○ |
| | UPPER | ○ | | | | | | | | ○ | |
| | LOWER | | | | | | | | | | |
| SEGMENT NO. | | 1 | 2 | 3 | 4 | 5 | 1 2 3 4 5 | X X 3 4 5 | 1 2 3 4 5 | X X 3 4 5 | X X 3 4 5 |

Fig. 53(c)

(PATTERN 3)

| FIELD | | EVEN | | | | | ODD | | | | |
|---|---|---|---|---|---|---|---|---|---|---|---|
| SEGMENT CHARACTER | | A | B | C | D | E | A | B | C | D | E |
| SCANNING CONDITIONS | WHOLE | | | | | ○ | ○ | ○ | | | ○ |
| | UPPER | | | | | | | | | | |
| | LOWER | | | | | | ○ | | ○ | | |
| SEGMENT NO. | | 1 | 2 | 3 | 4 | 5 | 1 2 3 4 5̸ | 1 2 3 4 5̸ | 1 2 3 4 5̸ | 1 2 3 4 5 | 1 2 3 4 5̸ |

Fig. 53(d)

(PATTERN 4)

| FIELD | | EVEN | | | | | ODD | | | | |
|---|---|---|---|---|---|---|---|---|---|---|---|
| SEGMENT CHARACTER | | A | B | C | D | E | A | B | C | D | E |
| SCANNING CONDITIONS | WHOLE | | | ○ | ○ | ○ | ○ | | | | |
| | UPPER | | | | | | ○ | | ○ | | |
| | LOWER | | | | | | | | | | |
| SEGMENT NO. | | 1 | 2 | 3 | 4 | 5 | 1 2 3̸ 4̸ 5̸ | 1 2 3 4 5 | 1 2 3̸ 4̸ 5̸ | 1 2 3 4 5 | 1 2 3 4 5 |

Fig. 54

| FIELD | ODD | | | | |
|---|---|---|---|---|---|
| SEGMENT CHARACTER | A | B | C | D | E |
| SEGMENT NO. | 1 | ✗ | 1 | ✗ | ✗ |
| | 2 | ✗ | 2 | ✗ | ✗ |
| | ✗ | 3 | ✗ | ✗ | 3 |
| | ✗ | 4 | ✗ | ✗ | 4 |
| | ✗ | ✗ | ✗ | 5 | ✗ |

Fig. 56

| PATTERN | 1 | | 2 | | 3 | | 4 | |
|---|---|---|---|---|---|---|---|---|
| FIELD PORTION | LEFT | RIGHT | LEFT | RIGHT | LEFT | RIGHT | LEFT | RIGHT |
| SEGMENT No. 1 | 0 | 0 | 3 | 3 | 5 | 5 | 6 | 6 |
| 2 | 0 | 0 | 2 | 2 | x | 5 | 7 | 7 |
| 3 | 2 | 0 | x | 2 | 5 | 3 | x | 5 |
| 4 | 0 | 0 | 1 | 1 | 3 | 3 | 6 | 6 |
| 5 | 1 | x | 3 | 3 | 4 | 4 | 6 | 6 |

Fig. 58(a)

| PATTERN | 1 | | | | 2 | | | | 3 | | | | 4 | | | |
|---|---|---|---|---|---|---|---|---|---|---|---|---|---|---|---|---|
| FIELD PORTION | LEFT | | RIGHT | | LEFT | | RIGHT | | LEFT | | RIGHT | | LEFT | | RIGHT | |
| REPRODUCTION ORDER \ SEGMENT No. | 1ST | 2ND | 1ST | 2ND | 1ST | 2ND | 1ST | 2ND | 1ST | 2ND | 1ST | 2ND | 1ST | 2ND | 1ST | 2ND |
| 1 | 0 | | 0 | | 3 | | 3 | | 5 | | 5 | | 6 | | 6 | |
| 2 | 0 | 2 | 0 | | 2 | | 2 | | | 5 | 5 | | 5 | 7 | 7 | |
| 3 | 0 | | 0 | | | | 2 | | 3 | 5 | 3 | | | | 5 | |
| 4 | 0 | | 0 | | 1 | | 1 | | 3 | | 3 | | 6 | | 6 | |
| 5 | 1 | | | | 3 | | 1 | 3 | 4 | | 4 | | 6 | | 6 | |

Fig. 58(b)

| PATTERN | | 1 | | 2 | | 3 | | 4 | |
|---|---|---|---|---|---|---|---|---|---|
| FIELD PORTION | | LEFT | RIGHT | LEFT | RIGHT | LEFT | RIGHT | LEFT | RIGHT |
| SEGMENT No. | 1 | 0 | 0 | 3 | 3 | 5 | 5 | 6 | 6 |
| | 2 | 0 | 0 | 2 | 2 | x | 5 | 7 | 7 |
| | 3 | 2 | 0 | x | 2 | 5 | 3 | x | 5 |
| | 4 | 0 | 0 | 1 | 1 | 3 | 3 | 6 | 6 |
| | 5 | 1 | x | 3 | 3 | 4 | 4 | 6 | 6 |

Fig. 58(c)

| PATTERN | 1 | | 2 | | 3 | | 4 | |
|---|---|---|---|---|---|---|---|---|
| FIELD PORTION | LEFT | RIGHT | LEFT | RIGHT | LEFT | RIGHT | LEFT | RIGHT |
| SEGMENT No. | | | | | | | | |
| 1 | 0 | 0 | 3 | 3 | 5 | 5 | 6 | 6 |
| 2 | 0 | 0 | 2 | 2 | 2 | 5 | 7 | 7 |
| 3 | 0 | 0 | 2 | 2 | 3 | 3 | 5 | 5 |
| 4 | 0 | 0 | 1 | 1 | 3 | 3 | 6 | 6 |
| 5 | 1 | 6 | 3 | 3 | 4 | 4 | 6 | 6 |

Fig. 59

| PATTERN | 1 | | 2 | | 3 | | 4 | |
|---|---|---|---|---|---|---|---|---|
| REFERENCE FIELD | 0 | | 2 | | 4 | | 6 | |
| FIELD PORTION | LEFT | RIGHT | LEFT | RIGHT | LEFT | RIGHT | LEFT | RIGHT |
| SEGMENT No. 1 | 0 | 0 | +1 | +1 | +1 | +1 | 0 | 0 |
| 2 | 0 | 0 | 0 | 0 | -2 | +1 | +1 | +1 |
| 3 | 0 | 0 | 0 | 0 | -1 | -1 | -1 | -1 |
| 4 | 0 | 0 | -1 | -1 | -1 | -1 | 0 | 0 |
| 5 | +1 | -2 | +1 | +1 | 0 | 0 | 0 | 0 |

DIGITAL VIDEO SIGNAL RECORDING AND REPRODUCING APPARATUS

This application is a continuation of application Ser. No. 08/091,840 filed on Jul. 13, 1993, now abandoned.

BACKGROUND OF THE INVENTION

1. Field of the Invention

The present invention relates to an apparatus for recording and reproducing digital video signals by using rotary heads (hereinafter to be called digital VTR).

2. Description of the Related Art

Along with the recent trend of larger screen of household color television, is the demand for high quality in the recording and reproducing of video signals. Manufacturers are keenly competing in the development of household digital VTR capable of digitizing video signals and recording and reproducing by band compression (efficient coding), as the accumulation medium for recording and reproducing images of high picture quality while maintaining the high quality.

As an example of a conventional recording and reproducing system of household digital VTR, the recording and reproducing method of Philips disclosed in the IEEE Transactions on Consumer Electronics, Vol. 34, No. 3 (August, 1988), pp. 597-605, "An Experimental Digital VCR with 40 mm Drum, Single Actuator and DCT-based Bit-rate Reduction," is explained below.

FIG. 1 shows a block diagram of a recording system of a conventional household digital VTR. This system is supposed to be of two-channel recording type. In the diagram, reference symbols 1a to 1c designate input terminals, 2a to 2c designate A/D converters for converting analog data into digital data, 3 designates an efficient encoder for efficiently coding inputs, that is, luminance signal Y and color difference signals CB and CR, 4 designates an error correction encoder for providing a two-channel data outputted from the efficient encoder 3 with an error correction code (called to be a check hereinafter) for correcting or detecting an error occurring at the time of reproduction, 5a and 5b designate digital modulation circuits for digitally modulating data outputted from the error correction encoder 4, 6a and 6b designate synchronizing signal adding circuits for attaching synchronizing signal and ID signal, 7a and 7b designate amplifiers, 8a and 8b designate rotary heads, and 9 designates a magnetic tape.

FIG. 2 is a block diagram showing a reproducing system of the conventional household digital VTR. In the diagram, numerals 8 and 9 are same as explained in FIG. 1 and their explanations are hence omitted. Reference symbols 10a and 10b designate head amplifiers for amplifying the signals reproduced from the rotary heads 8a and 8b, 11a and 11b designate data detecting circuits for detecting data from reproduced signals and detecting and correcting the jitter of reproduced signals, 12a and 12b designate digital demodulation circuits, 13 designates an error correction decoder for correcting and detecting errors in reproduced signals, 14 designates an efficient decoder for efficiently decoding the output of the error correction decoder 13 and restoring the video signal, 15a to 15c designate D/A converters for converting digital signals into analog signals, and 16a to 16c are output terminals.

FIG. 3 shows a block diagram of the conventional efficient encoder 3 disclosed in the above-mentioned publication. In the diagram, 17a and 17b designate field memories for dividing the input signals into blocks of 8 pixels×8 lines (hereinafter to be called DCT blocks because discrete cosine transform is executed by the block). Reference numeral 28 designates a shuffling circuit for shuffling by the macro block after time divisionally multiplexing the data divided into DCT blocks in each signal unit by the field memories 17a and 17b, and composing macro blocks. The macro blocks are described in detail later. Numeral 18 designates a 8×8 DCT circuit for performing discrete cosine transform (DCT) on the data of each block outputted from the shuffling circuit 28. Numeral 19 designates an adaptive quantization circuit for quantizing the coefficients transformed in the 8×8 DCT circuit 18, 20 is a variable-length encoder for coding the output of the adaptive quantization circuit 20 in variable-length, 21 is a buffer memory for transforming the output of the variable-length encoder 20 into data of fixed rate, and 22 is a buffer controller for changing over the quantizing parameters of the adaptive quantization circuit 19 so that the buffer memory 21 does not overflow and selecting the components to be coded by the variable-length encoder 20. Thus, the efficient encoder 3 is composed of the field memory 17, shuffling circuit 28, 8×8 DCT circuit 18, adaptive quantization circuit 19, variable-length encoder 20, buffer memory 21, and buffer controller 22.

FIG. 4 is a block diagram of the conventional efficient decoder 14. In the diagram, numeral 23 designates a variable-length decoder for returning the data coded in variable-length back to the original data of fixed length, 24 designates a buffer memory for producing the output of the variable-length decoder 23 at fixed rate, 25 designates an inverse adaptive quantization circuit, 26 designates an inverse 8×8 DCT circuit for performing inverse discrete cosine transform (inverse DCT) on the data outputted from the inverse adaptive quantization circuit 25, 29 designates a de-shuffling circuit for deshuffling the reproduced digital signal outputted from the inverse 8×8 DCT circuit 26, and 27a and 27b designate field memories for delaying the deshurried reproduced digital signals by specified delay time, and decoding and producing the data formed in blocks at the time of recording. Thus, the efficient decoder 14 is composed of the variable-length decoder 23, buffer memory 24, inverse adaptive quantization circuit 25, inverse 8×8 DCT circuit 26, de-shuffling circuit 29, and field memory 27.

The operation of the recording system is explained below in reference to FIG. 1. The luminance signal Y and two color difference signals CR, CB inputted through the input terminals 1a to 1c are A/D converted in the A/D converters 2a to 2c, and the recording bit rate is curtailed in the efficient encoder 3. The operation of the efficient encoder 3 is specifically described later. To the data lowered in the recording bit rate in the efficient encoder 3 is added a check which is generated in the error correction encoder 4 in order to correct and detect an error occurring in reproduction. The output of error correction encoder 4 is modulated according to a specified modulation rule in the digital modulation circuits 5a and 5b, and the low frequency components of recording signals are suppressed (digital modulation). The digitally modulated recorded digital data is added with a synchronizing signal and an ID signal in the synchronizing signal adding circuits 6a and 6b, amplified in the amplifiers 7a and 7b, and recorded on the magnetic tape 9 through the rotary heads 8a and 8b.

Similarly, the operation of the reproducing system is explained referring to FIG. 2. The two-channel reproduced signals, reproduced from the magnetic tape 9 by the rotary heads 8a and 8b, are amplified in the head amplifiers 10a and 10b, and converted into digital data in the data detecting circuits 11a and 11b, while the jitter (time axis error) of the reproduced signal is absorbed. Consequently, the signals are digitally demodulated in the digital demodulation circuits 12a and 12b, converted into reproduced digital signals, and inputted by the error correction decoder 13. The error correction decoder 13 corrects or detects an error generated in the reproduced signal on the basis of the check preliminarily given at the time of recording. The reproduced signal, undergoing error correction or detection in the error correction decoder 13, is fed into the efficient decoder 14 to be treated by variable-length decoding and inverse DCT, and are restored into the original luminance signal Y and two color difference signals CB, CR. Being converted into analog data in the D/A converters 15a to 15c, the data is outputted from the output terminals 16a to 16c.

The operation of the efficient encoder 3 is explained in reference to FIG. 3. The input luminance signal Y and two color difference signals CR and CB are delayed by specified time in the field memories 17a and 17b, and formed into blocks. In block forming, each input signal is first divided into blocks of 8 pixels×8 lines. After being formed into blocks, the luminance signal Y and two color difference signals CR and CB are multiplexed in time division, and fed into the shuffling circuit 28 to compose macro blocks. Details of macro block configuration and shuffling circuit 28 are described later. The shuffled recording data is inputted to the 8×8 DCT circuit 18. The data formed into blocks in the field memories 17a and 17b shuffled by the macro block in the shuffling circuit 28 is supplied into the 8×8 DCT circuit 18 for discrete cosine transform (DCT). That is, expressing each pixel data of a block as X (i, j), (i=0, 1, ..., 7; j=0, 1, ..., 7), the 8×8 DCT circuit 18 first operates eight points of DCT in the horizontal direction, that is;

$$f(0,j) = \frac{1}{\sqrt{8}} \sum_{i=0}^{7} \times (i,j)$$

$$f(m,j) = \frac{1}{2} \sum_{j=0}^{7} \times (i,j) \times \cos\left(\frac{(2 \times i + 1) \times m \times \pi}{16}\right)$$

(where $m = 1, \ldots, 7; j = 0, \ldots, 7$)

and this transformed data f (m, j) (m=0, ..., 7; j=0, ..., 7) is operated in eight points of DCT in the vertical direction to determine;

$$F(m,0) = \frac{1}{\sqrt{8}} \sum_{j=0}^{7} \times f(m,j)$$

$$F(m,n) = \frac{1}{2} \sum_{j=0}^{7} \times f(m,j) \times \cos\left(\frac{(2 \times j + 1) \times n \times \pi}{16}\right)$$

(where $n = 1, \ldots, 7; m = 0, \ldots, 7$)

and the conversion coefficient F (m, n) (m=0, ..., 7; n=0, ..., 7) is outputted.

Each conversion coefficient outputted from the 8×8 DCT circuit 18 is quantized in the adaptive quantization circuit 19. The adaptive quantization circuit 19 holds plural quantization tables differing in quantization steps, and changes over the quantization steps based on the conversion coefficient of each block and the parameter from the buffer memory 21. For example, it is designed to quantize roughly in the starting portion of high contrast, and finely in the detail portion of small amplitude. The output of the adaptive quantization circuit 19 is coded in variable-length by the variable-length encoder 20, and is fed into the buffer memory 21. The data stored in the buffer memory 21 is read out at fixed rate. The buffer controller 22 senses the data accumulated in the buffer memory 21, determines the quantization parameter according to the data quantity, and controls the adaptive quantization circuit 19. The buffer controller 22 also selects the conversion coefficient for coding by the variable-length encoder 20 from the data quantity accumulated in the buffer memory 21.

Likewise, the operation of the efficient decoder 14 is explained in reference to FIG. 4. The reproducing digital signal outputted from the error correction decoder 13 is decoded by variable-length in the variable-length decoder 23, and is converted into data of fixed length. In the buffer memory 24, the data of fixed length decoded in variable-length is read out at fixed rate. The data of fixed length read out from the buffer memory 24 is inversely quantized in the inverse adaptive quantization circuit 25, and is fed into the inverse 8×8 DCT circuit 26. In the inverse 8×8 DCT circuit 26, the inputted reproducing digital signal is treated by inverse discrete cosine transform (inverse DCT). The reproducing luminance signal Y and two reproducing color difference signals CB and CR undergoing inverse DCT are supplied into the de-shuffling circuit 29 to be deshuffled cleared of macro block, and are temporarily stored in the field memories 27a and 27b, are delayed by a specified delay time. The blocks applied at the time of recording are decoded, and the data are outputted into the D/A converters 15a to 15c. Details of the de-shuffling circuit 29 are given later.

Before explaining the recording format creation in the prior art, the relation between the recording track pattern and recording data layout of the prior art is described. FIG. 5(a) shows the configuration of tape and drum used in the prior art. As shown in the diagram, the tape winding angle is 180 degrees, a two-channel rotary head is used, and the drum rotation speed is 9000 rpm. FIG. 5(b) shows the track pattern of a recording track formed on a magnetic tape 9 of digital VTR employing the conventional recording system shown in FIG. 5(a). Therefore, in the prior art, because of two-channel recording, one frame is recorded on the magnetic tape by being divided into ten tracks.

FIG. 6 shows the DCT block composition in one field of luminance signal Y and two color difference signals CB and CR. In this prior art, the luminance signal Y per field is composed of 720 pixels in the horizontal direction and 240 lines in the vertical direction, and two color difference signals CB and CR, both of 360 pixels in the horizontal direction and 120 lines in the vertical direction. Therefore, in one field, the luminance signal Y is composed of 90 DCT blocks in the horizontal direction and 30 DCT blocks in the vertical direction, a total of 2700 DCT blocks, and the two color difference signals CB and CR are both composed of 45 DCT blocks in the horizontal direction and 15 DCT blocks in the vertical direction, a total of 675 DCT blocks each.

Referring now to FIGS. 7(a)–7(c) explained below is the composition of the macro block which is the basic unit for shuffling by the shuffling circuit 28. The luminance signal Y and color difference signals CB, CR inputted at 4:1:1 by the field memories 17a and 17b are individually divided into DCT blocks of 8 pixels×8 lines. In the shuffling circuit 28, four DCT blocks of luminance signal Y are gathered into one block as shown in FIG. 7(a), and as for color difference signals CB,CR, each DCT block thereof is used as it is, and the total of six DCT blocks are gathered into one to compose a macro block. At this time, by multiplexing in time division, for example as shown in FIG. 7(b), a sequence of CB11, CR11, Y11, Y12, Y21, Y22 is composed as one macro block. The composition of macro blocks in one field is as shown in FIG. 7(c), and the number of macro blocks per field is 675 macro blocks.

In this prior art, the macro blocks disposed in the scanning direction of the screen shown in FIG. 7(c) are shuffled. Shuffling is to rearrange the macro blocks arranged in the scanning direction of the screen in FIG. 7(c). FIG. 8 shows a case of random shuffling by random number in M series. In this prior art, the case of shuffling macro blocks by random number in M series shown in FIG. 8 is explained.

The next explanation is about the recording method of shuffled recording data onto the magnetic tape 9. Without shuffling, the macro blocks composed in the manner above are read out in the sequence according to the scanning direction of the screen shown in FIG. 7(c), arranged time sequentially, and recorded in the scanning direction of the head shown in FIG. 5 by the rotary heads 8a and 8b. On the other hand, when shuffling is performed, the macro blocks randomized in the reading sequence by shuffling are arranged time sequentially in the sequence of reading by random shuffling, and are recorded in the scanning direction of the tape shown in FIG. 5 in the sequence of macro blocks of tape by the rotary heads 8a and 8b.

FIG. 9 shows a block configuration of shuffling circuit 28. Numeral 401 shows a record data generating circuit for composing macro blocks on the basis of the input DCT blocks, 402 designates a shuffling memory, and 403 designates a shuffling control circuit for controlling the shuffling memory 402 and which possesses a shuffling table for performing shuffling.

FIG. 10 shows a block configuration of the de-shuffling circuit 29. Numeral 501 designates a deshuffling memory, 503 designates a deshuffling control circuit for controlling the deshuffling memory 501 and which possesses a deshuffling table for performing deshuffling, and 502 designates a reproduced data restoring circuit for separating the luminance signal Y and color difference signals CB and CR from the macro blocks read out from the deshuffling memory 501.

The operation of the shuffling circuit 28 in the prior art is explained below in reference to FIG. 9. In the shuffling circuit 28, when the data formed in DCT blocks of 8 pixels×8 lines by the field memory 17 is inputted, macro blocks as shown in FIG. 7(b) are composed on the basis of the input DCT blocks in the record data generating circuit 401. Shuffling in this prior art is explained. The reading sequence of the macro blocks composed in the record data generating circuit 401 is determined by the reading sequence according to the shuffling table in the shuffling control circuit 403. According to this reading sequence, the writing address of each macro block into the shuffling memory 402 is generated, and the macro block data is temporarily written into the shuffling memory 402 according to the generated writing addresses. In this method, shuffling is effected, and the recording data stored in the shuffling memory 402 is outputted to the 8×8 DCT circuit 18.

Next is explained the operation of the de-shuffling circuit 29 of the prior art in reference to FIG. 10. The reproduced data inputted from the inverse 8×8 DCT circuit 26 is temporarily stored in the deshuffling memory 501 as the writing address of the data into the deshuffling memory 501 is generated according to the deshuffling table in the deshuffling control circuit 503. The reproduced data read out from the deshuffling memory 501 is inputted to the reproduced data restoring circuit 502, in which the luminance signal Y and color difference signals CB and CR are separated from the macro blocks, and the data in the original DCT block unit is restored. The reproduced data restored into the original data in the DCT block unit by the reproduced data restoring circuit 502 is outputted to the field memories 27a and 27b.

When editing and scanning with the conventional digital VTR having such a recording format, problems such as servo precision or track curving special to the VTR, as shown in FIG. 11, occur. The problem causes the pre-recorded track to be overwritten at the start time of recording (cut-in point) or at the end time of recording (cut-out point) during editing. Consequently, the data of the overwritten track is not reproduced correctly, and favorable reproduced images are not obtained.

At the cut-in point in assemble editing, or at the cut-in point and cut-out point in insert editing, the pre-recorded track is overwritten, and 20% of the total data in one field is not reproduced. When the data in one field is shuffled at random by the macro block, the data of the entire screen is recorded in one overwritten track, and 20% of total macro blocks is not reproduced correctly. The data of the macro blocks not reproduced correctly, and hence not obtained, are interpolated as shown in FIG. 12 by the corresponding macro block data in the preceding field in the field memories 27a and 27b. The video data in the preceding field, however, is scattered about the entire screen, and the reproduced image is very bad-looking.

FIG. 13 shows a track pattern of insert editing of the data in one frame. This is to show the mode of pre-recorded track being overwritten at cut-in point and cut-out point. If the first track of the data in one frame to be inserted, that is, the data preliminarily recorded at the cut-in point is overwritten, the macro block data recorded in the final track of the field data preliminarily recorded at the position immediately before the inserted frame is not reproduced correctly, and is interpolated from the preceding field, and therefore the reproduced image is very bad-looking due to the reason mentioned above. If, on the other hand, the tenth track of the data of one frame to be inserted, or the data preliminarily recorded at the cut-out point is overwritten, the macro block data in the entire screen recorded in the first track of the field data preliminarily recorded at the final position of the inserted frame is not reproduced correctly, is interpolated from the corresponding macro block data in the preceding field, and the reproduced image is similarly very bad-looking. Thus, in case of insert editing, effects are observed in the reproduced image just before the inserted frame position by overwrite at the cut-in point, or just after the inserted frame position due to overwrite at the cut-out point.

Hitherto, in order to record and reproduce wide-band video signals such as Hi-Vision signals by using a drum of small aperture, a method of dividing the video signals in one field into plural segments, and recording them in plural tracks is known, as disclosed, for example, in Hi-Vision VTR Recording Technology (Journal of Society of Precision Engineering, Vol. 55, No. 7, supplement, Jul. 5, 1988).

Furthermore, in the digital VTR for recording and reproducing by converting video signals into digital signals and using a drum of small diameter, when the digitized video signal is recorded without any processing, the bit rate of the recording signal is heightened, and therefore, in the same way as in the case of Hi-Vision VTR above-mentioned, it is considered to distribute the video signals in one field into plural channels, and record them in plural tracks by using plural magnetic heads.

For instance, as shown in FIG. 14, it may be considered to divide video signals in one field into five segments, and record them on 2.5 tracks (5 tracks/1 frame) on the magnetic tape, and this recording method and ordinary reproducing operation are closely explained in reference to an example of digital VTR in the recording format of 5 tracks/1 frame in FIGS. 14, 15, and 16.

FIG. 15 is a diagram showing the scanning trace of magnetic head on the tape in recording and reproducing, and FIG. 16 is a diagram showing an example of configuration of recording system and reproducing system of this digital VTR.

In FIG. 16, numeral 1 designates an input terminal of video signal, 2 designates an A/D converter for converting an analog signal into a digital signal, 204 designates an efficient encoder for compressing and coding the video signal, 4 designates an error correction encoder for adding an error correction code, 5 designates a modulator for modulating the recording signal into a code suited to transmission route, 207 designates a segment dividing circuit for dividing the recording signals in one field into five segments as shown in FIG. 5, 208 designates a recording processor for controlling to divide the recording data divided into five segments into two channels in order to record them by using two magnetic heads 210a, 210b, 209a and 209b designate magnetic heads for recording, 9 designates a magnetic tape, 210a and 210b designate magnetic heads for reproducing, and 217 designates a rotary drum.

Numeral 211 is a reproducing processor for synthesizing reproduced data of five segments supplied from the magnetic heads 210a, 210b into digital signals for one field, 12 is a demodulator for demodulating the digital signal into the original digital signal, 13 designates an error correction decoder for detecting and correcting a transmission error, 214 designates an efficient decoder for decompressing the compressed video signal into the original signal, 15 designates a D/A converter for converting the digital video signal into analog video signal, and 16 designates an output terminal of video signal.

The operation of the recording system is described below. The video signal inputted from the input terminal 1 is converted into digital video signal in the A/D converter 2, and is put out to the efficient encoder 204. In the efficient encoder 204, the data is compressed by making use of the correlation of video data. The output of the efficient encoder 204 is inputted into the error correction encoder 4, and is provided with a check for correcting the transmission error in recording and reproducing. The data provided with the check is converted into recording signal suited to magnetic head and magnetic tape in the modulator 5, and the recording data for one field is divided into five segments as shown in FIG. 14 by the segment dividing circuit 207.

The recording signal divided into five segments is inputted into the recording processing 208, divided into two channels, and recorded on the magnetic tape by the magnetic heads 209a, 209b. The magnetic heads 209a, 209b are mounted on the rotary drum 217, and as the rotary drum 217 rotates, the magnetic heads 209a, 209b also rotate, and the data is recorded on the magnetic tape 9 simultaneously by two magnetic heads 209a, 209b by the so-called helical scan system as shown in FIG. 15.

For example, in case of scanning [1], the data is recorded in one track by the magnetic head 209a in the sequence of segment 1 and segment 2. Successively, segment 3 and segment 4 are recorded in one track by the magnetic head 209b.

Similarly, in scanning [2] through [5], data is recorded by magnetic heads 209a, 209b, and thereafter the operation is repeated from scanning [1] through scanning [5].

The operation of the reproducing system is as follows. The magnetic heads 210a, 210b are also mounted on the rotary drum 217 in the same way as the magnetic heads 209a, 209b, and as the rotary drum 217 rotates, the magnetic heads 210a, 210b also rotate, and simultaneously scan the track, and supply the reproduced signals to the reproducing processor 211.

In FIG. 15, referring to an example of scanning [1], the data is reproduced by the magnetic head 210a in the sequence of segment 1 and segment 2. The data is reproduced by the magnetic head 210b in the sequence of segment 3 and segment 4.

In the reproducing processor 211, thus reproduced data is synthesized into digital signals for one field, and outputted to the demodulator 12.

In the demodulator 12, the digital signal is demodulated into the original digital signal, error is detected and corrected in the error correction decoder 13, and the compressed code is decompressed into the original digital video signal in the efficient decoder 214. The restored digital video signal is converted into an analog video signal in the D/A converter 15, and is outputted from the output terminal 16.

The case of double speed search in this digital VTR is explained in reference to FIGS. 17 through 22.

FIG. 17 is a diagram showing the scanning trace of the magnetic heads 210a, 210b in the case of double speed search of this digital VTR.

In the case of double speed search, the head scanning trace is generally as shown in the hatched area in FIG. 17. When about half of the track width is reproduced, the data is almost completely restored by error correction processing and the like, and the hatched area in FIG. 18 is reproduced as a result, so as to be reproduced by the magnetic heads 210a, 210b in every two tracks.

FIG. 19 is a diagram showing an example of the relation between segment and screen. The cases of segment 1 and segment 4 are shown herein. The lower half of the segment corresponds to the left screen, and the upper half of the segment corresponds to the right half of the screen.

FIG. 20 shows the head scanning trace in the case of double speed search on a magnetic tape in which video data is actually recorded. As mentioned above, in usual reproducing, data for one field is obtained in 2.5 tracks. This holds true in special reproducing, and in the case of the double speed search. There are four patterns for obtaining the video data for one field, that is, video data for 2.5 tracks, and they are indicated as pattern 1 to pattern 4 by the type of hatching. In the field number, in the period from field 0 to field 7, the four patterns are repeated. Hereinafter, the double speed search is explained in eight fields and four patterns as the basic unit.

In case of pattern 1, the video data for 2.5 tracks consists of the data of segment 1, segment 2, segment 3, and segment 4 of field 0, and the lower halves of segment 4 of field 1 and segment 1 of field 2.

At this time, the data of segment 1 and segment 4 of field 0 in pattern 1 and the data of segment 1 of field 1 and segment 4 of field 2 overlap in the lower part of the segment, that is, in the portion of the left half of the screen of the segment as shown in FIG. 19.

Therefore, on the screen, the data corresponding to the left screen of segment 1 of field 2 and segment 4 of field 1 reproduced later by the magnetic heads 210a, 210b is produced by the reproducing processor 211 in a form of replacing the data of the left screen of segment 1 and segment 4 of field 0 reproduced first by the magnetic heads 210a, 210b.

Similarly, from pattern 2 to pattern 4, the segment data in the scanning trace area enclosed by hatched area in FIG. 18 is detected as screen data for one field.

In this way, the digital signals for one field from pattern 1 to pattern 4 are outputted to the demodulator 12, and demodulated to the original digital signals. In the error correction decoder 13, error detection and error correction are conducted, and the compressed codes are restored into the original digital video signals in the efficient decoder 214. The restored digital video signal is converted into analog video signal in the D/A converter 15, and outputted from the output terminal 16 as double speed search picture.

FIG. 21 shows the position of the screen and the field of the data from which pattern 1 to pattern 4 are reproduced. Numerals in the diagram other than the pattern numbers and segment numbers refer to field numbers, and the x mark shows that scanning of the corresponding segment was disabled in one pattern.

As shown in FIG. 21, in the case of double speed search, four patterns are repeated from pattern 1 to pattern 4, and the x marked portion becomes a fixed error, and appears on the reproduced screen.

FIG. 22 is an example of setting reference fields in four patterns individually, in the case of double speed search, and expressing the difference of the reproduced segment field from the reference field by the number of fields, and it is judged whether the spontaneous screen in terms of the time is reproduced or not.

In FIG. 22, for example, in the case of pattern 3, the reference field is field 4, and the data of one field ahead is reproduced in segment 2, and in segment 3, the data of one field before is reproduced in left screen and the data of one field later is reproduced in right screen and the image is unnatural in terms of the time.

The conventional digital VTR for recording in plural tracks by dividing video signals in one field into plural segments is thus composed, a portion that is not reproduced always occurs in one field in speed search, and fixed errors are formed on the screen, resulting in a very bad-looking screen.

In such digital VTR, since video signals in one field are divided into plural segments and recorded in plural tracks, there is a portion of time difference mutually in the screen of one field in speed searching, which is very bad-looking.

SUMMARY OF THE INVENTION

The invention is devised to solve these problems, and it is hence a primary object of the invention to provide an apparatus for recording and reproducing digital video signals in a recording format capable of obtaining visually satisfactory reproduced images even in the presence of tracks incapable of reproducing the recording data completely due to overwriting at cut-in points or cut-out points in editing.

It is a second object of the invention to provide a digital video signal recording and reproducing apparatus capable of obtaining a spontaneous speed searching image, by eliminating fixed errors on the screen in speed search and decreasing the portion of time difference on the screen of one field.

The above and further objects and features of the invention will more fully be apparent from the following detailed description which accompanying drawings.

BRIEF DESCRIPTION OF THE DRAWINGS

FIG. 14 is a conceptual diagram showing a method of recording video signals of one field on a magnetic tape by dividing them into five segments;

FIG. 21 is a diagram showing field composition of reproduced screen in double speed search of the conventional digital VTR;

FIG. 22 is a diagram showing deviation of field reproducing time of reproduced screen in double speed search of the conventional digital VTR;

FIG. 50 is a recording format on a magnetic tape in Embodiments 23 and 24 of the invention;

FIG. 53(a) is a diagram explaining a method for determining the recording format by shuffling;

FIG. 53(b) is a diagram explaining a method for determining the recording format by shuffling;

FIG. 53(c) is a diagram explaining a method for determining the recording format by shuffling;

FIG. 63(d) is a diagram explaining a method for determining the recording format by shuffling;

FIG. 54 is a diagram explaining a method for determining the recording format by shuffling;

FIG. 56 is a diagram showing the field composition of the reproduced screen in double speed search in Embodiment 23 of the invention;

FIG. 58(a) is a diagram explaining a synthesizing procedure of reproduced data in Embodiment 24 of the invention;

FIG. 58(b) is a diagram explaining a synthesizing procedure of reproduced data in Embodiment 24 of the invention;

FIG. 58(c) is a diagram explaining a synthesizing procedure of reproduced data in Embodiment 24 of the invention;

FIG. 59 is a diagram showing the relation of each field reproducing time of reproduced screen in double speed search in Embodiment 24 of the invention;

DESCRIPTION OF THE PREFERRED EMBODIMENTS

[Embodiment 1]

Figure 1:
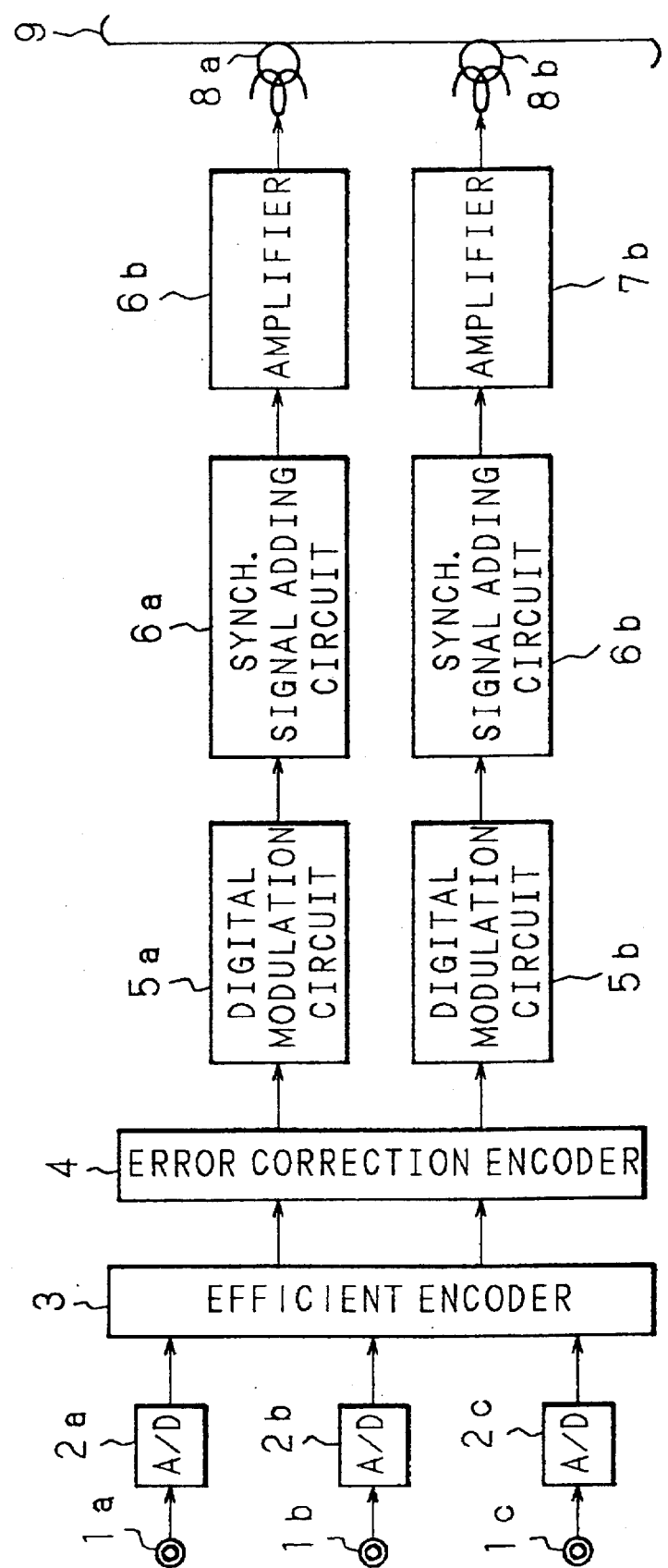
FIG. 1 is a block diagram of a recording system of a conventional digital VTR.
Figure 23:
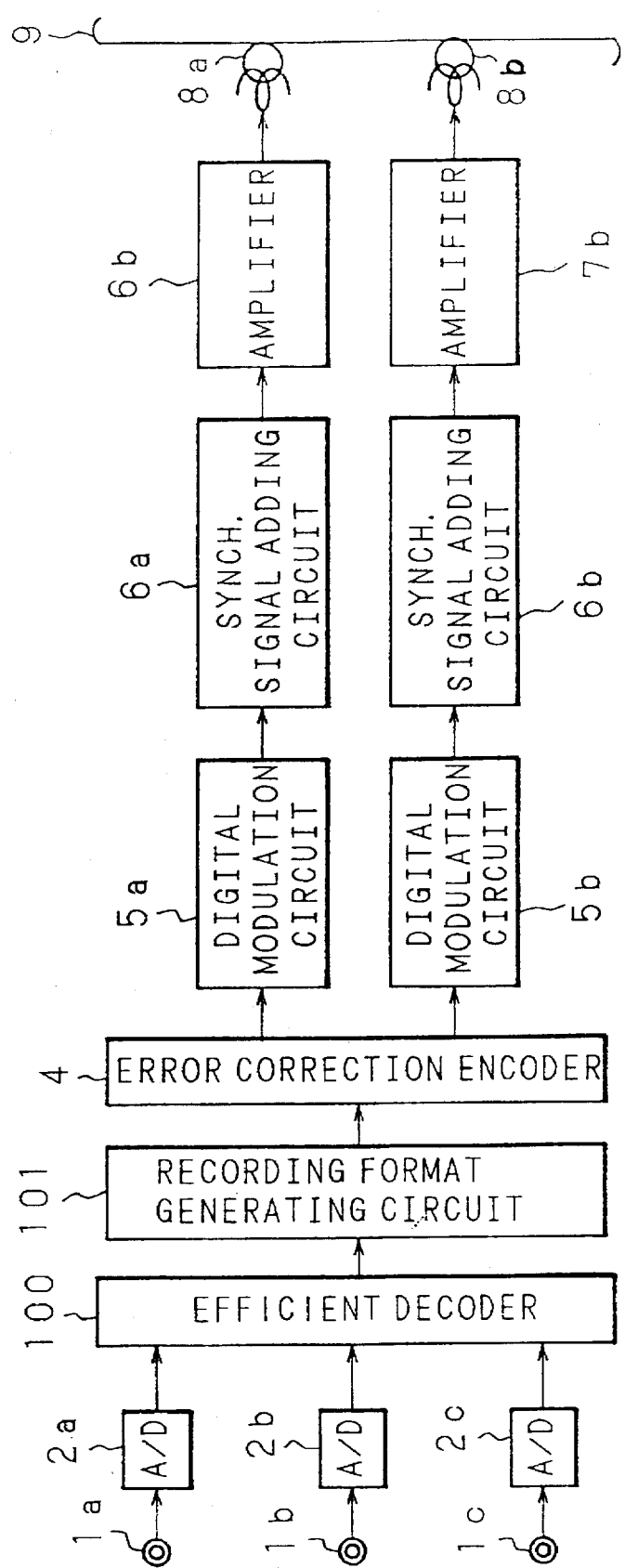
FIG. 23 is a block diagram of a recording system of an embodiment of a digital VTR of the invention.

FIG. 23 is a block diagram of a digital signal recording and reproducing apparatus as an embodiment of the invention. In the diagram, numerals 1, 2 and 4 through 9 designate the same parts as shown in FIG. 1, and are not explained herein. Numeral 100 designates an efficient encoder, and 101 designates a recording format generating circuit.

Figure 2:
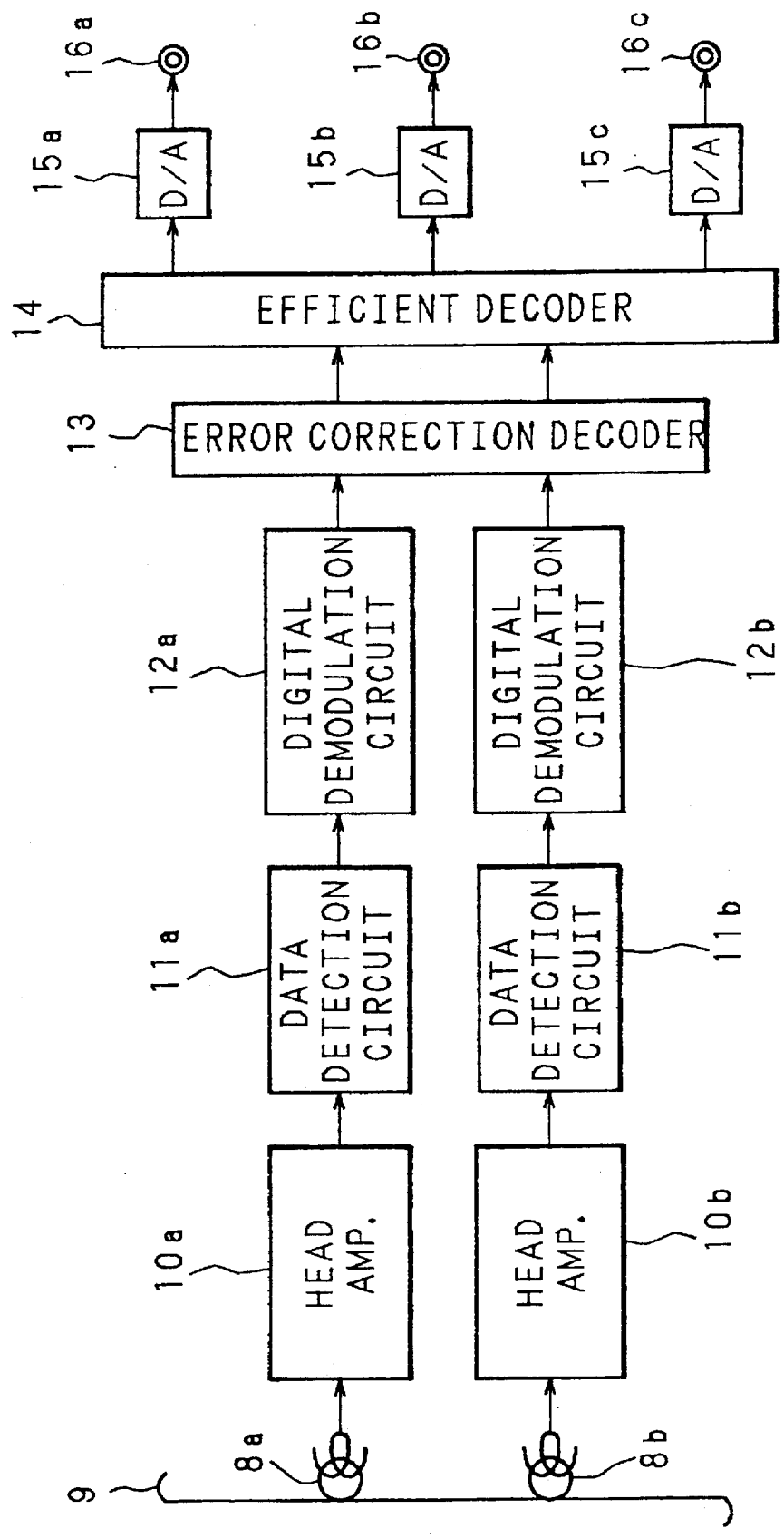
FIG. 2 is a block diagram of a reproducing system of a conventional digital VTR.
Figure 24:
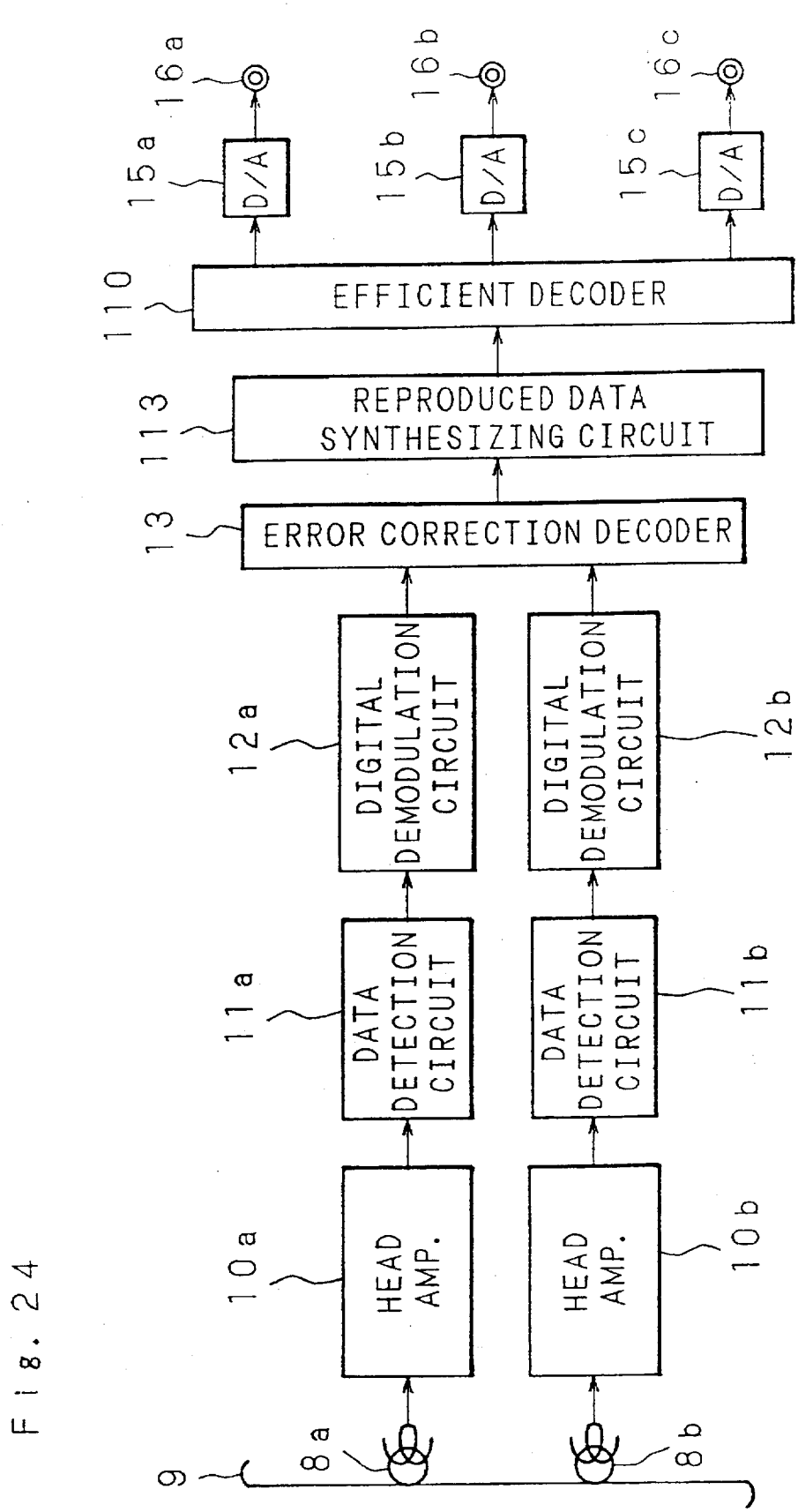
FIG. 24 is a block diagram of a reproducing system of the digital VTR of the invention in the embodiment.

FIG. 24 is a block diagram of reproduced signal processing system in the digital signal recording and reproducing apparatus of the embodiment of the invention. In the diagram, numerals 8 through 13, 15, and 16 designate the same parts as shown in FIG. 2, and are not explained herein. Numeral 110 designates an efficient decoder, and 113 designates a reproduced data synthesizing circuit.

Figure 3:
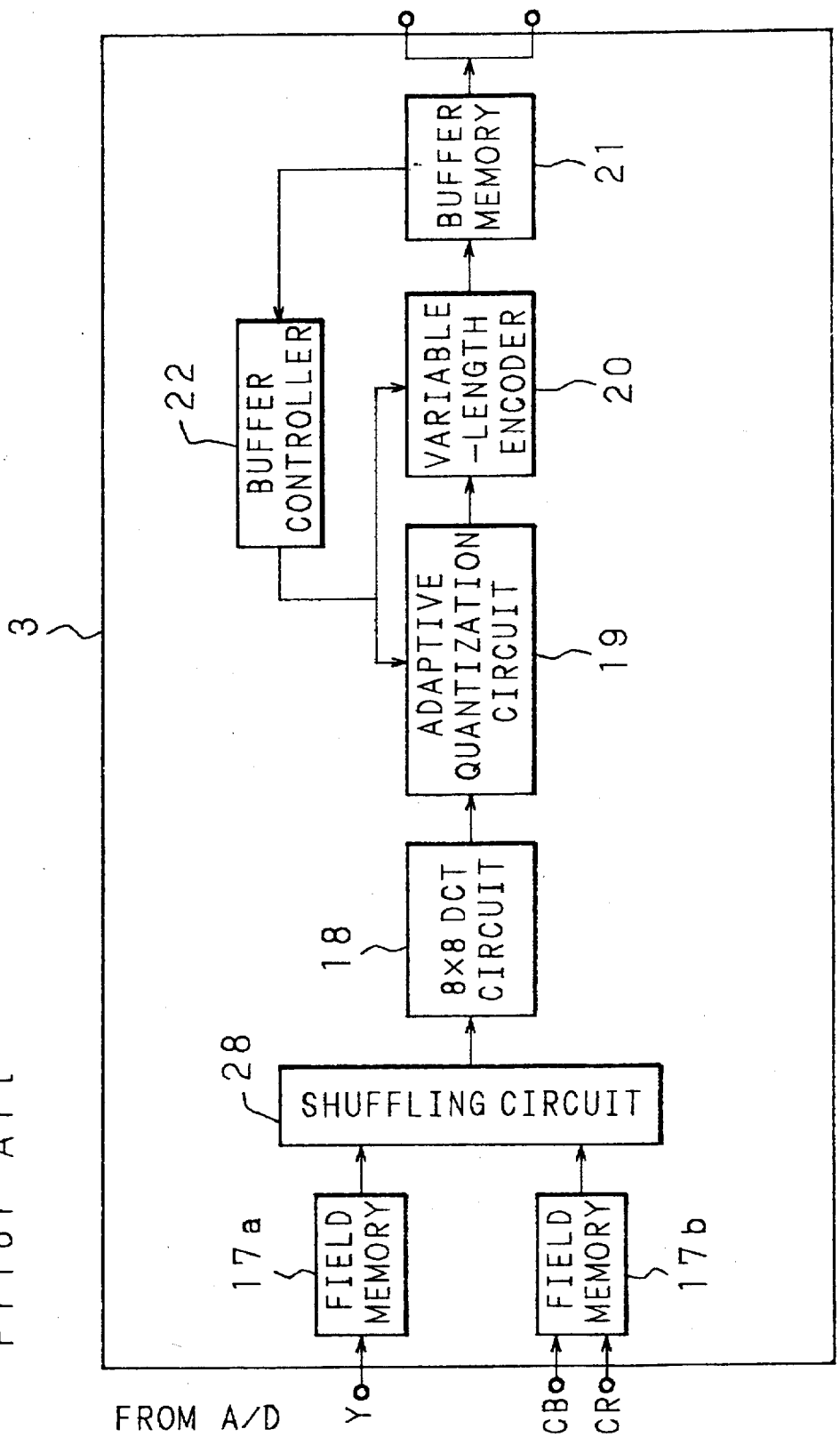
FIG. 3 is a block diagram of a conventional efficient coding circuit.
Figure 25:
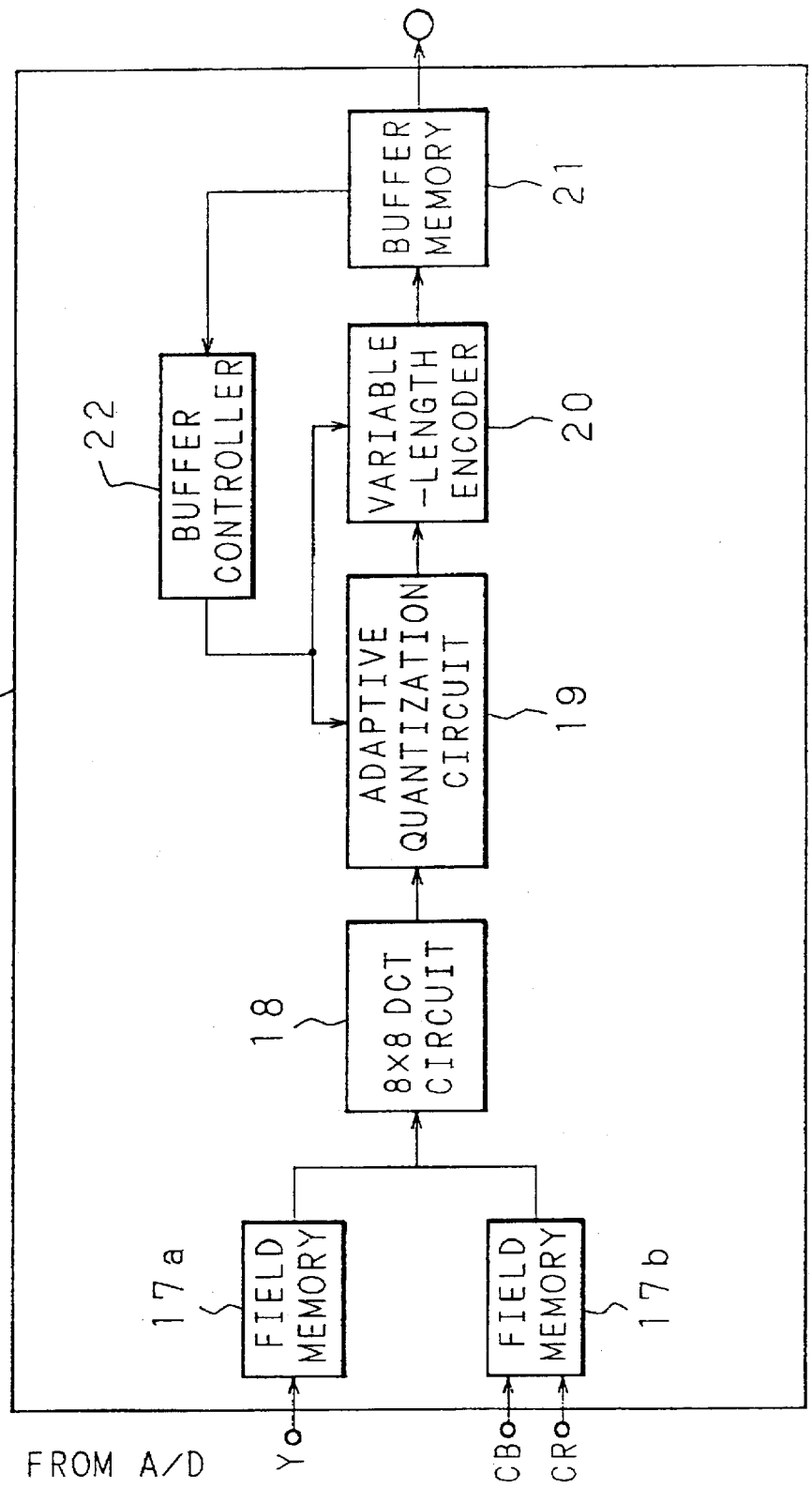
FIG. 25 is a block diagram of an efficient coding circuit mounted on the digital VTR of the invention.

FIG. 25 is a block diagram of the efficient encoder 110 of the digital signal recording and reproducing apparatus of the embodiment of the invention. In the diagram, numerals 17 through 22 designate the same parts as shown in FIG. 3, and are not explained herein. In the efficient encoder 100 of the embodiment, the shuffling circuit 28 shown in FIG. 3 in the prior art is omitted.

Figure 4:
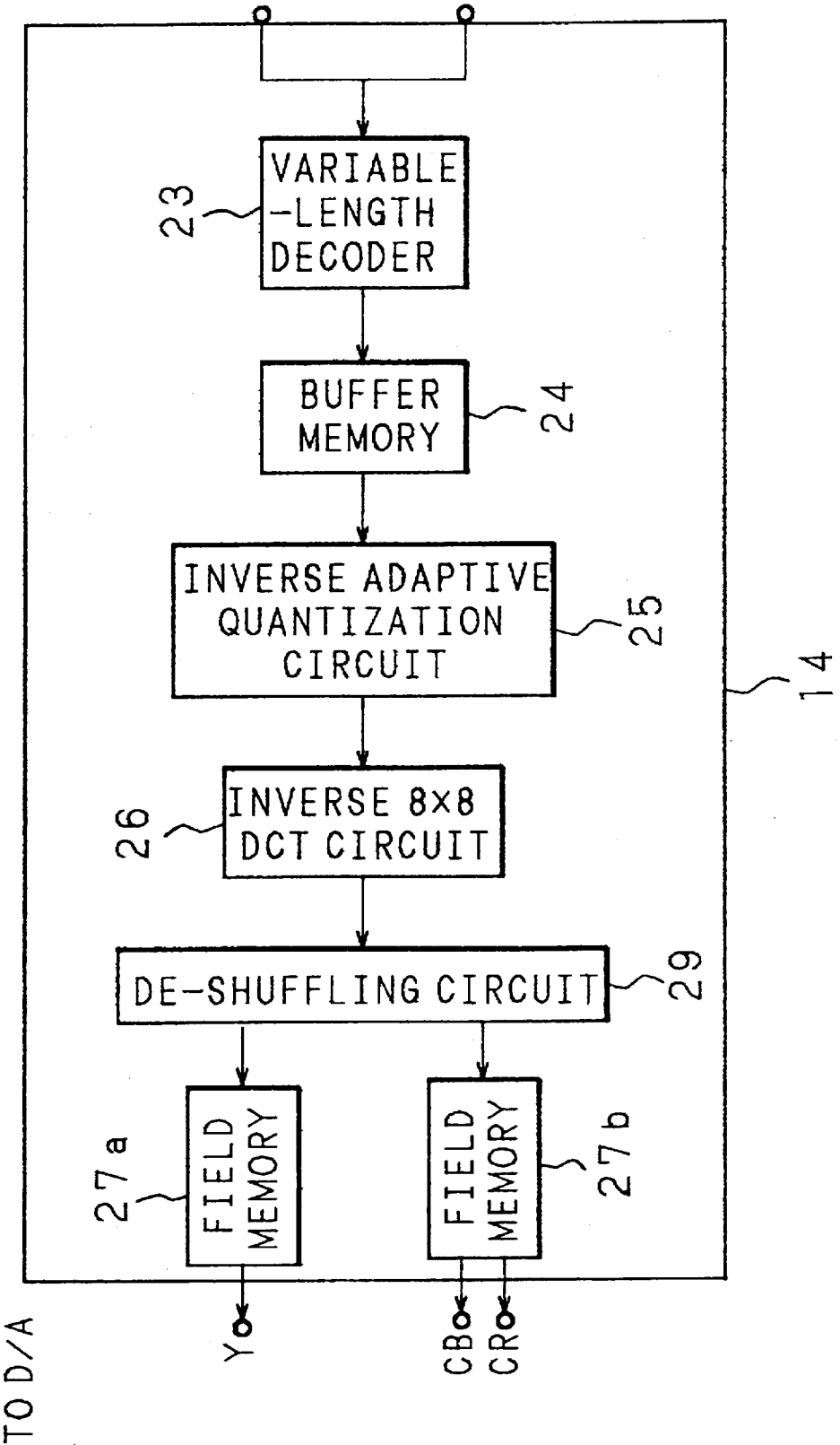
FIG. 4 is a block diagram of a conventional efficient decoding circuit.
Figure 26:
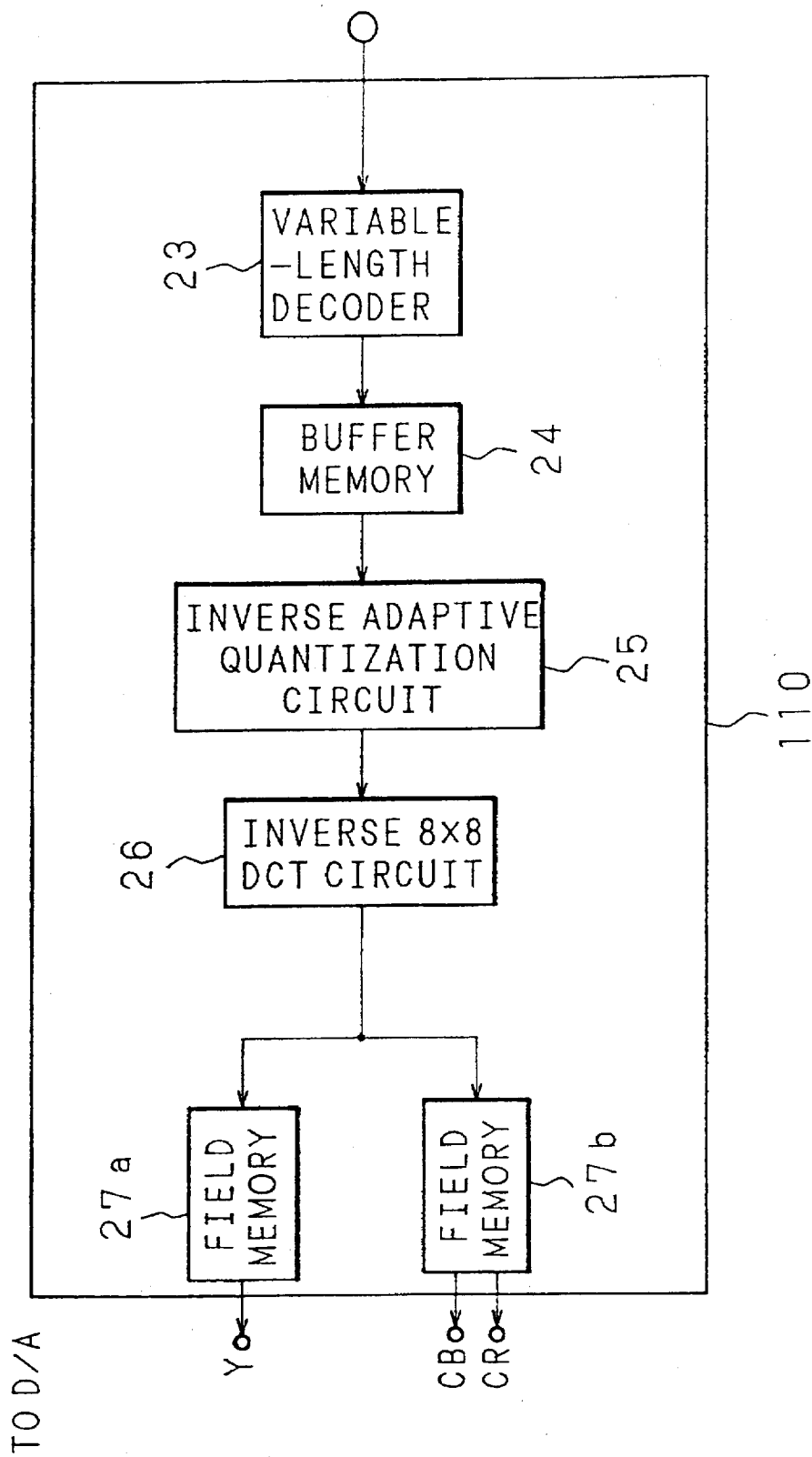
FIG. 26 is a block diagram of an efficient decoding circuit mounted on the digital VTR of the invention.

FIG. 26 is a block diagram of the efficient decoder 110 of the digital signal recording and reproducing apparatus of the embodiment of the invention. In the diagram, numerals 23 through 27 designate the same parts as shown in FIG. 4, and are not explained herein.

Referring to FIG. 23, the operation of the recording system is explained. The luminance signal Y and two color difference signals CR, CB inputted through input terminals 1a to 1c are A/D converted by A/D converters 2a to 2c, and and the output to an efficient encoder 100. The operation of the efficient encoder 100 is described in detail later. The data curtailed in the recording bit rate in the efficient encoder 100 is inputted to a recording format generating circuit 101 to be shuffled, and the recording format is generated. The recording data determined by the recording format is inputted to an error correction encoder 4, and a check for correcting and detecting error occurring at the time of reproducing is generated and added to the recording signal. The recording digital signal provided with the check by the error correction encoder 4 is digitally modulated by digital modulation circuits 5a and 5b, and the low frequency components of the recording signal are suppressed. The recording digital data undergoing digital modulation is provided with a synchronizing signal and an ID signal by synchronizing signal adders 6a and 6b, amplified by recording amplifies 7a and 7b, and recorded on a magnetic tape 9 through rotary heads 8a and 8b.

Similarly, the operation of the reproducing system is explained in reference to FIG. 24. Reproduced signals of two channels reproduced from the magnetic tape 9 by rotary heads 8a, 8b are amplified by head amplifies 10a, 10b, converted into digital data by data detecting circuits 11a, 11b, and the jitter of the reproduced signals is, thus, absorbed. Being digitally demodulated in digital demodulation circuits 12a and 12b, error in the reproduced signals is corrected or detected by an error correction decoder 13 according to the check added preliminarily at the time of recording. The reproduced signal output by the error correction decoder 13 is fed into a reproduced data synthesizing circuit 113, and deshuffled, then fed into an efficient decoder 110. The operation of the reproduced data synthesizing circuit 113 is described in detail below. The deshuffled reproduced data undergoes processings such as variable-length decoding and inverse DCT of reproduced digital data in the efficient decoder 110, and the original luminance signal Y and two color difference signals CB, CR are restored. The specific operation of the efficient decoder 110 is described later. Being converted into analog data in D/A converters 15a to 15c, the data is outputted through output terminals 16a to 16c.

Figure 7A:
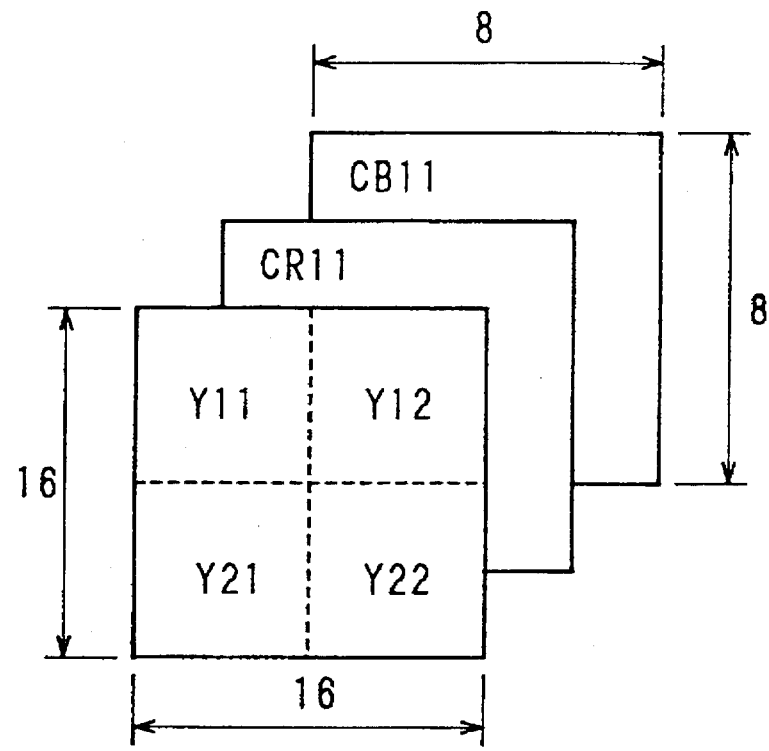
FIG. 7(a) is an explanatory diagram of macro blocks.
Figure 7B:
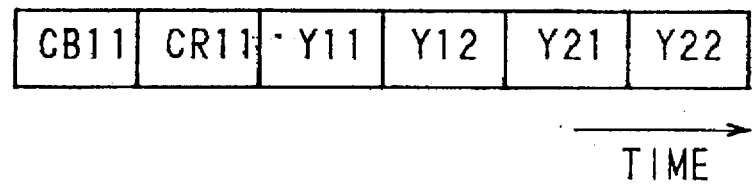
FIG. 7(b) is an explanatory diagram of macro blocks.

The operation of the efficient encoder 100 is explained in reference to FIG. 25. The input luminance signal Y and two color difference signals CR, CB are, in the same way as in the prior art, delayed by a specified time by the field memories 17a and 17b, and divided, into blocks. To divide the data into blocks, the input signals are first divided into DCT blocks of 8 pixels×8 lines. The luminance signal Y and two color difference signals CR and CB divided into blocks are multiplexed in time division, and macro blocks are composed as shown in FIG. 7. The macro blocks are fed into a 8×8 DCT circuit 18. Each transform coefficient undergoing discrete cosine transform (DCT) in the 8×8 DCT circuit 18 is quantized in the adaptive quantization circuit 19. The output of the adaptive quantization circuit 19 is fed into the variable-length encoder 20, and variable-length coding is effected. The buffer memory 21 temporarily stores the data delivered from the variable-length encoder 20, and reads it out at a fixed rate. The buffer controller 22 detects the data stored in the buffer memory 21, determines the quantizing parameter based on the quantity of data, and controls the adaptive quantization circuit 19. The buffer controller 22 also selects the transform coefficient for coding by the variable-length encoder 20 based on the quantity of data accumulated in the buffer memory 21.

Similarly, referring to FIG. 26, the operation of the efficient decoder 110 is explained. The reproduced digital signal outputted from the reproduced data synthesizing circuit 113 is fed into the variable-length decoder 23, and converted into data of fixed length by variable-length decoding. In the buffer memory 24, the data of fixed length, after variable-length decoding, is read out at a fixed rate. The data read out at fixed rate from the buffer memory 24 is fed into the inverse adaptive quantization circuit 25 to undergo inverse adaptive quantization, and is fed into the inverse 8×8 DCT circuit 26 to undergo inverse DCT. The data undergoing inverse DCT in the inverse 8×8 DCT circuit 26 is fed into the field memories 27a and 27b. The DCT blocks of 8 pixels and 8 lines are decoded to be the original luminance signal Y and color difference signals CB and CR, and converted into analog data in the D/A converter 15a–15c.

Figure 27:
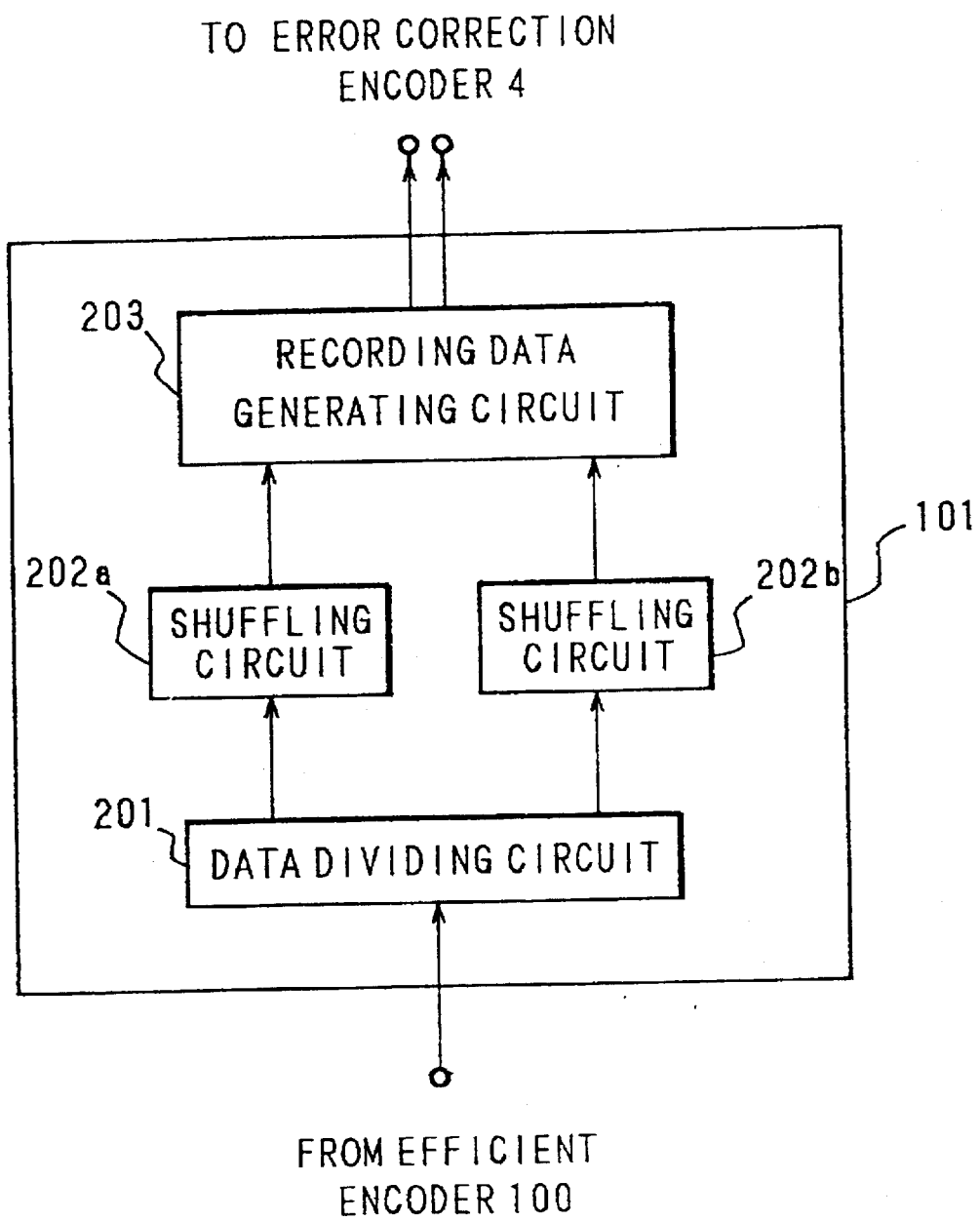
FIG. 27 is a block diagram of a recording format generating circuit mounted on the digital VTR of the invention.

FIG. 27 shows a block diagram of recording format generating circuit 101 in the embodiment. Numeral 201 denotes a data dividing circuit for dividing data into macro blocks in the peripheral area and macro blocks in the central area of the screen depending on the position (track number) of recording data on the screen, 202a is a shuffling circuit for shuffling the macro block data in the peripheral area, 202b is a shuffling circuit for shuffling the macro block data in the central area, and 203 is a recording data generating circuit for generating recording data for storing the data shuffled by the shuffling circuit 202 into a predetermined track.

Figure 28:
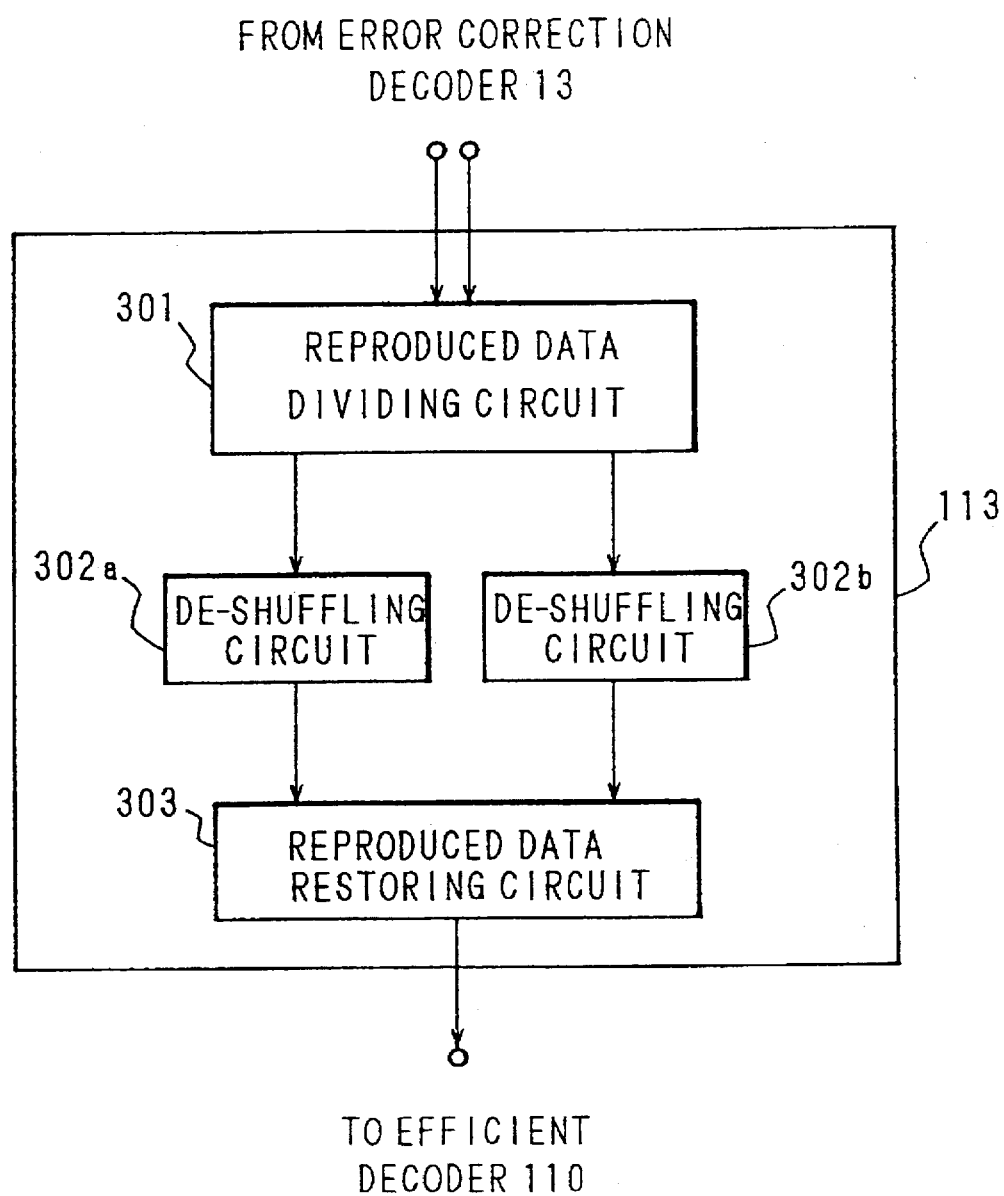
FIG. 28 is a block diagram of a recording format generating circuit mounted on the digital VTR of the invention.

FIG. 28 shows a block diagram of a reproduced data synthesizing circuit 113 of the embodiment. Numeral 301 designates a reproduced data dividing circuit for dividing the reproduced video data into macro block data in the peripheral and in the central area of the screen depending on the position (track number) of the reproduced track, 302a designates a de-shuffling circuit for deshuffling the macro blocks in the peripheral area of the screen outputted from the reproduced data dividing circuit 301, 302b designates a de-shuffling circuit for deshuffling the macro blocks in the central area of the screen outputted from the reproduced data dividing circuit 301, and 303 designates a reproduced data restoring circuit for synthesizing the reproduced data divided into two in the reproduced data dividing circuit 301 and deshuffled in the de-shuffling circuits 302.

Before explaining the operation of the recording format generating circuit 101, the concept of the invention will be described below. In the digital VTR of the invention the drum rotation speed is 9000 rpm. Hence, one frame of data is divided and recorded on ten tracks in the same way as in the prior art.

Explanation will be given to the case of a by the frame (or field) editing operation using the digital VTR of the embodiment. In this embodiment, in the same way as in the prior art, the pre-recorded track is overwritten at the cut-in point (or cut-out point) of editing due to problems in servo precision or track curving special to the VTR in editing, and one track corresponding to 20% of all data in one field is completely skipped in reproduction.

A recording format of the embodiment will be explained, which is capable of obtaining a reproduced image with less visual deterioration in picture quality even if the pre-recorded track is destroyed and is not reproduced correctly.

Figure 29:
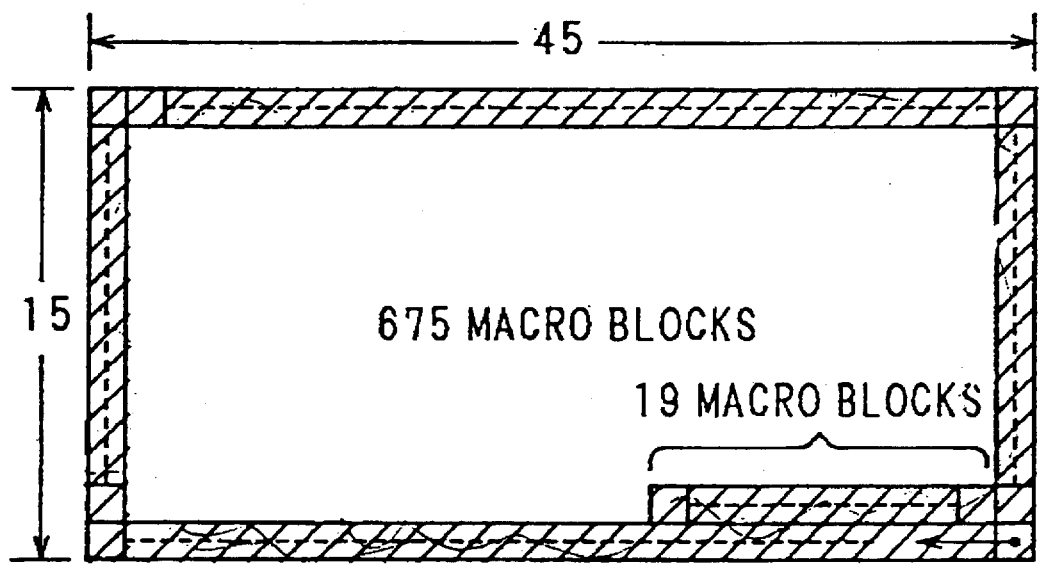
FIG. 29 is a diagram showing dividing method of video data into video data for the center and for the periphery of the screen in Embodiment 1 of the digital VTR of the invention.
Figure 30:
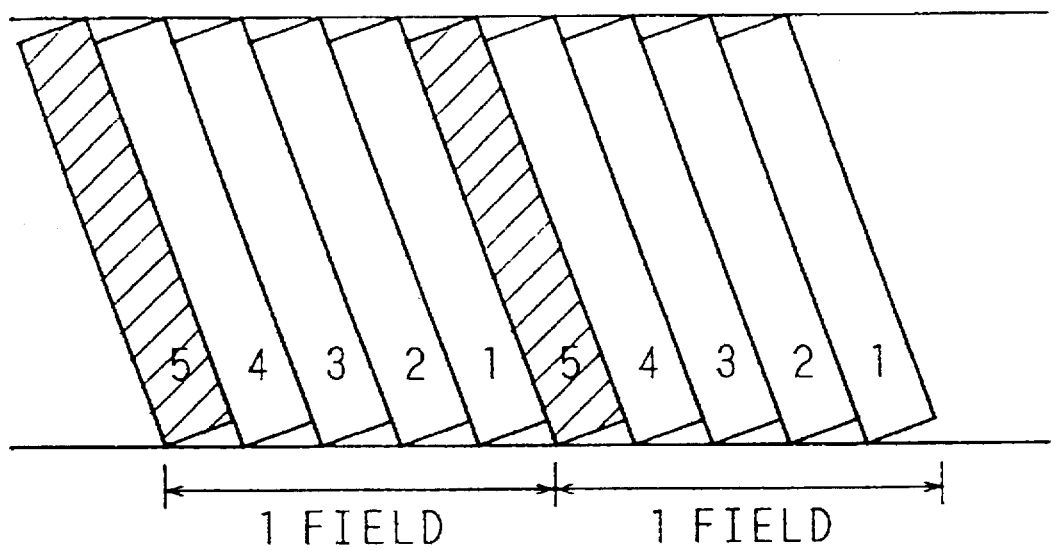
FIG. 30 is a track recording pattern in Embodiment 1 of the digital VTR of the invention.

Referring to FIGS. 29 and 30, the recording format in the first embodiment of the invention will be described below. Generally, the macro block in the peripheral area of the screen is visually inconspicuous in the reproduced image. On the other hand, the data for the vicinity of the screen center is important to form the central reproduced image, and unless this area is reproduced correctly, visual annoyance in the reproduced image stands out.

The recording format in Embodiment 1 is so composed that the data corresponding to the peripheral area on the screen of video data may be preliminarily recorded in the fifth track at the cut-in point of editing. As a result, if the fifth track recorded preliminarily is overwritten at the cut-in point in editing, the data corresponding to the peripheral area on the screen is recorded on the fifth track overwritten at the time of reproducing, so that visually favorable reproduced images may be obtained.

FIG. 29 is a diagram showing the position of the visually conspicuous central macro blocks together with the visually inconspicuous peripheral macro blocks on the screen in video data of one field. The hatched area on the screen is the peripheral area of the screen, and other area is the central area of the screen.

Figure 6:
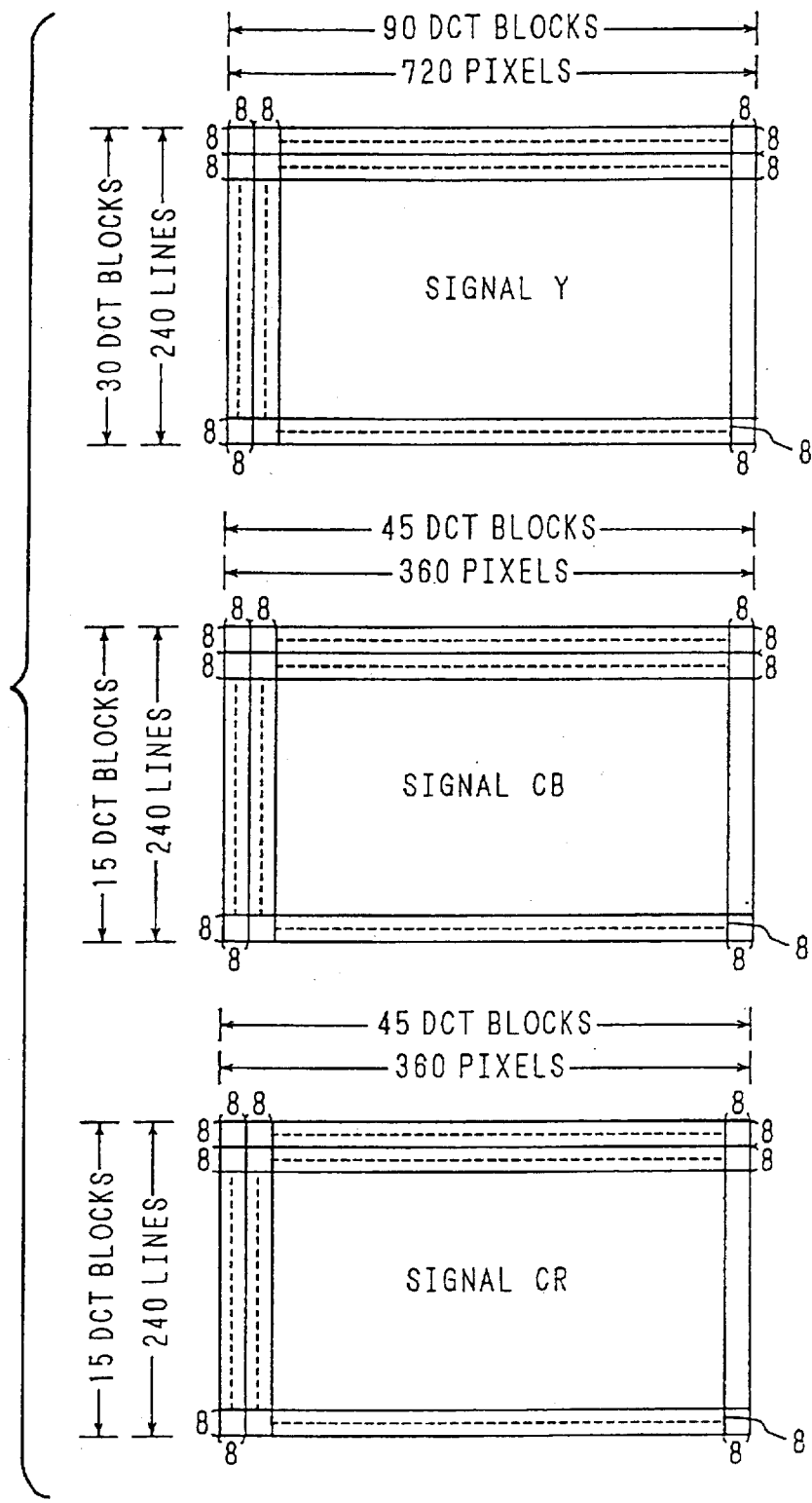
FIG. 6 is a conceptual diagram showing the composition of video signals.

The method of dividing the screen in FIG. 29 into macro blocks in the peripheral area and macro blocks in the central area will be explained below in detail. As shown in FIG. 6, same as in the prior art, the video signal is composed of 720 pixels in the horizontal direction and 240 lines in the vertical direction for the luminance signal Y per field, and 360 pixels in the horizontal direction and 120 lines in the vertical direction for each of the two color difference signals CB and CR. In the embodiment, macro blocks to be shuffled, as mentioned above, are composed of four DCT blocks as for luminance signal Y, and one DCT block for each of the two color difference signals CB and CR. Therefore, the number of macro blocks per field is 675 blocks.

The division is performed as follows. In this embodiment, the video signal in one field is divided into five sections. Macro blocks are collected in a total of 135 (675/5=135) from the lower right corner of the screen counterclockwise to the outer periphery, as peripheral macro blocks. The remaining 540 macro blocks are central macro blocks of the screen.

The operation of the recording format generating circuit 101 in the embodiment will be explained in reference to FIG. 27. In the data dividing circuit 201, when data of the macro blocks are inputted from the efficient encoder 100, they are divided into the peripheral and central macro blocks of the screen depending on the position of the macro blocks in the screen through the procedure mentioned above. The macro blocks corresponding to the peripheral area of the screen are fed in the shuffling circuit 202a and shuffled, and the macro blocks corresponding to the central area of the screen are fed in the shuffling circuit 202b and shuffled. In the embodiment, shuffling is done by the macro block. Shuffling is conducted by using the random number in M series same as in the prior art. The shuffled macro block data are arranged in the predetermined recording tracks in the recording data generating circuit 203 according to the shuffled sequence to generate recording data. FIG. 30 shows a practical recording track pattern in Embodiment 1. In this embodiment, as shown in the diagram, the video data of one field is recorded by controlling the recording data generating circuit 203 so as to record the central macro blocks of the screen in FIG. 29 in the first four tracks, and record the peripheral macro blocks of the screen in the hatched area in FIG. 29 in the hatched final fifth track of one field. The recording data thus generated by the recording data generating circuit 203 is outputted to the error correction encoder 4.

Referring now to FIG. 28, the operation of the reproduced data synthesizing circuit 113 in the embodiment will be explained. Reproduced data of the two channels inputted from the error correction decoder 13 are judged, by the reproduced track number, to be either the peripheral macro block data or the central macro block data of the screen and divided by the reproduced data dividing circuit 301. The macro block data judged to be the peripheral macro block data by the reproduced data dividing circuit 301 is fed to and deshuffled by the de-shuffling circuit 302a, while the macro block data judged to be the central macro block data by the reproduced data dividing circuit 301 is fed to and deshuffled by the de-shuffling circuit 302b. The reproduced data deshuffled in the de-shuffling circuits 302a and 302b are synthesized into data of one channel in the reproduced data restoring circuit 303 by synthesizing the macro block data divided into the data for the peripheral area and the central area of the screen. The reproduced data restored into the original data by the reproduced data restoring circuit 303 is outputted to the efficient decoder 110.

Figure 11:
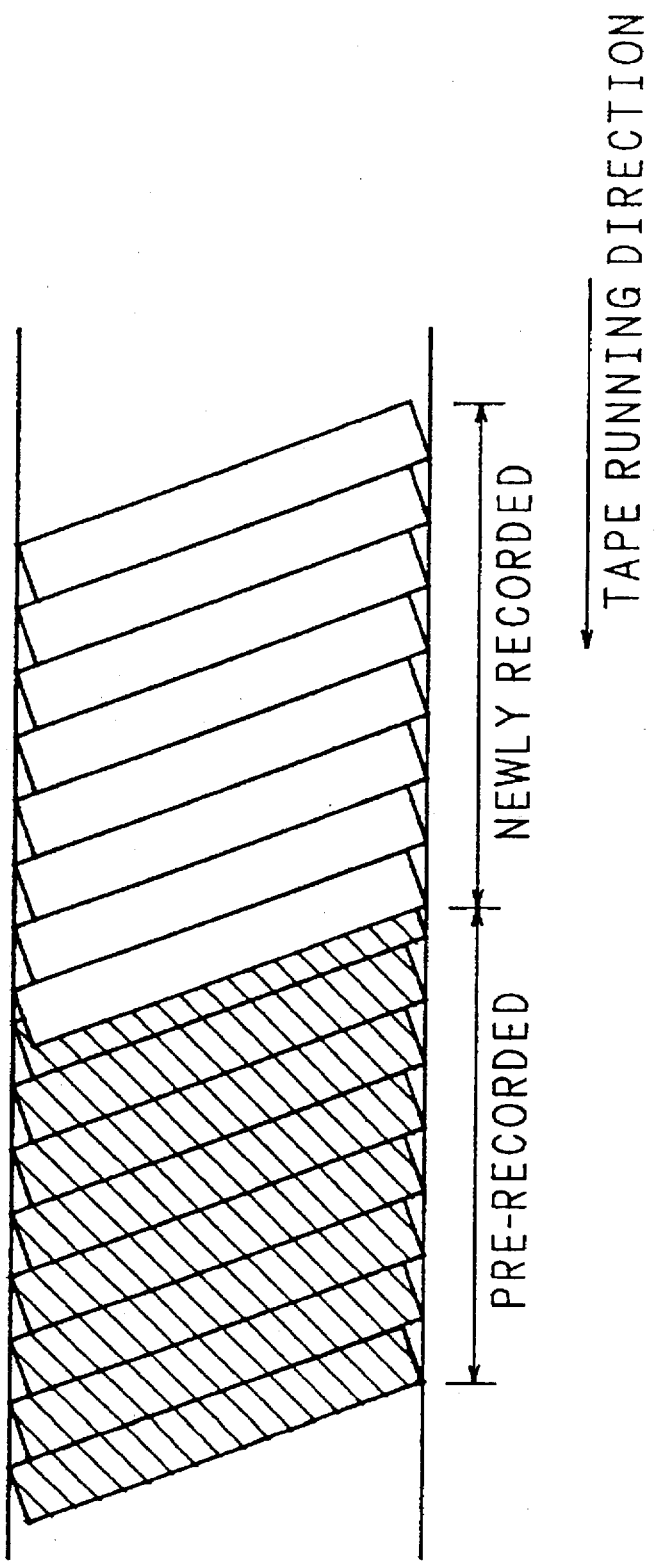
FIG. 11 is a track recording pattern in assemble editing in the conventional digital VTR.

Next will be explained the case of assemble editing by the frame (or a field) using the same digital VTR. In assemble editing, if the data in five tracks preliminarily recorded is partly overwritten at the cut-in point as shown in FIG. 11, the data recorded in the five tracks is not reproduced correctly. In the recording format mentioned above, the visually inconspicuous peripheral video data in one field is gathered and recorded in the fifth track. Therefore, at the cut-in point in the assemble editing, by means of interpolating the video data in the portion not reproduced by the video data in the preceding field, the visual annoyance in the reproduced image becomes inconspicuous. In this embodiment, the data in the peripheral macro blocks recorded in the fifth track at the cut-in point is interpolated by the data in the macro blocks in the preceding field (or preceding frame) stored in the field memories 27a and 27b in the efficient decoder 110. In the embodiment, the cut-in point in reproducing is detected by utilizing an error detection flag detected in the error correction decoder 13. The data interpolated in the field memories 27a and 27b is converted into analog data by the D/A converters 15a through 15c, and outputted from the output terminals 16a through 16c.

Figure 31:
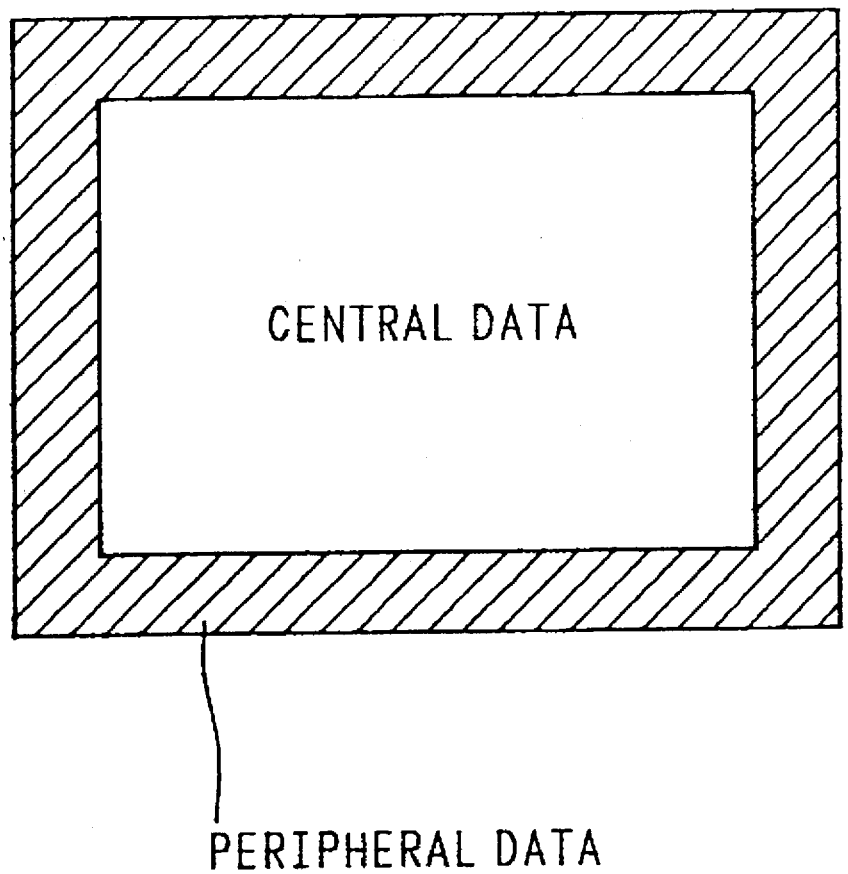
FIG. 31 is a diagram showing reproduced screen in Embodiment 1 of the digital VTR of the invention.

An image of reproduced picture is shown in FIG. 31. The hatched area is the peripheral data of the screen. If the data in the track preliminarily recorded is overwritten in assemble editing and is not reproduced correctly, the visually inconspicuous periphery of the screen in the reproduced image is interpolated by the video data of the preceding field as mentioned above as shown in FIG. 31, so that deterioration in picture quality in the reproduced image becomes visually inconspicuous.

In Embodiment 1, the peripheral macro blocks of the screen are gathered and recorded in one track, and tracking is controlled so that the track that may be possibly overwritten at the cut-in point in assemble editing may coincide with the track in which the peripheral data of the screen is recorded. Tracking control is effected by the one field or one frame. When recording one field in five tracks as in Embodiment 1, since the macro block data in the peripheral area of the screen are gathered and recorded in the fifth track, excellent assemble editing may be realized by the tracking to the beginning track among the tracks for a field.

[Embodiment 2]

The second embodiment of the invention will be described below. The block diagrams of a recording signal processing system, a reproduced signal processing system, an efficient encoder 100, an efficient decoder 110, a recording format generating circuit 101, and a reproduced data synthesizing circuit 113 in the digital signal recording and reproducing apparatus in Embodiment 2 of the invention are same as in Embodiment 1 in both constitution and operation, and their explanations are omitted herein.

Before explaining the operation of the recording format generating circuit 101, the concept of the invention will be described. The digital VTR of Embodiment 2, same as in Embodiment 1, is a two-channel recording system, and the drum rotation speed is 9000 rpm. Hence, one frame is divided and recorded in ten tracks.

In case of a by the frame editing operation using the digital VTR in the embodiment, as shown in FIG. 11, in the same way as in the prior art, the pre-recorded track may be overwritten at the cut-in point (or cut-out point) of editing due to problems in servo precision or track curving special to a VTR, and one track corresponding to 20% of all data in one field may be completely skipped in reproducing.

A recording format of the embodiment will be explained referring to FIGS. 32 and 33, which is capable of obtaining a reproduced image with less visual deterioration in picture quality even if the pre-recorded track is destroyed and is not reproduced correctly.

The recording format in Embodiment 2 is composed so that the visually inconspicuous peripheral macro block video data may be preliminarily recorded on the fifth track at the cut-in point of insert editing and on the first track at the cut-out point. Therefore, if the pro-recorded fifth track is overwritten at the cut-in point in insert editing and if the pre-recorded first track is overwritten at the cut-out point, since the data corresponding to the peripheral area of the screen is recorded in the overwritten fifth and first tracks, a visually favorable reproduced image may be obtained.

Figure 32:
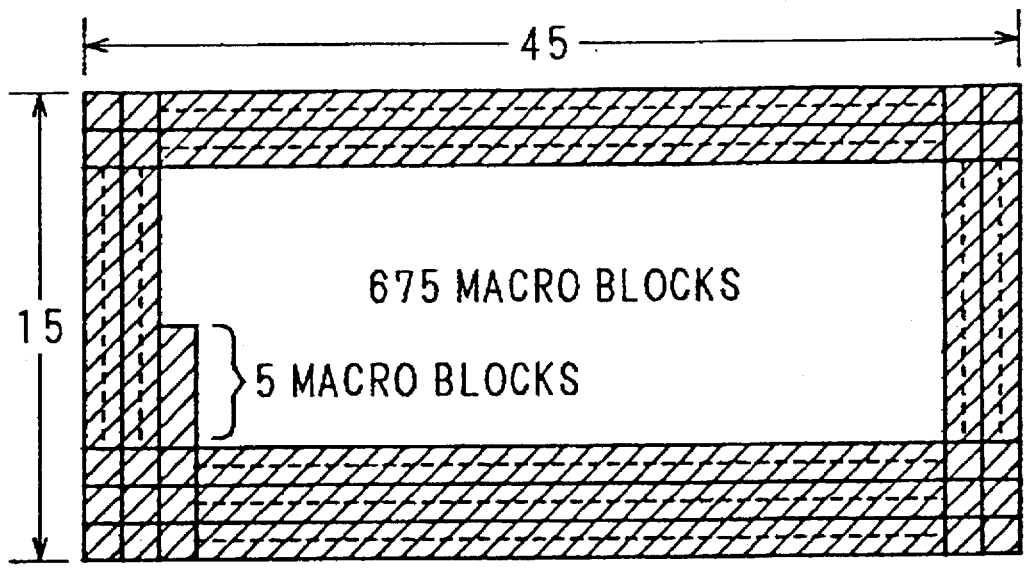
FIG. 32 is a diagram showing dividing method of video data into video data for the center and for the periphery of the screen in Embodiment 2 of the digital VTR of the invention.
Figure 33:
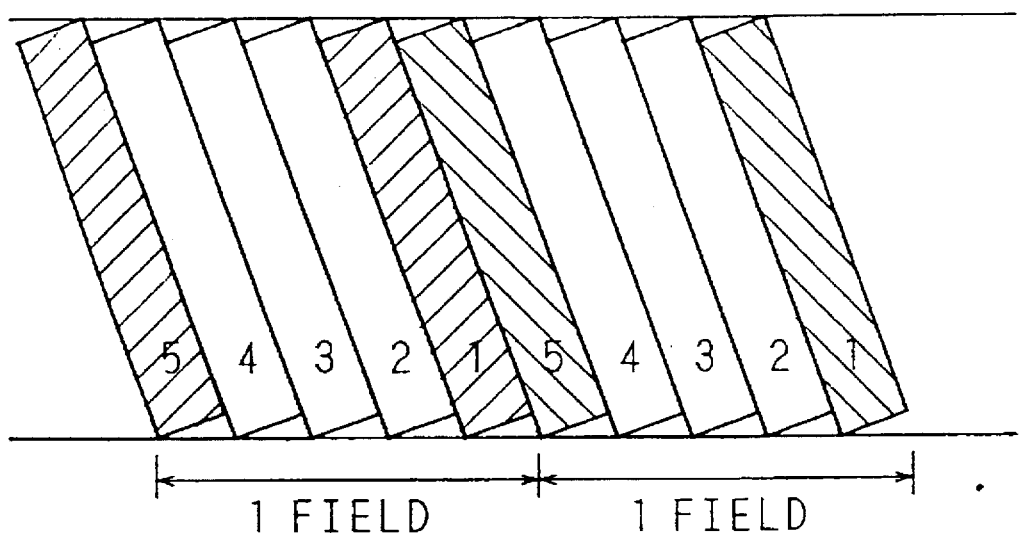
FIG. 33 is a track recording pattern in Embodiment 2 of the digital VTR of the invention.

FIG. 32 is a diagram showing the positions of the peripheral and the central macro blocks video data of one field in this embodiment. The hatched area is the peripheral area of the screen, and the other area is the central are of the screen.

The method of dividing the screen in FIG. 32 into peripheral macro blocks and central macro blocks will be described below in detail. In this embodiment, same as in the prior art, the video signals in one field are composed as shown in FIG. 6, and the composition of macro blocks is same as in FIG. 7. That is, the number of macro blocks per field is 675. In Embodiment 2, also, in order to record the video data of one field in five tracks, the macro block in one field is divided into five sections. The method of division is as follows: the peripheral macro blocks counterclockwise from the lower right corner of the screen are 270 blocks, corresponding to two-fifths of the total 675 macro blocks, and the remaining 405 blocks are central macro blocks.

The operation of the recording format generating circuit 101 of the embodiment is explained in reference to FIG. 27. When data of macro blocks is inputted in the data dividing circuit 201 from the efficient encoder 100, it is divided into the peripheral and the central macro blocks of the screen depending on the position of the macro blocks on the screen through the procedure mentioned above. The data of the macro blocks corresponding to the peripheral area of the screen is inputted in the shuffling circuit 202a to be shuffled, and the data of the macro blocks corresponding to the central area of the screen is inputted in the shuffling circuit 202b to be shuffled. In the embodiment, shuffling is done by the macro block. Shuffling is done by using the random numbers in M series same as in the prior art. The shuffled macro block data is arranged in the recording tracks specified preliminarily by the recording data generating circuit 203 according to the shuffled sequence to generate recording data. In this embodiment, as shown in the recording track pattern of FIG. 33, in five tracks of one field, the peripheral macro block data in the hatched area of the screen in FIG. 32 is recorded in the first track and final fifth track indicated by hatching, and the central macro block data is recorded in the three tracks from the second to the fourth, by controlling the recording data generating circuit 203. The recording data generated and outputted from the recording data generating circuit 203 is fed to the error correction encoder 4.

The operation of the reproduced data synthesizing circuit 113 is same as the operation shown in the foregoing embodiment, and is not explained herein.

The case of insert editing by the frame (or field) using the digital VTR of Embodiment 2 will be explained below. In insert editing, if the data of the fifth or first track preliminarily recorded at the cut-in point or cut-out point is overwritten, the data recorded in the fifth or first track is not reproduced correctly at the cut-in point or cut-out point at the time of reproducing. In this recording format, however, the data in the visually inconspicuous peripheral area of the screen in one field is gathered and recorded in the first track and fifth track. Therefore, the video data in the portion not reproduced at the cut-in point or cut-out point in insert editing is interpolated with the video data in the preceding field, so that the visual annoyance in the reproduced image may become inconspicuous. The interpolation is conducted in the field memories 27a and 27b in the same way as in Embodiment 1.

The digital VTR of the embodiment is thus composed, and if the data in the pre-recorded track is overwritten and is not reproduced correctly in insert editing, since the visually inconspicuous peripheral macro block data in the reproduced image is recorded in those tracks, the reproduced image with less visual deterioration in picture quality is obtained by interpolating with video signal in the preceding field. The image of the reproduced picture of Embodiment 2 is also same as shown in FIG. 31 in Embodiment 1.

In Embodiment 2, the peripheral macro blocks of the screen are gathered and recorded in two tracks, and tracking is controlled so that the track possibly overwritten at the cut-in point or cut-out point in insert editing may coincide with the track in which the peripheral data of the screen is recorded (that is, the beginning track of each field recorded preliminarily). The tracking control is effected by the one field or one frame. When recording one field in five tracks as in Embodiment 2, in order to record the peripheral macro block data of the screen by gathering it in two tracks (the beginning track and last track of each field), the tracking is controlled so that the beginning track in insert editing may coincide with the beginning track of the track of each field, and therefore favorable insert and assemble editing may be realized.

[Embodiment 3]

A third embodiment of the invention will be described. The block diagrams of a recording signal processing system, a reproduced signal processing system, an efficient encoder 100, an efficient decoder 110, a recording format generating circuit 101, and a reproduced signal synthesizing circuit 113 in the digital VTR of Embodiment 3 of the invention are same as in Embodiments 1 and 2 in both constitution and operation, and hence their explanation is omitted.

The concept of the invention will be described below prior to an explanation of the operation of the recording format generating circuit 101. The digital VTR of Embodiment 3 is also of two-channel recording system same as in the foregoing embodiments, and the drum rotation speed is 9000 rpm. Hence, one frame is divided and recorded in ten tracks.

In the embodiment, same as in the prior art, the pre-recorded track is overwritten at the cut-in point (or cut-out point) of editing due to problems in servo precision or track curving special to the VTR in editing by the frame, and one track corresponding to 20% of all data in one field is completely skipped in reproducing.

The recording format of the embodiment will be explained in reference to FIG. 34, capable of obtaining a reproduced image with less visual deterioration in picture quality even if the pre-recorded track is destroyed and is not reproduced correctly.

In Embodiment 3, the recording format is composed so as to record the macro block video data corresponding to the peripheral area on the screen may be recorded in the tenth track of ten tracks in one frame to be the cut-in point in insert editing by the frame, and in the first track of ten tracks in one frame to be the cut-out point. Therefore, if the tenth track in one frame of the pre-recorded data is overwritten at the cut-in point in insert editing or if the first track in one frame of the pre-recorded data is overwritten at the cut-out point, since the data in the peripheral area of the screen is recorded in the tenth and first tracks being overwritten at the time of reproducing, a visually favorable reproduced image is obtained.

The method of dividing into the peripheral macro blocks and central macro blocks in the embodiment is similar to the case of Embodiment 1 shown in FIG. 29, that is 135 macro blocks corresponding to one fifth of the number of macro blocks of 675 are gathered as the peripheral macro blocks of the screen, while the remaining 540 macro blocks are the central macro blocks of the screen.

Figure 34:
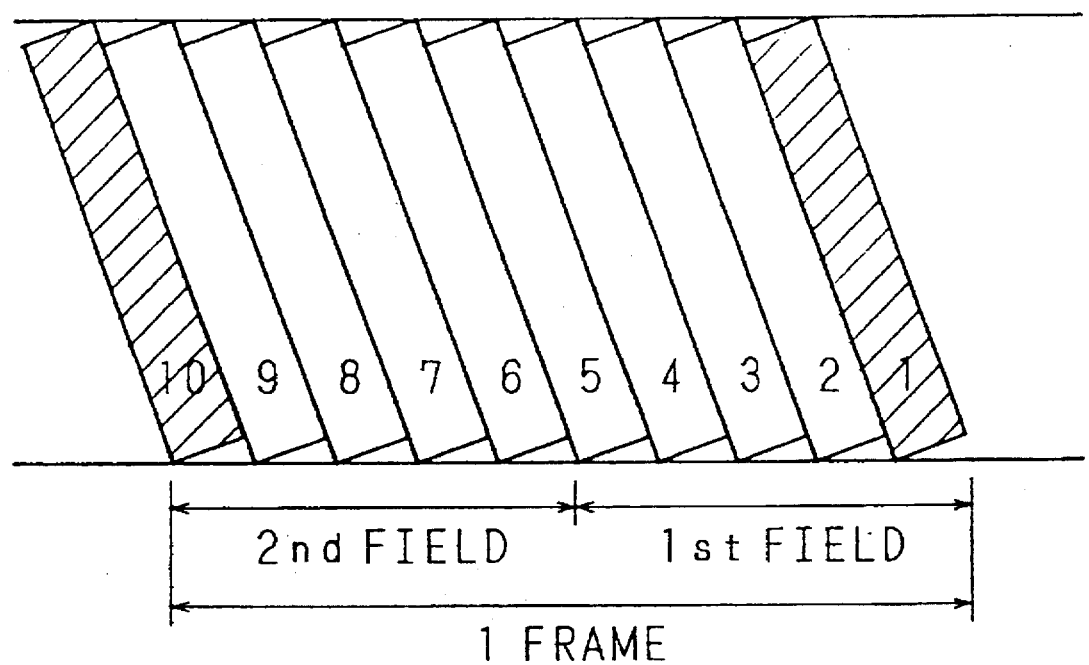
FIG. 34 is a track recording pattern in Embodiment 3 of the digital VTR of the invention.

In Embodiment 3, the data is divided same as in Embodiment 1 and shuffled individually, and the recording track pattern is set by the one frame as shown in the recording track pattern in FIG. 34. Of the five tracks for recording the first field, the peripheral macro blocks of the screen of the video signal of the first field are recorded in the first track indicated by a hatched area, and the central macro blocks of the screen are recorded from the second to the fifth tracks, by controlling the recording data generating circuit 203. Of the five tracks for recording the second field, the central macro blocks of the screen of the second field are recorded in the first four tracks, and the peripheral macro blocks of the screen are recorded in the final fifth track indicated by a hatched area, by controlling the recording data generating circuit 203. Thus, the recording data generated and outputted from the recording data generating circuit 203 is outputted to the error correction encoder 4.

The operation of the reproduced data synthesizing circuit 113 in the embodiment is same as the operation shown in the foregoing embodiments, and the explanation thereof is omitted.

In Embodiment 3, the data in the pre-recorded track may be overwritten at the cut-in point or cut-out point in case of insert editing by the one frame, and the data in the pre-recorded track may not be reproduced correctly. In this recording format, by recording the visually inconspicuous peripheral video data of the screen of one frame by gathering them in the first and tenth tracks and interpolating the video data in the portion not reproduced at the cut-in point or cut-out point in insert editing with video data in the preceding field, the visual annoyance in the reproduced image may become inconspicuous.

The image of the reproduced picture in Embodiment 3 is same as shown in FIG. 31 in Embodiment 1.

In Embodiment 3, the peripheral macro blocks of the screen in one frame are gathered and recorded in two adjacent recording tracks, and the tracking is controlled so that the the track possibly to be overwritten at the cut-in point or cut-out point in insert editing may coincide with the track in which the peripheral data of the screen is recorded. (In this embodiment, it is controlled to rewrite from the beginning track of each frame recorded preliminarily.) Track control is effected by the one frame. In Embodiment 3, when recording one frame in ten tracks, the peripheral macro block data of the screen are gathered and recorded in two tracks (the beginning track and final track of each frame), and therefore excellent assemble and insert editing may be realized by matching the track to be edited with the beginning track of the tracks recording each frame by tracking control.

When the minimum editing unit is the frame as in Embodiment 3 of the invention, to record the video data of one frame in ten tracks, the peripheral data of the even fields (odd fields) is recorded in the first track, the peripheral data of the odd fields (even fields) is recorded in the tenth track, and the data for the central area of the screen of each field is recorded in the remaining eight tracks. The same effects may be brought about by recording half of the peripheral data of the odd fields and half of the peripheral data of the even fields in the first track, and the remaining peripheral data of each field in the tenth track.

[Embodiment 4]

In the foregoing Embodiments 1 through 3, the number of macro blocks to be recorded in each recording track and the recording tracks where the peripheral macro block data of the screen is to be arranged are preliminarily determined. Therefore, the data divided into the peripheral and the central macro blocks of the screen in the shuffling circuit 202 of the recording format generating circuit 101 in recording are shuffled according to the corresponding shuffling tables. The individually shuffled macro block data are recorded in the predetermined recording tracks. When reproducing, on the other hand, whether a macro block is a peripheral or a central macro block of the screen is judged, depending on the track position, by the reproduced data dividing circuit 301 in the reproduced data synthesizing circuit 113, and the peripheral and the central macro blocks of the screen are individually deshuffled in the de-shuffling circuits 302 according to the corresponding deshuffling tables.

By contrast, in Embodiment 4, the number of macro blocks to be recorded in one recording track is not specified.

Figure 35:
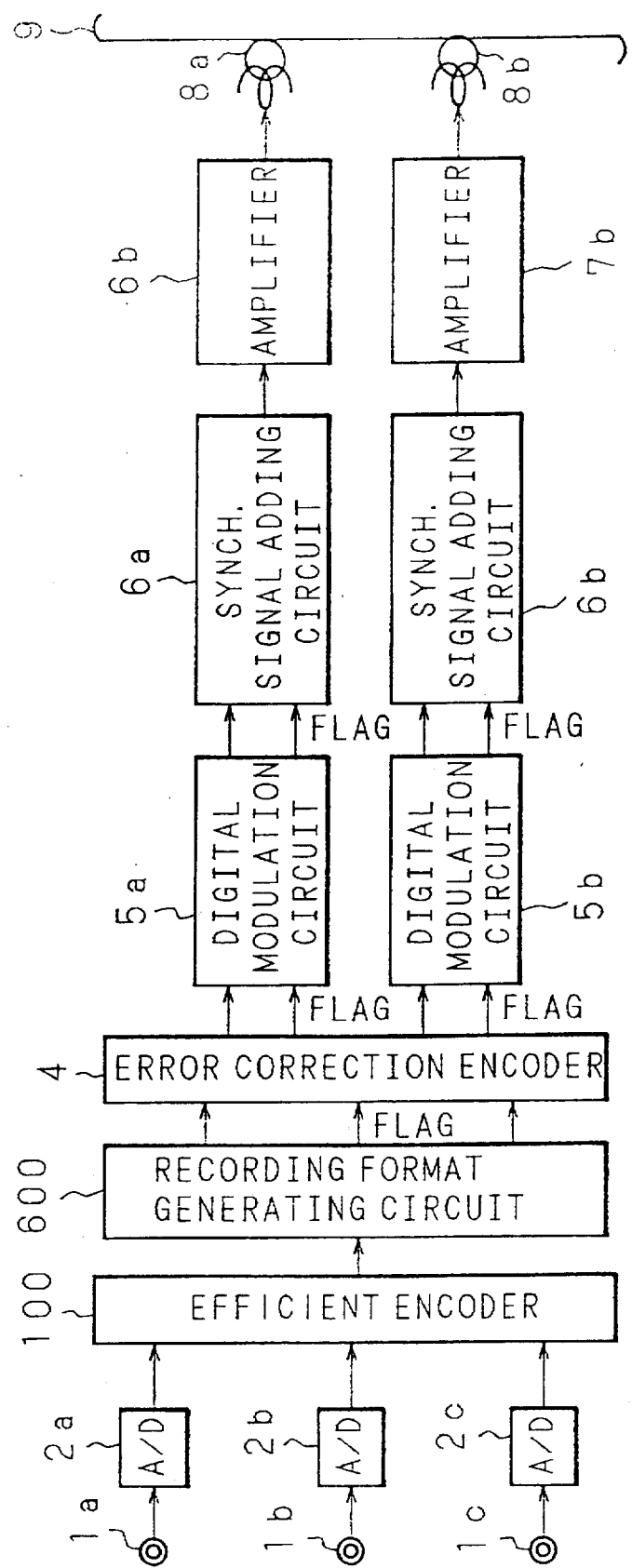
FIG. 35 is a block diagram of a recording system in Embodiment 4 of the digital VTR of the invention.

Embodiment 4 of the invention will be described below in referring to the drawings. FIG. 35 is a block diagram of a digital VTR according to the fourth embodiment of the invention. In the diagram, numerals 1 through 16, 100 and 110 designate the same parts as in Embodiment 1, and are not explained herein. Numeral 600 designates a recording format generating circuit, and 700 designates a reproduced data synthesizing circuit, and in this embodiment, in the recording format generating circuit 600, a division detection flag (hereinafter to be called a flag for short) is recorded at the record starting position of the peripheral data.

The block diagram of the efficient encoder 100 and the efficient decoder 110 of the digital VTR of Embodiment 4 of the invention are the same as FIG. 25 and FIG. 26 in both constitution and operation, and hence the explanation is omitted.

Furthermore, the operation of the recording system and the reproducing system except for the recording format generating circuit 600 and the reproduced data synthesizing circuit 700 are same as in the foregoing embodiments, and the explanation thereof is omitted.

Figure 37:
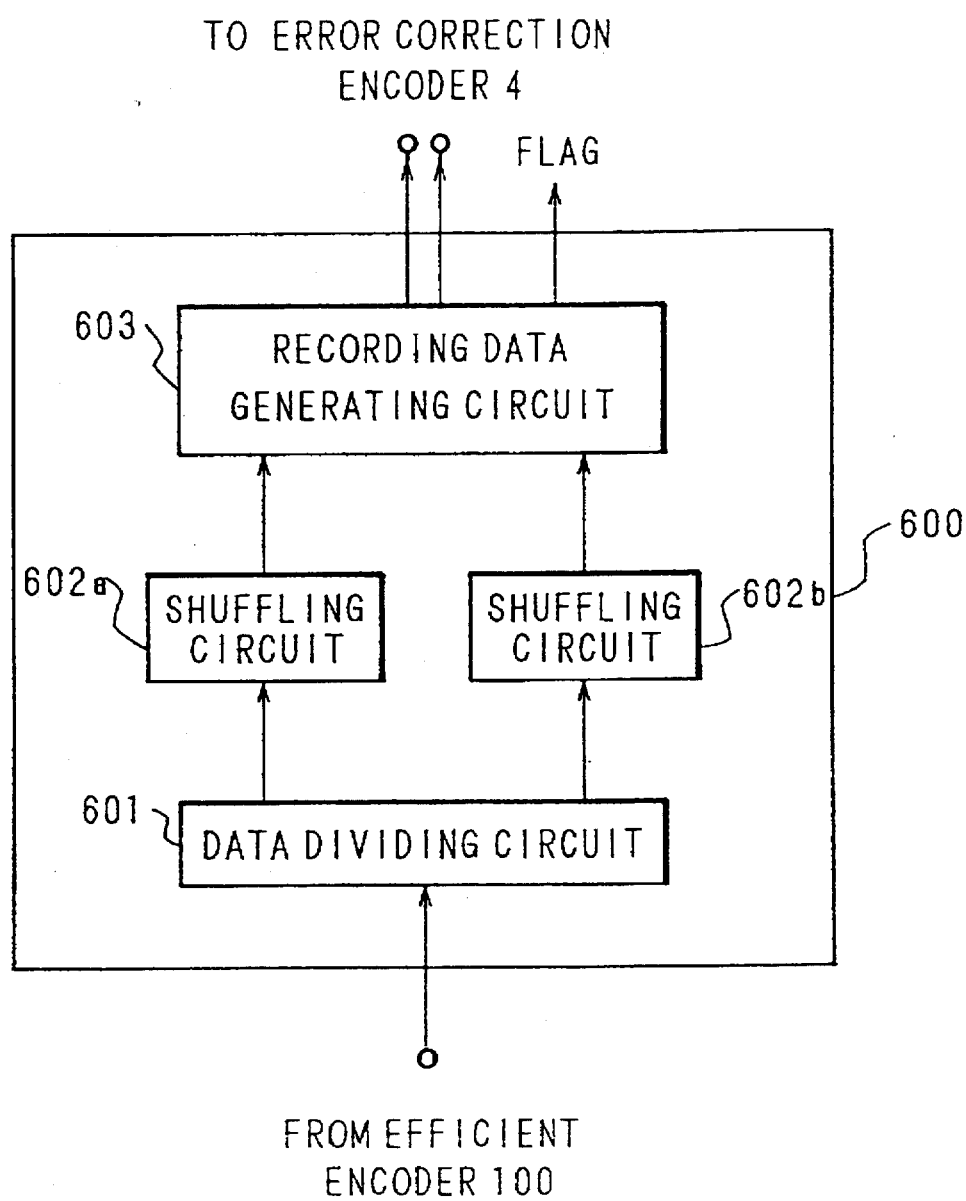
FIG. 37 is a block diagram of a recording format generating circuit mounted on the digital VTR of the invention of Embodiment 4.

FIG. 37 is a block diagram of the recording format generating circuit 800 of the digital VTR in Embodiment 4 of the invention. In the diagram, numeral 801 denotes a data dividing circuit for dividing the recording data inputted by the macro block of FIG. 7 into the peripheral data and the central data depending on the position on the screen, and 602a and 602b designate shuffling circuits for shuffling the macro block data divided into the peripheral area data and the central area data depending on the position of the recording data on the screen. Numeral 603 denotes a recording data generating circuit for generating recording data on the five tracks in the following sequence: outputting the central macro block data in one field outputted from the one shuffling circuit 602b, attaching the division detecting flag for judging whether the data is the peripheral data or the central data of the screen, and thereafter outputting the peripheral macro block data of the screen outputted from the other shuffling circuit 602a, then outputting data 0 for the remaining area.

Figure 7C:
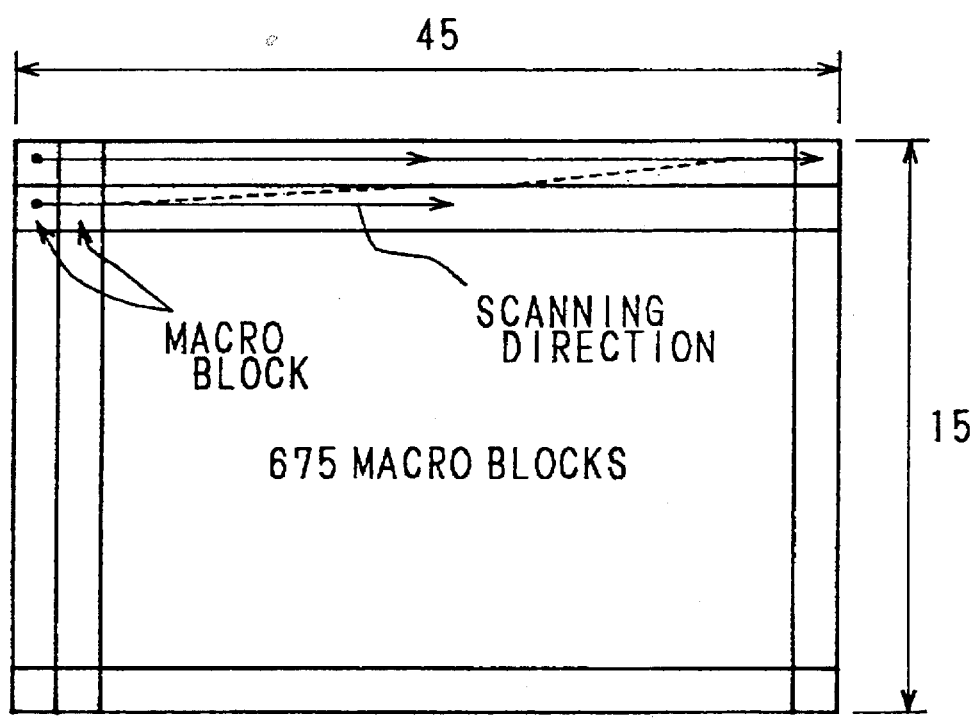
FIG. 7(c) is an explanatory diagram of macro blocks.
Figure 8:
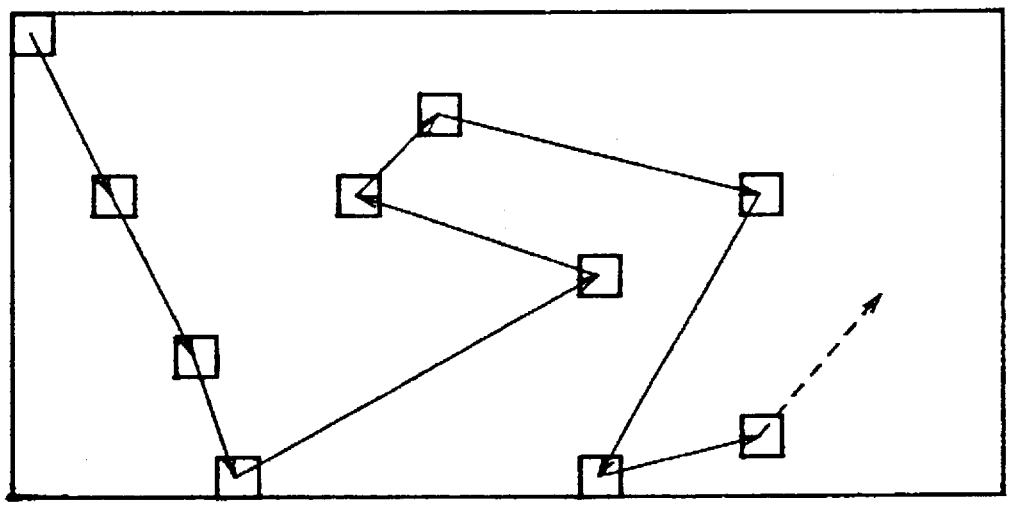
FIG. 8 is an explanatory diagram of shuffling method of macro blocks.
Figure 9:
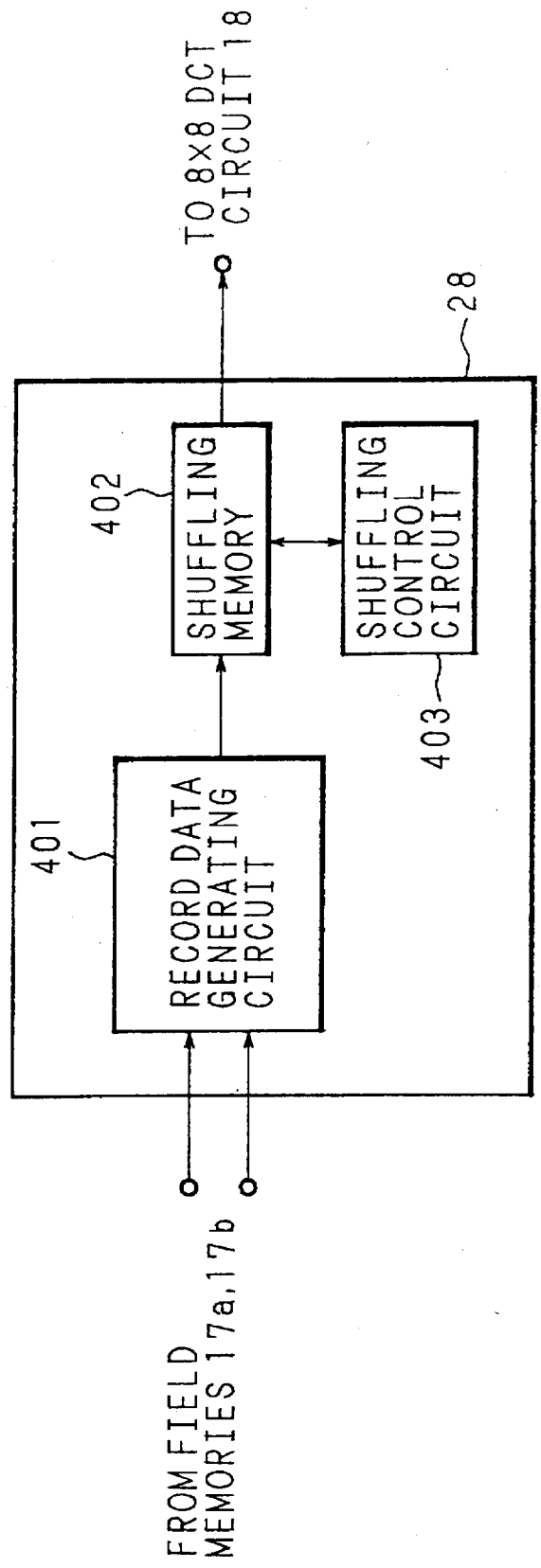
FIG. 9 is a block diagram of a conventional shuffling circuit.
Figure 10:
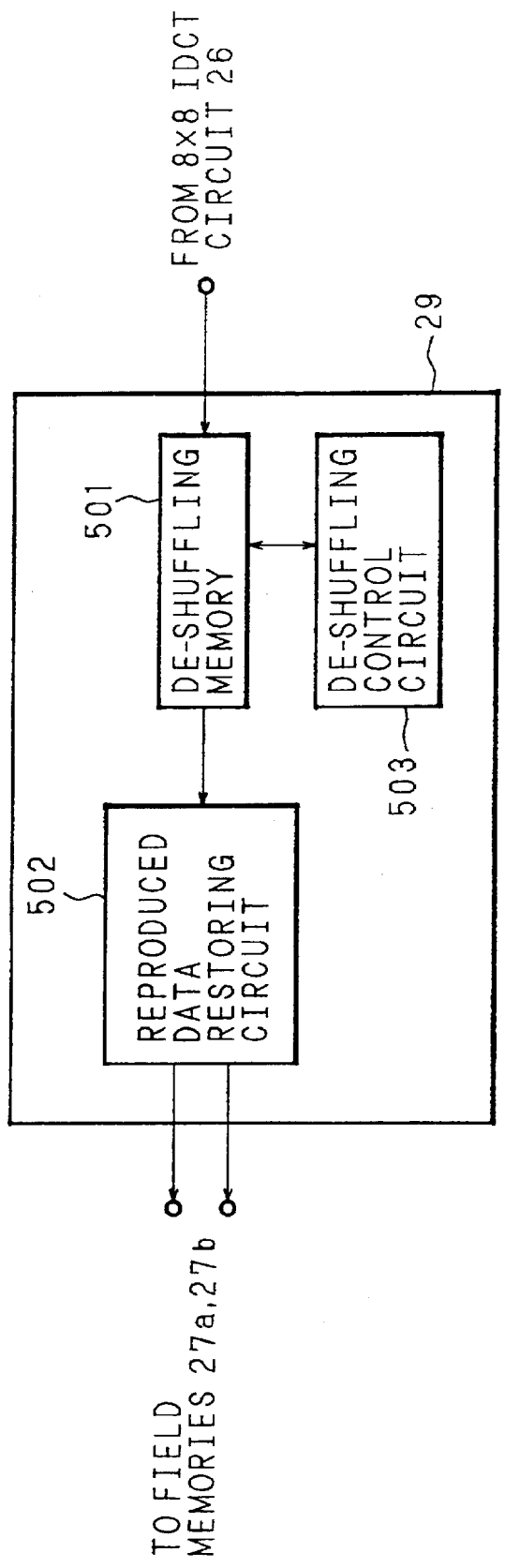
FIG. 10 is a block diagram of a conventional de-shuffling circuit.
Figure 38:
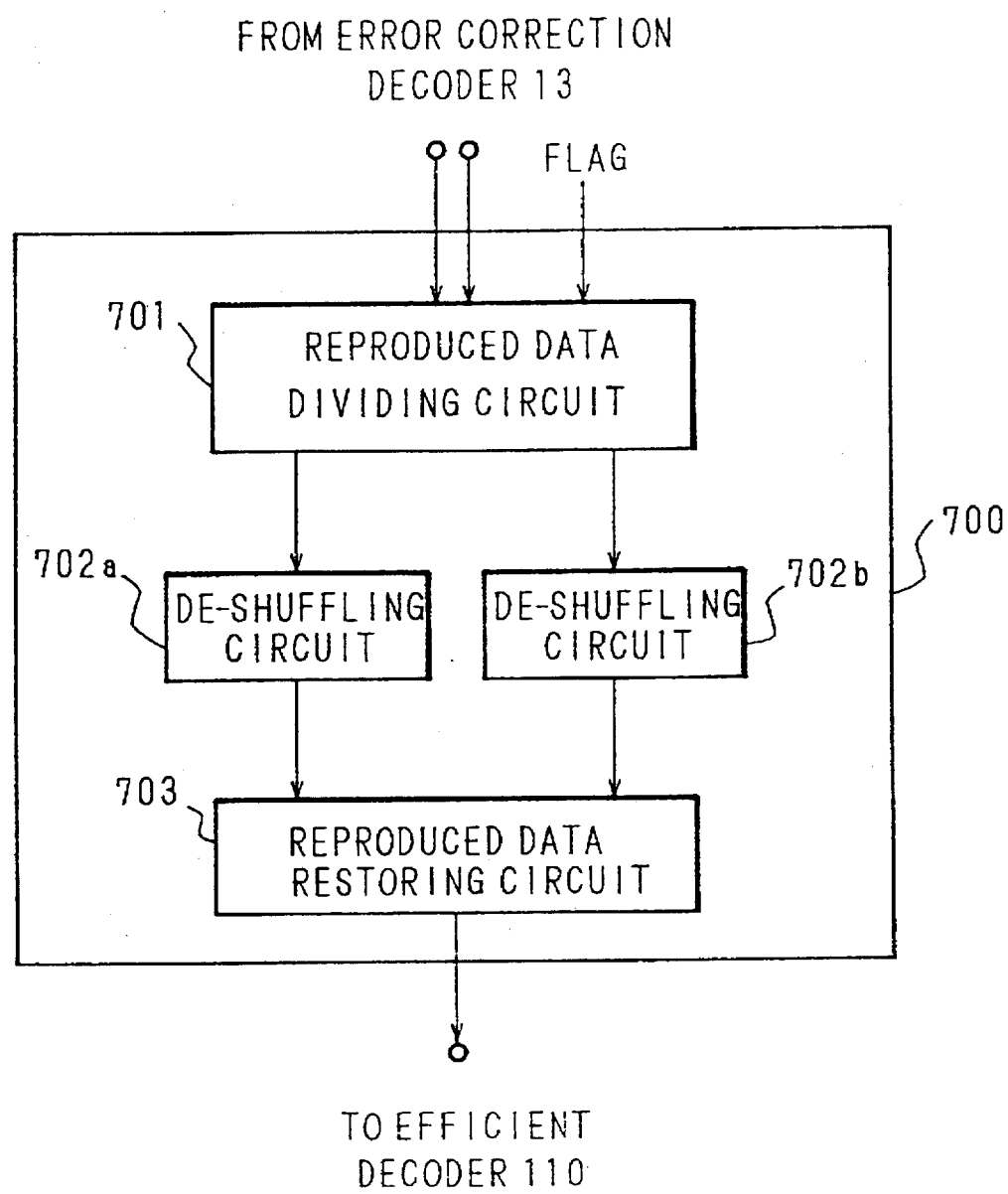
FIG. 38 is a block diagram of a reproduced data synthesizing circuit mounted on the digital VTR of the invention of Embodiment 4.

FIG. 38 shows a block diagram of the reproduced data synthesizing circuit 700. In the diagram, numeral 701 denotes a reproduced data dividing circuit to divide the reproduced data inputted from the error correction decoder 13 into the peripheral data and the central data by judging whether the data is the peripheral data or the central data of the screen on the basis of the division detection flag attached to the reproduced data, and 702a and 702b designate de-shuffling circuits for deshuffling the macro block data divided by the reproduced data dividing circuit 701 on the basis of the respective deshuffling tables. Numeral 703 designates a reproduced data restoring circuit for combining, again, the reproduced data divided into two and deshuffled into one, and restoring the original arrangement of the macro blocks as shown in FIG. 7(c).

In Embodiment 4, same as in Embodiment 1, the two-channel recording method is employed and the video data in one frame is recorded in ten tracks. This recording format of Embodiment 4 will be explained below.

Figure 39:
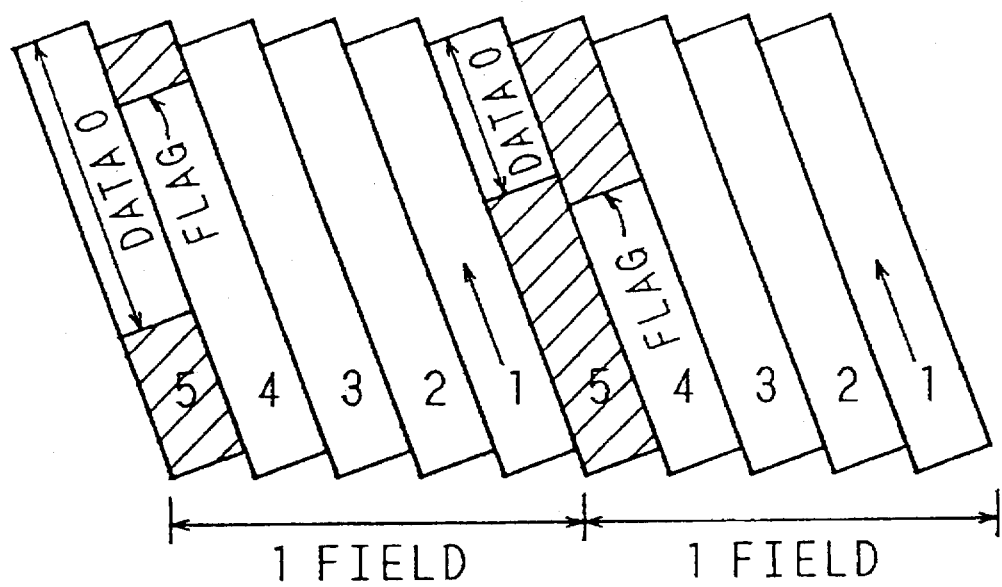
FIG. 39 is a track recording pattern in Embodiment 4 of the digital VTR of the invention.

FIG. 39 shows the data layout on recording tracks of length of the variable-length coded coefficients in one DCT block are different from each other, the data quantity of one DCT block varies with the position on the screen or the type, of image. Therefore, data quantity is not controlled in the buffer controller 22 by the track, but by the field or by the several fields. Such case will be explained below.

The operation of the recording format generating circuit 600 of Embodiment 4 shown in FIG. 37 and FIG. 39 will be described. In the recording data generating circuit 600, the data dividing circuit 601 judges whether the recording data, curtailed in recording bit rate by the efficient encoder 100, is a peripheral macro block or a central macro block of the screen depending on the position of each macro block data on the screen. The macro block judged to be a peripheral macro block of the screen by the data dividing circuit 601 is fed into the one shuffling circuit 602a, while a macro block judged to be the central macro block of the screen by the data dividing circuit 601 is fed into the other shuffling circuit 602b; and both are shuffled respectively. The shuffled macro block data are rearranged from the central macro block of the screen in the recording data generating circuit 603.

On the magnetic tape 9, as shown in FIG. 39, the data rearranged from the central macro block of the screen in the recording data generating circuit 603 is sequentially recorded from the first track to the second, third, fourth and fifth track. At this time, when the shuffled central macro block data of the screen is recorded and recording of central macro block data of the screen is over, a division detection flag is set, and the shuffled peripheral macro block data of the screen is recorded in succession. (Incidentally, the division detection flag may not be recorded, or it may be written in the ID data.) Since the recording data is coded in variable-length in the efficient encoder 100, and the code length in one macro block is not constant. In Embodiment 4, unlike Embodiments 1, 2 and 3 where the number of macro blocks is determined by buffer control by the track, it is intended to record the data by buffer control by the field.

FIG. 39 shows an example of data configuration on the recording tracks in Embodiment 4. In this embodiment, data recording may be finished before all five tracks are filled up in data recording of one field on the tracks. In this case, after finishing to record the peripheral macro block data of the screen, data 0 is recorded in the remaining area of the fifth track, thereby filling up all five tracks. Furthermore, since the recording rate of the recording data is controlled by the buffer controller 22 not to exceed the data quantity to be recorded in the five tracks, overflow does not occur. The recording data whose macro block arrangement on the recording tracks is determined in the recording data generating circuit 803 is outputted to the error correction encoder 4.

The operation of the reproduced data synthesizing circuit 700 of the embodiment shown in FIG. 39 will be described below. In the reproduced data synthesizing circuit 700, the reproduced data inputted from the error correction decoder 13 is judged to be either a central macro block of the screen or a peripheral macro block of the screen, based on the division detection flag set in the recording format circuit 600 by the reproduced data dividing circuit 701. The reproduced data is then divided into the central macro block of the screen and the peripheral macro block of the screen. The macro blocks judged to be peripheral macro block of the screen by the reproduced data dividing circuit 701 are fed in the de-shuffling circuit 702a, the macro block judged to be central macro block of the screen by the reproduced data dividing circuit 701 are fed into the deshuffling circuit 702b, and both are deshuffled. The reproduced data deshuffled in the de-shuffling circuits 702a and 702b are synthesized into one by synthesizing the peripheral macro block and central macro block of the screen in the reproduced data restoring circuit 703 to restore the original macro block arrangement shown in FIG. 7(c). The reproduced data restored in the original macro block data in the reproduced data restoring circuit 703 is outputted to the efficient decoder 110.

In the digital VTR of Embodiment 4, the editing operation will be explained below. In Embodiment 4, same as in Embodiments 1 through 3, in case of editing operation, the pre-recorded track may be overwritten and destroyed at the cut-in point (or cut-out point) of editing as shown in FIG. 11 in the prior art due to problem in servo precision or track curving special to the VTR.

In this recording format, however, as shown in Embodiment 1, the visually inconspicuous peripheral data of the screen in the video signals of one field is recorded on the last fourth or fifth tracks for recording each field and data 0 is recorded in the remaining area of the fifth track, as shown in FIG. 39. Therefore, by interpolating the video data of the portion not reproduced at the cut-in point of assemble editing by the video data in the preceding field, visual annoyance in the reproduced image may become inconspicuous. The interpolation of the preceding field is effected by the field memories 27a and 27b in the efficient decoder 110 same as in the foregoing embodiments.

Incidentally, in Embodiment 1, the peripheral macro block data of the screen is recorded specifically in the final fifth track of one field, but in this embodiment, the data of macro blocks different in data quantity by variable-length coding is recorded as far as possible in the data length, regardless of the number of macro blocks, sequentially from the first track by the variable-length coded word so as to record the data continuously. Therefore, if the data recorded in the final fifth track is not reproduced correctly due to overwriting at the time of insert editing and the peripheral macro block of the screen is recorded therein, depending on the image data, and further if the degree of shortening of data length in variable-length coding is large, data 0 may be recorded often, and the quantity of data not reproduced correctly, is smaller, so that a favorable reproduced image with less visual annoyance may be obtained.

The image of the reproduced picture in Embodiment 4 is also same as in the embodiment shown in FIG. 31.

In Embodiment 4, the peripheral macro blocks of the screen in one frame are controlled so as to be continuously recorded in the recording track closer to the last one among the recording tracks of one frame as shown in FIG. 37, and the cut-in point in assemble editing is controlled to match the first track in each field of the pre-recorded data. By such tracking control, though the fifth track of the preceding field is destroyed by overwriting due to the effect of track curving or the like, it is the track in which the data of the peripheral part of the screen is recorded, and the macro block data not reproduced correctly is interpolated by the video data of the preceding field, so that a visually favorable reproduced image may be obtained.

[Embodiment 5]

The fifth embodiment of the invention will be described hereinafter by referring to the drawings. The block diagram of the digital VTR in Embodiment 5 the same as in Embodiment 4 shown in FIG. 35, in both constitution and operation, and the explanation thereof is omitted.

The block diagrams of the efficient encoder 100 and efficient decoder 110 of the digital VTR in Embodiment 5 are also the same as in FIG. 25 and FIG. 26 in both constitution and operation, and the explanation is omitted.

Moreover, the block diagrams of the recording format generating circuit 600 and reproduced data synthesizing circuit 700 of the digital VTR of Embodiment 5 are also same as in FIG. 37 and FIG. 38, and their explanation is omitted, too.

In Embodiment 5, same as in Embodiment 1, the two-channel recording system is employed, and the video data in one frame is recorded in ten tracks.

Figure 40:
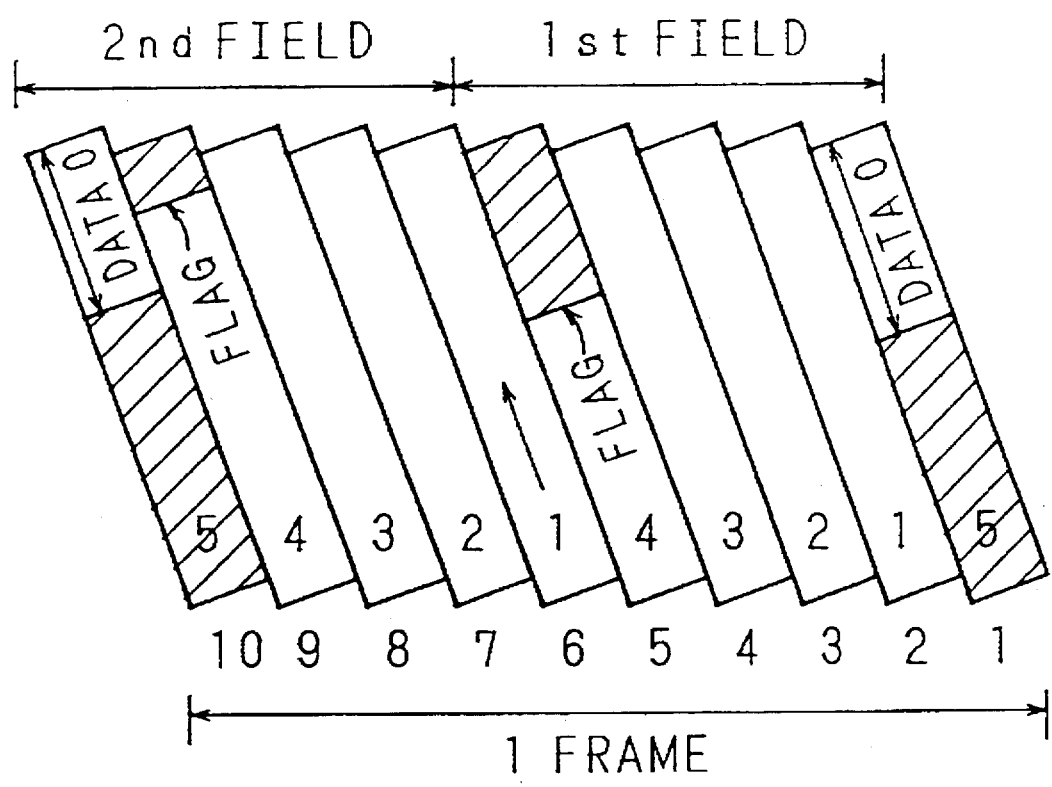
FIG. 40 is a track recording pattern in Embodiment 5 of the digital VTR of the invention.

FIG. 40 is a diagram showing the recording format of Embodiment 5.

Referring to FIG. 37 and FIG. 40, the operation of the recording format generating circuit 600 of Embodiment 5 will be described. In the recording data generating circuit 600, when the recording data, curtailed in recording bit rate by the efficient encoder 100, is inputted, it is judged in the data dividing circuit 601 whether it a peripheral macro block or a central macro block of the screen depending on the position of each macro block data on the screen, The macro block judged to be the peripheral macro block of the screen by the data dividing circuit 601 is inputted by the shuffling circuit 602a, the macro block judged to be the central macro block is inputted by the shuffling circuit 602b, and the both are shuffled. The shuffled macro block data are rearranged sequentially from the central macro block by the recording data generating circuit 603. On the magnetic tape 9, as shown in FIG. 40, the video data of one frame is recorded from the first track to the second and so forth sequentially to the ninth and tenth track. At this time, in the first field of one frame, the quantity of data is sequentially counted from the central data of the screen by the recording format generating circuit 600, and the data to be recorded is assigned in five tracks, individually. Consequently, as shown in FIG. 40, the divided image data assigned to be recorded in the fifth track (mostly peripheral data) is recorded in the first track and the central data is recorded from the second track.

In the second field, on the other hand, same as in Embodiment 4, the central data of the screen is to be controlled to be recorded sequentially from the sixth track by the recording format generating circuit 600. In the same way as in the first field, when recording the video data of the second field, the division detection flag is recorded at the end of the central macro block of the screen as shown in FIG. 40. (The division detection flag is not always necessary to be recorded, or may be written in the ID data.) Since the recording data is variable-length coded in the efficient encoder 100, the code length in one macro block is not constant. In Embodiment 5, different from Embodiments 1, 2 and 3, instead of setting by the number of macro blocks that can be recorded by buffer control by the track, data is recorded by buffer control by the field. In this embodiment, incidentally, when recording the recording data of one field on the tracks, data recording may be terminated before all five tracks are filled up. In such case, from the end point of recording of the peripheral macro block data of the screen to the end of that track, data 0 is recorded to fill up the fifth track. Since the recording rate of recording data is controlled by the buffer controller 22, overflow does not occur from exceeding the quantity of data that can be recorded in five tracks. The recording data determined in the macro block layout on the recording track by the recording data generating circuit 603 is outputted to the error correction encoder 4.

The operation of the reproduced data synthesizing circuit 700 in Embodiment 5 is same as in Embodiment 4, and the explanation is hence omitted herein.

In Embodiment 5, same as in Embodiment 3, the data in the pre-recorded track may be overwritten at the cut-in point or cut-out point through insert editing by the frame, and data may not be reproduced correctly.

If the data in the pre-recorded track may be overwritten at the cut-in point or cut-out point in insert editing by the frame, and data may not be reproduced correctly, in Embodiment 5, by recording the relatively and visually inconspicuous peripheral data of the screen in the reproduced image in the video data of one field (or one frame) by gathering the data in the first and tenth tracks of one frame which may be possibly overwritten, the macro block data which is not correctly reproduced at the cut-in point or cut-out point in insert editing is interpolated from the data of the preceding field (or frame), so that a visually favorable reproduced image may be reproduced.

In Embodiment 5, since the buffer control is effected by the field, it cannot be so specified, as in Embodiment 3, that the peripheral data of the screen may be recorded in one track. Therefore, in Embodiment 5, the data different in the quantity of recording data in the macro blocks by variable-length coding is shuffled. After dividing the data into the peripheral macro block data and the central macro block data of the screen, the quantity of recording data is sequentially counted from the central data of the screen, and the data to be recorded in five tracks is assigned. In the embodiment, recording format complete in one frame is employed as shown in FIG. 40. Thus, the video data of the first field in each frame is recorded by controlling the recording format control circuit 600 so that the data including the peripheral macro blocks of the screen divided in the fifth track may be recorded on the first track as shown in FIG. 40. The central data of the screen is recorded from the second track in Embodiment 5. In the second field, same as in Embodiment 4, the central data of the screen may be controlled to be recorded sequentially from the sixth track.

In this way, almost all data of the peripheral area of the screen in each frame is recorded in the first and tenth tracks as shown in FIG. 40. Because of such a recording data generating method, even if the data recorded in the first and tenth tracks of one frame is not reproduced correctly due to overwriting at the time of assemble editing, the visually inconspicuous peripheral macro blocks of the screen in the reproduced image are mostly recorded. Depending on the pattern of the image, the quantity of data 0 increases, the quantity of data reproduced not correctly decreases, and a favorable reproduced image with inconspicuous joints may be obtained. In Embodiment 5, because of the code quantity control by the buffer controller 22 by the field, data will not overflow from the five tracks.

The image of the reproduced picture in Embodiment 5 is the same as in the foregoing embodiment shown in FIG. 31, and the explanation thereof is omitted.

In Embodiment 5, the peripheral macro blocks of the screen in one frame are recorded in two tracks, the beginning and the last, of the recording tracks as shown in FIG. 40, and the cut-in point which is the starting point, of writing in insert editing, is set to be the first track in each frame. By such tracking control, if the tenth track of the preceding frame at the cut-in point is overwritten and destroyed due to the effect of track curving or the like, or if the first track of the succeeding field at the cut-out point is overwritten and destroyed, since these are the tracks in which the peripheral data of the screen is recorded, a visually favorable reproduced image is obtained by interpolating with the data in the preceding field (or preceding frame). If the minimum unit in editing, is a frame as in Embodiment 5, then in recording the video data of one frame on ten tracks, the peripheral data of even fields (odd fields) may be recorded in the first track, the peripheral data of odd fields (even fields) may be recorded in the tenth track, and the central data of the screen of each field may be recorded in the remaining eight tracks. Alternatively, half of the peripheral data of the odd fields and half of the peripheral data of the even fields may be recorded in the first track, and the remaining peripheral data of both fields may be recorded in the tenth track, to bring about the same effects. Or, as shown in Embodiment 2, when recording the video data of one field in five tracks, the same effects are obtained by gathering and recording the peripheral data of the screen in the first and fifth tracks.

[Embodiment 6]

Figure 12:
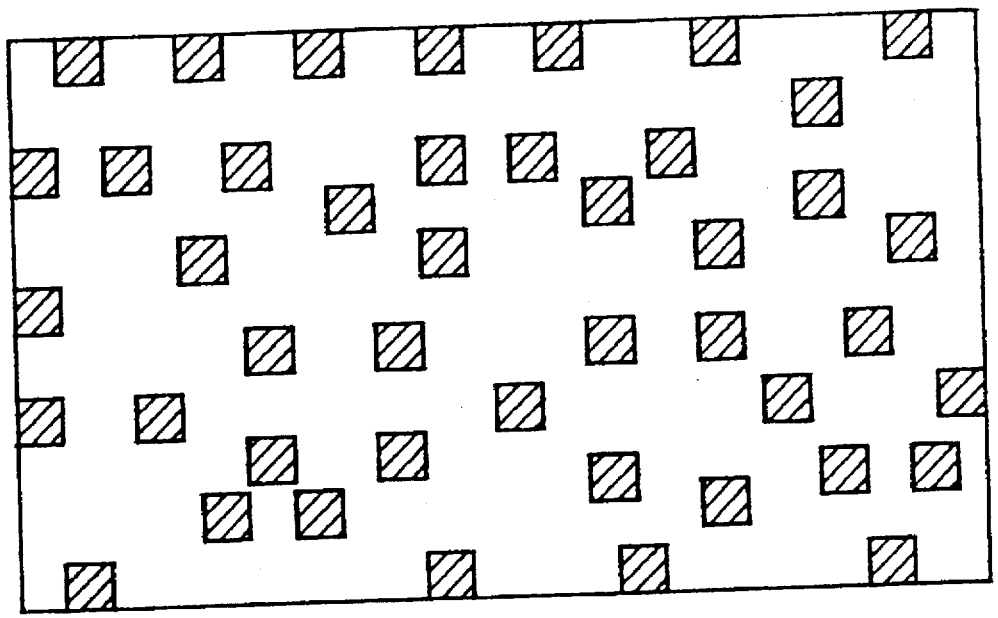
FIG. 12 is a diagram showing macro blocks of preceding fields scattering about reproduced screen in the conventional digital VTR.
Figure 13:
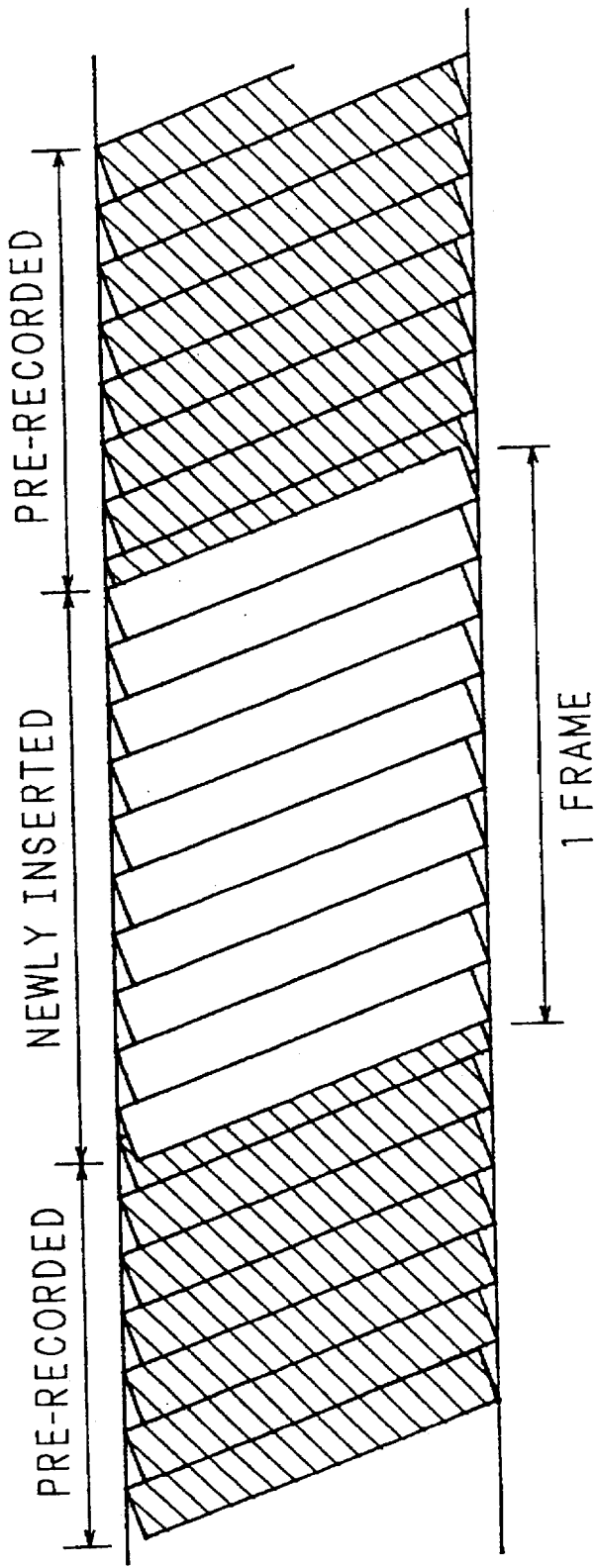
FIG. 13 is a track recording pattern in insert editing in the conventional digital VTR.
Figure 15:
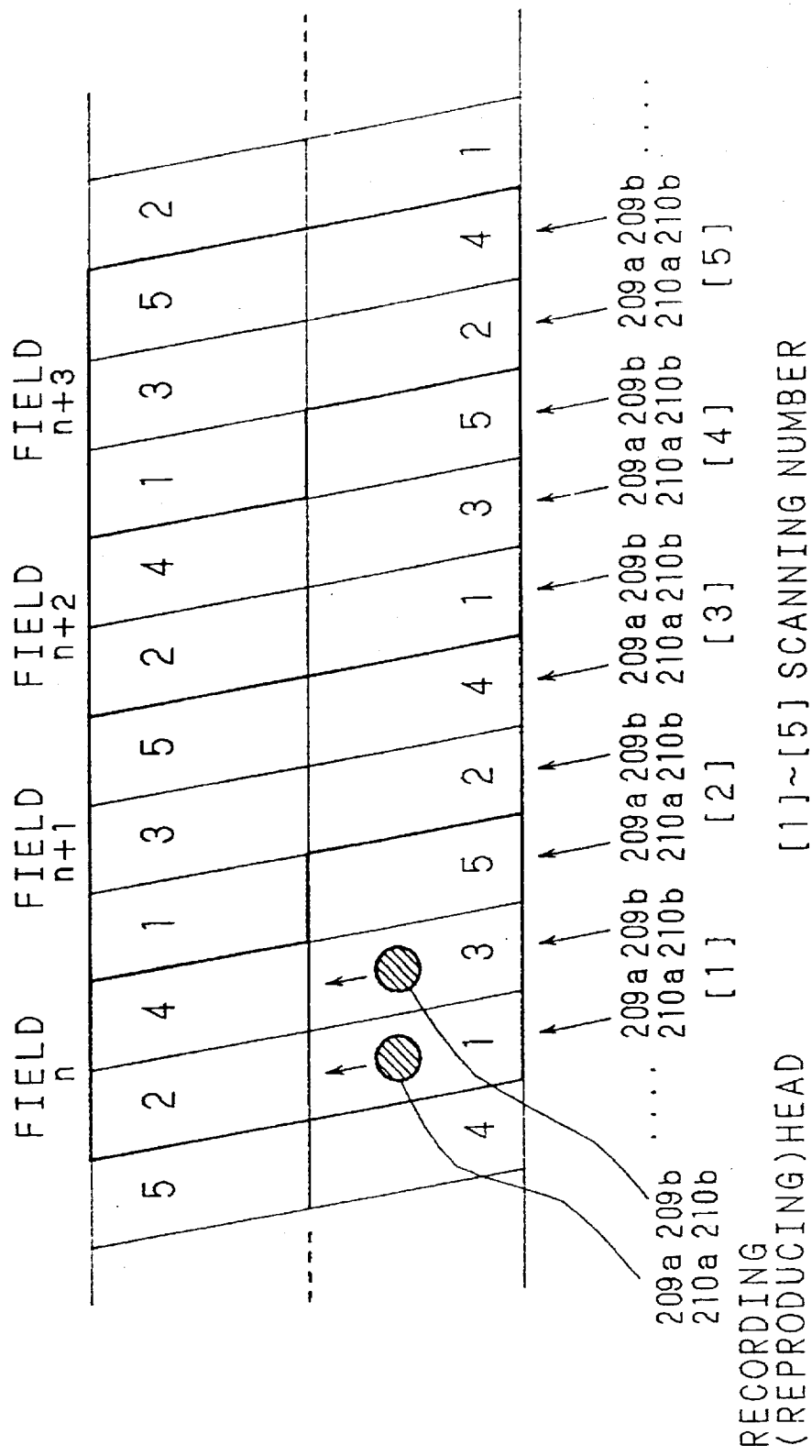
FIG. 15 is a diagram showing the head scanning trace in recording and reproducing of the conventional digital VTR.

The sixth embodiment relates to a recording control method of the digital VTR in insert editing, with the recording format of Embodiment 1 or Embodiment 4. Generally, in insert editing, due to the effects of tracking precision in editing or track curving special to the VTR, the pre-recorded track may be overwritten at the cut-in point or cut-out point (see FIG. 13). Therefore, in case of insert editing with the recording format as shown in FIG. 30 or FIG. 39, even if the fifth track is overwritten and destroyed at the cut-in point, since the peripheral data of the screen is recorded in the fifth track, a visually favorable reproduced image is obtained by interpolating this area with the image data of the preceding field. However, at the cut-out point, the first track of the next field (frame) may be overwritten and destroyed. In this case, the central image data of the screen is recorded in the first track, and if this area is interpolated with the data of the preceding field, the images of the present and previous fields are confused in the visually conspicuous image area, that is, the central portion of the screen as shown in FIG. 12, and the image looks bad. (In FIG. 12, the entire screen is shuffled randomly, and in this case, the appearance is similar.)

The case corresponding to the recording format in Embodiment 1 will be explained below.

Figure 41:
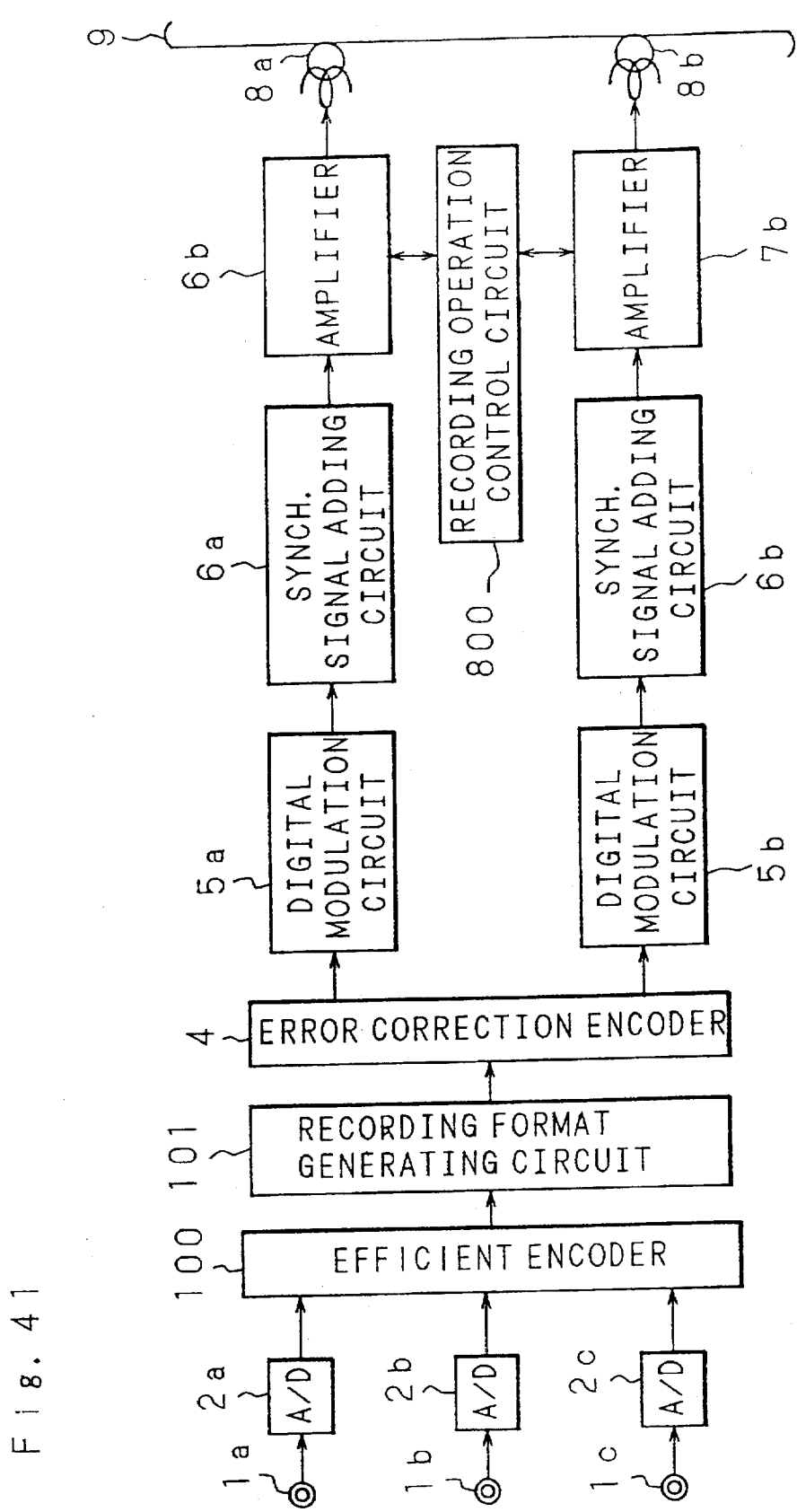
FIG. 41 is a block diagram of a recording system in Embodiments 6 and 7 of the digital VTR of the invention.

FIG. 41 is a block diagram of a recording signal processing system in the case of employing the recording format of Embodiment 1, in the digital signal recording and reproducing apparatus in Embodiment 6 of the invention. In the diagram, numerals 1, 2, 4 through 9, 100, and 101 denote the same parts as in FIG. 23, and are not explained herein. Numeral 800 is a recording operation control circuit for controlling the recording operation of the head in insert editing.

The block diagram of the reproduced signal processing system of the digital signal recording and reproducing apparatus of Embodiment 6 is same as in Embodiment 1 shown in FIG. 24, and is not explained herein.

Referring now to FIG. 41, the operation of the recording data processing system will be described below. The luminance signal Y and two color difference signals CR, CB inputted from the input terminals 1a through 1c are A/D converted by the A/D converters 2a to 2c, and fed into the efficient encoder 100. The data, curtailed in recording bit rate by the efficient encoder 100, is supplied to the recording format generating circuit 101, and shuffled, the recording format determined. The recording data with the recording format determined is provided with a check in the error correction encoder 4, digitally modulated by the digital modulation circuits 5a and 5b, a synchronizing signal and an ID signal are added in the synchronizing signal adders 6a and 6b, and the data are amplified by the amplifiers 7a and 7b. In the recording operation control circuit 800, on the other hand, the track number of the already recorded data and the track number of the data to be inserted are judged at the time of insert editing, the amplifiers 7a and 7b are controlled accordingly, and switching control whether or not the data is recorded on the magnetic tape 9 by the rotary heads 8a and 8b. The operation of the recording operation control circuit 800 will be described below in detail.

Figure 42:
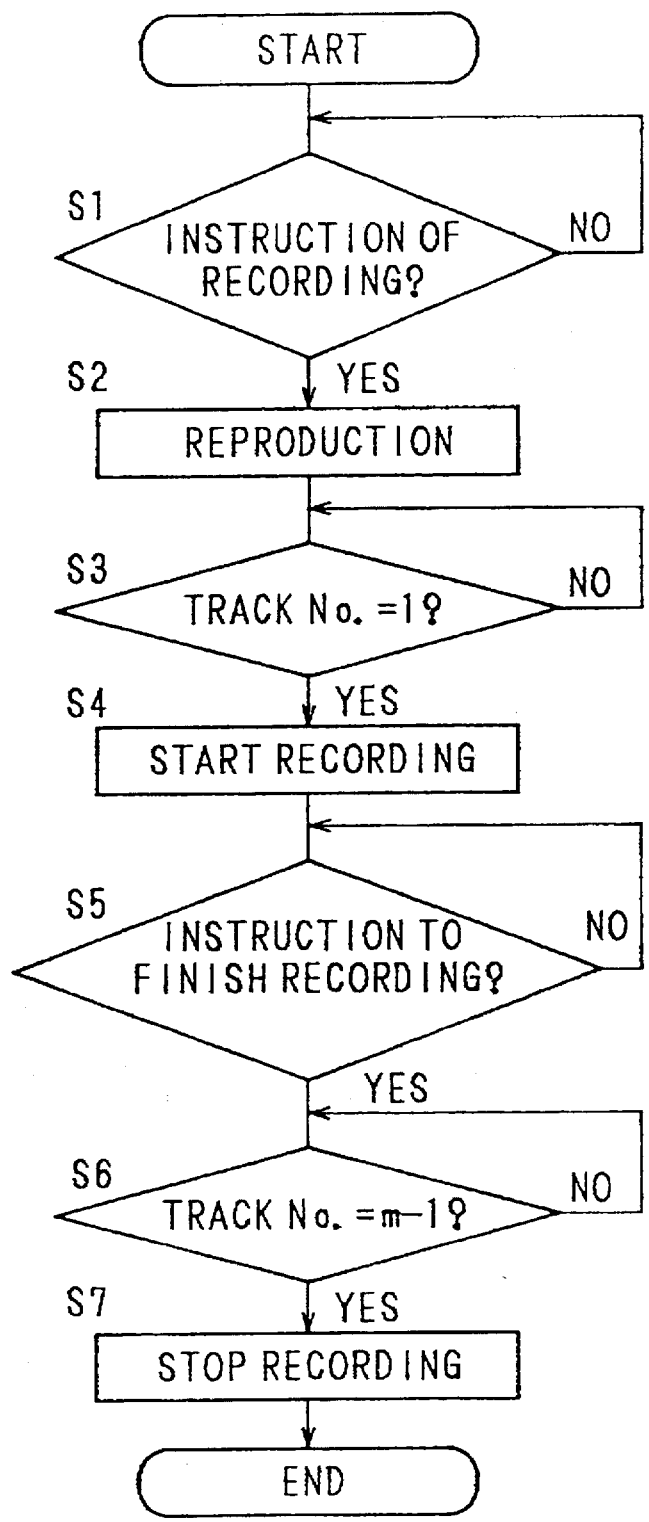
FIG. 42 is a flowchart showing the operation procedure of a recording operation control circuit of the digital VTR of the invention.

The flowchart of operation of the recording operation control circuit 800 is shown in FIG. 42. In this case, it is supposed to record the video data of one field (or one frame) by dividing the data to be recorded on m tracks (m is a positive integer). When a record command of insert editing is issued (S1), the reproducing action of the pre-recorded data is started (S2). In the recording operation control circuit 800, the track number of the pre-recorded data is detected from the reproduced signal for judging which track is which in a field, and whether the track is the first track of the insert field or not is determined (S3). When a track is judged to be the first track, the recording operation control circuit 800 sends a command to the amplifiers 7a and 7b, to start recording data for insert editing from the track judged to be the first one (S4). When the recording stop command of insert editing is issued (S5), the track number of the data being recorded in insert editing is detected (S6), and which track is which in one field is judged. When judged to be the (m−1)th track in one field, recording by the rotary heads is stopped (S7). That is, the data of the m-th track in the final field of the data to be inserted is not recorded.

Thus, Embodiment 6, in the digital VTR possessing the recording format as in Embodiment 1 or 4, is controlled not to record the data of the final track of the cut-out point field of the data to be inserted in insert editing. As a result, although the data of one track in the cut-out point field is not recorded and is hence not reproduced, the peripheral data of the screen is preliminarily recorded in this track, and though the data in this track is interpolated with the video data in the preceding field, it is inconspicuous and hence a favorable reproduced image without causing a strange feeling is obtained. Furthermore, the data of the field after the cut-out point is not overwritten since the data of the last track is not recorded at the cut-out point, thereby the data of all the tracks is reproduced and a favorable reproduced image is obtained. In this way, in the digital VTR having the recording format of Embodiment 1 or 4, visually favorable editing may be executed same as in the foregoing embodiment at the cut-in and cut-out points by controlling the VTR not to write the video data in the final track in the cut-out field in insert editing.

In this Embodiment 6, same as in Embodiment 1, tracking is controlled so as to coincide the cut-in point of the inserting with the next recording track to the track with the gathered peripheral macro blocks of the screen. That is, tracking control is effected in every field, and the cut-in point is adjusted with the first track in one field of the pre-recorded data, and the cut-out point is adjusted with the fifth track in one field of the pre-recorded data. Therefore, by not writing data of the final track to be inserted causes the data at the cut-out point not to be overwritten, and a favorable reproduced image with less visual annoyance is obtained.

Embodiment 6 corresponds to the recording format in Embodiment 1, and although detailed explanation is omitted, it also corresponds to the recording format in Embodiment 4, which produces the same effects.

[Embodiment 7]

In Embodiment 7, the case of insert editing by the frame in the recording format shown in Embodiment 3 or 5 is illustrated. In this embodiment, same as in Embodiment 6, in case of insert editing, the pre-recorded track may be overwritten at the cut-in point or cut-out point due to the tracking precision in editing or track curving special to the VTR (see FIG. 13). Therefore, when insert editing in the recording format shown in FIG. 34 or FIG. 40, if the tenth track at the cut-in point is overwritten as shown above, only the peripheral data of the screen is recorded in the tenth track, and a visually favorable reproduced image is obtained by interpolating this area with the image data of the preceding field. Likewise, at the cut-out point, the first track of the next field (frame) may be overwritten and destroyed. In this case, too, the peripheral image data of the screen is recorded in the first track as mentioned above. However, the cut-out point in insert editing generally coincides with a scene change, so that if a bright scene is inserted into a dark scene, for example, a bright image is left in the peripheral area around the dark scene even when interpolating the peripheral data recorded in the first track of the cut-out point with the image the preceding field, and an image of causing a very strange feeling is reproduced.

Hereinafter, in case corresponding to the recording format in Embodiment 3, the seventh embodiment will be described. The block diagrams of the recording signal processing system and reproduced signal processing system of the digital signal recording and reproducing apparatus in Embodiment 7 are the same as in Embodiment 6 shown in FIG. 41 and FIG. 24, both in constitution and operation, and the explanation thereof is omitted.

In Embodiment 7, according to the flowchart of the operation of the recording operation control circuit 800, the recording operation by the rotary heads 8a and 8b is controlled. In the embodiment, the data in the the last track for the cut-out field to be inserted is controlled not to be recorded. The recording operation of the rotary heads is controlled by detecting the track numbers of the data to be recorded by insert editing and the pre-recorded data, so that favorable insert editing may be executed without overwriting and destroying the first track of the next field at the cut-out point at the time of insert editing by the one field.

Embodiment 7, same as Embodiment 6, is intended to execute favorable insert editing by the digital VTR with the recording format as shown in Embodiment 3 or 5, and the data for the final track of the field at the cut-out point is controlled not to be recorded in insert editing. Hence, data is not recorded and therefore not reproduced in the fifth track in one field at the cut-out point. The video data in this area is the peripheral data of the screen as mentioned above, and if the data in this area is interpolated with the video data in the preceding field, it is visually inconspicuous. Thus, a favorable reproduced image without causing any strange feeling is obtained. Meanwhile, the data of the field in a track just after the cut-out point is not overwritten and the data of all tracks is reproduced since the data for the final track is not recorded at the cut-out point, and a favorable reproduced image is obtained. In this way, in the digital VTR having the recording format as shown in Embodiment 3 or 5, visually excellent editing may be executed at the cut-in and cut-out point by controlling not to write the video data for the final track in the cut-out field in insert editing.

In Embodiment 7, same as in Embodiment 1, tracking is controlled to coincide the cut-in point of inserting with the track next to the track where the peripheral macro block data of the screen is gathered and recorded. That is, tracking control is effected in each frame, and the cut-in point is adjusted with the first track in one frame in the pre-recorded data, and the cut-out point is adjusted with the tenth track in one frame in the pro-recorded data. Therefore, by not writing data of the final track to be inserted, the data at the cut-out point is not overwritten, and a favorable reproduced image with less visual annoyance is obtained.

Embodiment 7 brings about the same effects when the recording format of Embodiment 5 is applied.

Although detailed description is omitted, when the recording format in Embodiment 2 is applied in the insert editing by the one field, the same effects are realized by controlling the data not to be written on the final track at the cut-out point.

[Embodiment 8]

In the block diagram (FIGS. 23 and 35) of the recording signal processing system of the digital signal recording and reproducing apparatus shown in the foregoing embodiments, it is designed to shuffle the data after efficient coding. However, the circuit construction is not limited to the constitution shown in FIG. 23 (or FIG. 35), but a shuffling circuit may be installed in the efficient encoder to perform shuffling in the efficient encoder. The shuffled recording data may be controlled by buffer control of the data to be recorded in one track, and the same effects as FIGS. 23 and 35 are brought about in such circuit constitution.

Figure 43:
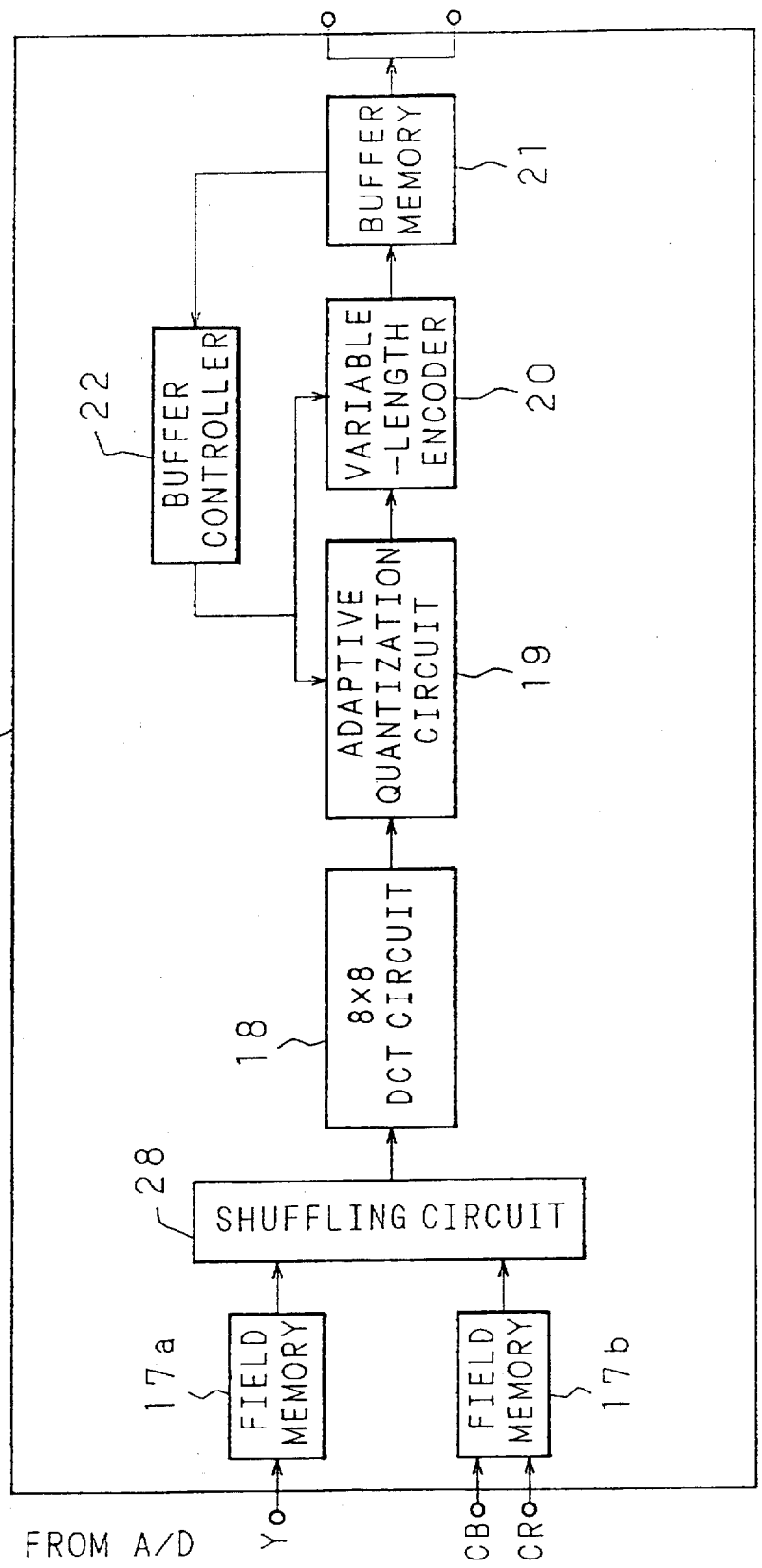
FIG. 43 is a block diagram of an efficient coding circuit mounted on the digital VTR of the invention in Embodiment 8.

FIG. 43 is a block diagram of an efficient encoder 88 in Embodiment 8. The constitution is same as in FIG. 3 of the prior art, and the explanation is omitted herein.

Figure 36:
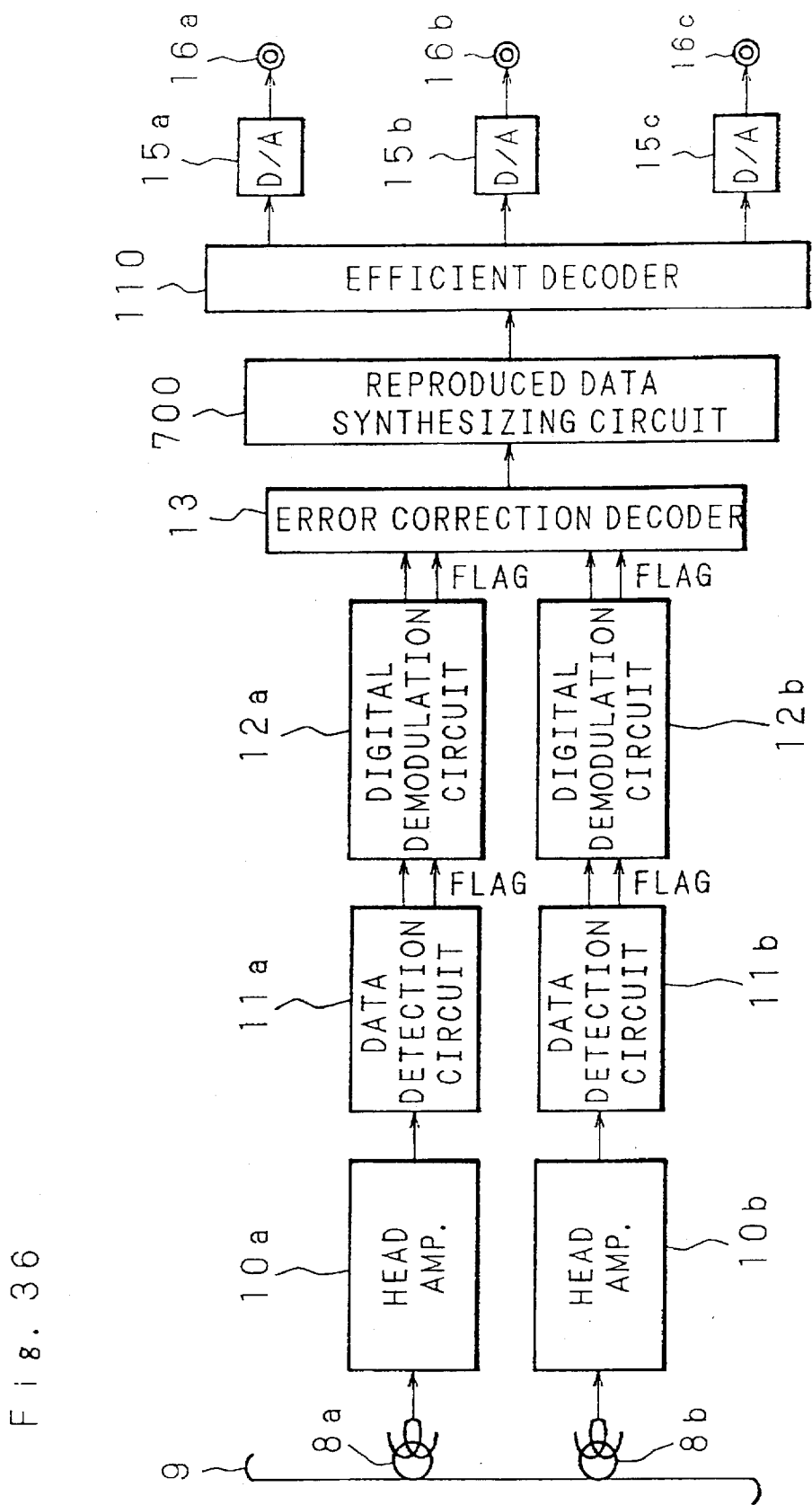
FIG. 36 is a block diagram of a reproducing system in Embodiment 4 of the digital VTR of the invention.

In reference to FIG. 43, the operation of the efficient encoder 88 of Embodiment 8 will be described below. The inputted luminance signal Y and two color difference signals CB and CR are formed into blocks by a field memories 17a and 17b and fed into a shuffling circuit 28 to be shuffled. The recording data shuffled by the shuffling circuit 28 undergoes DCT by a 8×8 DCT circuit 18, is adaptively quantized by an adaptive quantization circuit 19, is variable-length coded by a variable-length encoder 20, and is fed into a buffer memory 21. The data accumulated in the buffer memory 21 is read out at a fixed rate. At this time, the buffer control is intended to control the quantity of data that can be recorded in one track, and record one field in five tracks. Though explanation is omitted here, the position of the de-shuffling circuit is not limited to the position shown in FIG. 24 (or FIG. 36), the same effects are brought about, needless to say, if placed after efficient decoding. In this embodiment, for the simplicity of explanation, the shuffling circuit (or de-shuffling circuit) is provided, but the field memories 17a and 17b memories 27a and 27b at the time of deshuffling) may be used commonly with the shuffling (or deshuffling) circuit, and the same effects are brought about if shuffled (deshuffled) by reading control (writing control) from the memory.

[Embodiment 9]

In this embodiment, editing is done by the one frame, but in the foregoing Embodiment 1 through Embodiment 7, aside from editing by the frame, the same effects are brought about if edited by the one field or by the several fields (or several frames).

[Embodiment 10]

In Embodiment 4 and Embodiment 5, the division detection flag is set to divide the central data and the peripheral data of the screen, but instead of setting the division detection flag, for example, the division data may be added to the ID data, or the divided position may be separated from the reproduced data without recording the division flag at the time of recording, or other method may be possible.

[Embodiment 11]

Figure 5A:
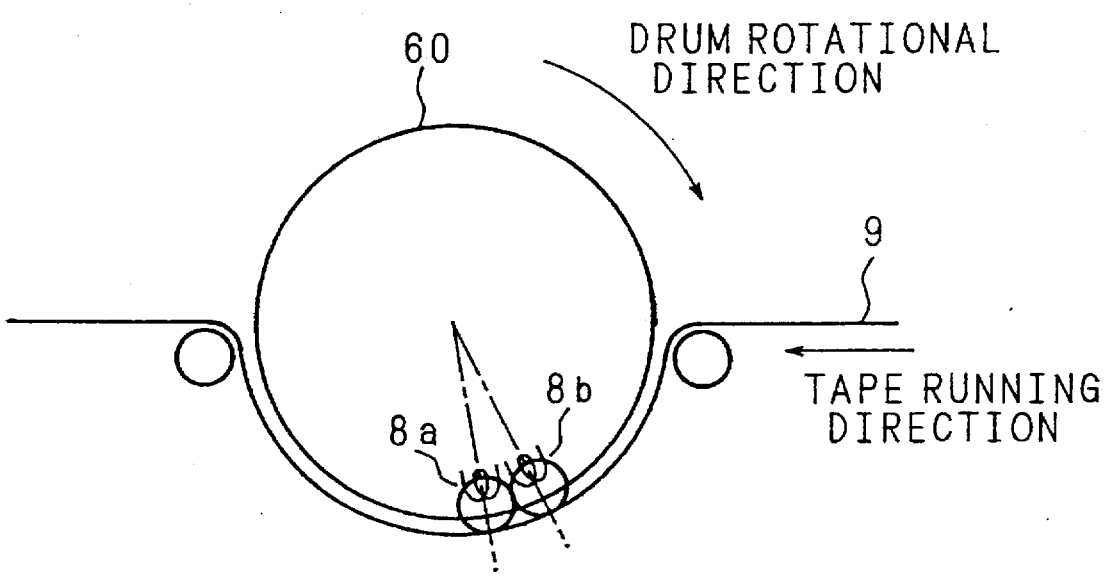
FIG. 5(a) is a schematic diagram showing the positional relation between a magnetic tape and a drum in the conventional digital VTR.
Figure 5B:
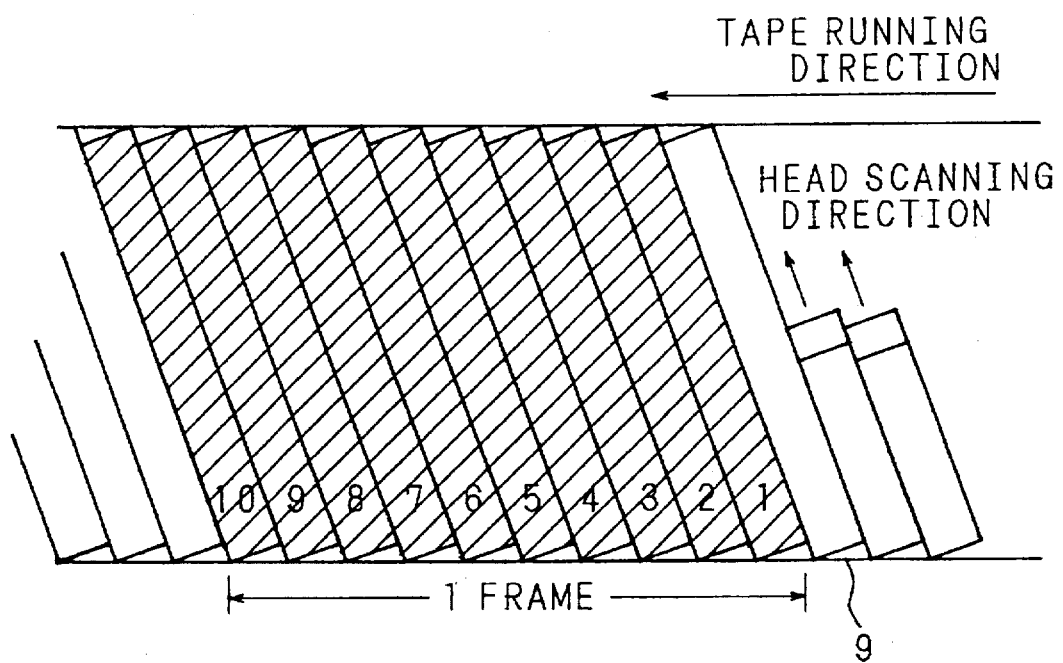
FIG. 5(b) is a track recording pattern of the conventional digital VTR.
Figure 44:
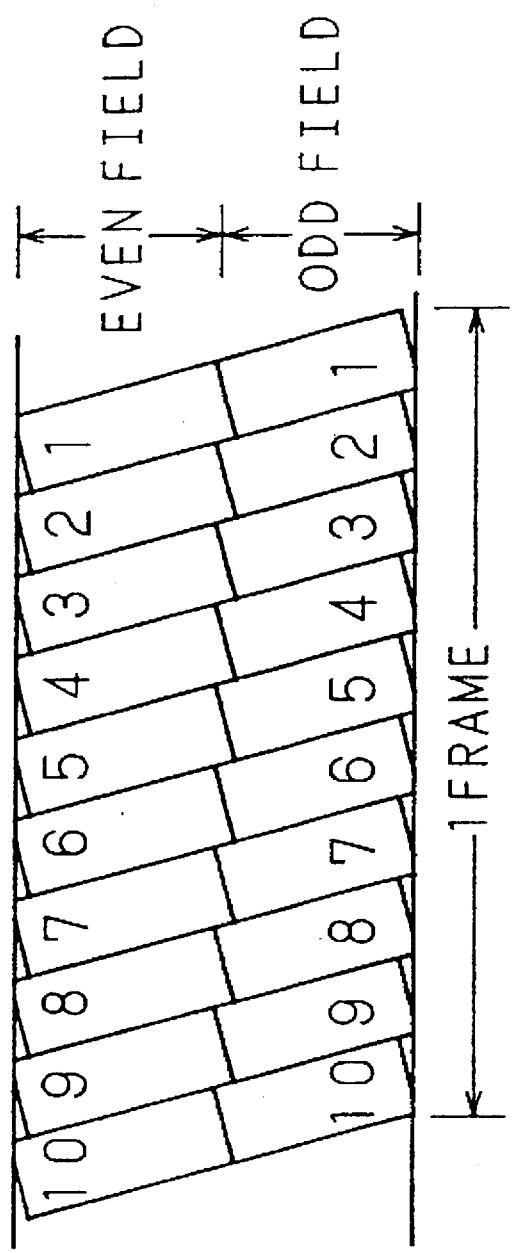
FIG. 44 is a track recording pattern in Embodiments 11 and 12 of the digital VTR of the invention.

In this embodiment, the track pattern as shown in FIG. 5(b) is used, in which one frame is recorded in ten tracks, and odd fields and even fields are disposed in every five tracks. The track pattern is not limited to this, but, as shown in FIG. 44, the recording track may be divided into two halves above and below the tape to record the odd fields in the lower part and even fields in the upper part of the tape.

Figure 45:
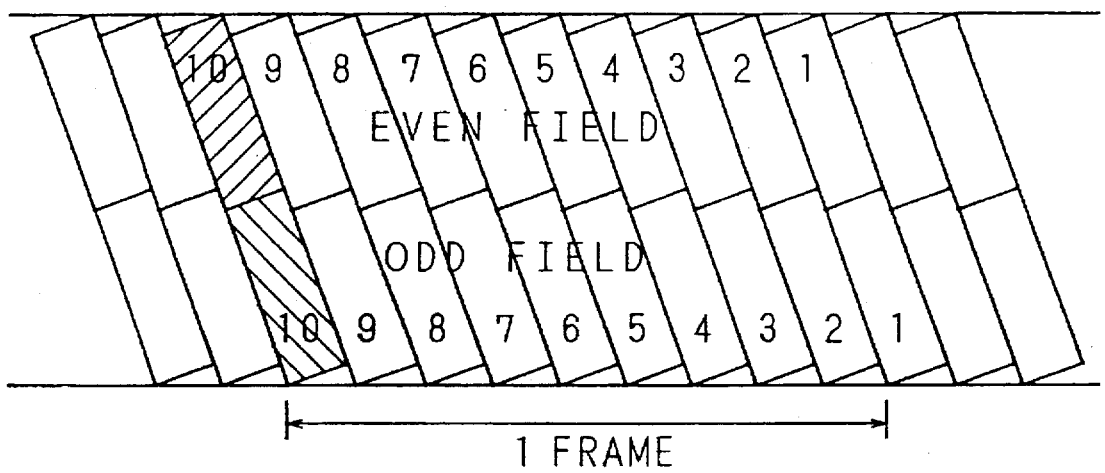
FIG. 45 is a track recording pattern in Embodiment 11 of the digital VTR of the invention.

FIG. 45 is a recording track pattern diagram for explaining the recording format corresponding to the insert editing in the track pattern where the tape is divided into the upper and the lower halves to record the odd fields in the lower part and the even fields in the upper part of the tape.

Hereinafter, referring to FIG. 45, the recording format of Embodiment 11 will be described. In the hatched area of the diagram, the peripheral data of the screen of each field is recorded, and the central data of the screen is recorded in the remaining area. In Embodiment 11, same as in the other embodiments, though the pre-recorded track may be overwritten and not reproduced correctly at the cut-in point in insert editing, a visually excellent reproduced image may be obtained since the macro block data of the peripheral area of the screen is recorded in the track to be overwritten in editing. The positions of the peripheral data on the screen to be recorded in the even field and in the odd field on the same track is preferred to be varied, in order to obtain a further excellent reproduced image. This is because, if the data of the same position on the screen is recorded on the same track and the track data not reproduced is interpolated by using the field memory with the data of the preceding field, the interpolated image data of one frame before causes a strange feeling especially in case of a moving image.

In Embodiment 11, one field is recorded on ten tracks as shown in FIG. 45, and the peripheral data of the screen is gathered and recorded in the final one track. In Embodiments 1 and 4, the peripheral data of the screen is gathered and recorded in the final one of the five tracks, and therefore 20% of all recorded data in one field is the peripheral area of the screen, and in Embodiment 11, moreover, 10% of all recorded data in one field is the peripheral data of the screen, so that a reproduced image with less visual annoyance may be obtained. (In insert editing, needless to say, favorable insert editing may be similarly done by the same controlling as in Embodiment 6.)

[Embodiment 12]

Figure 46:
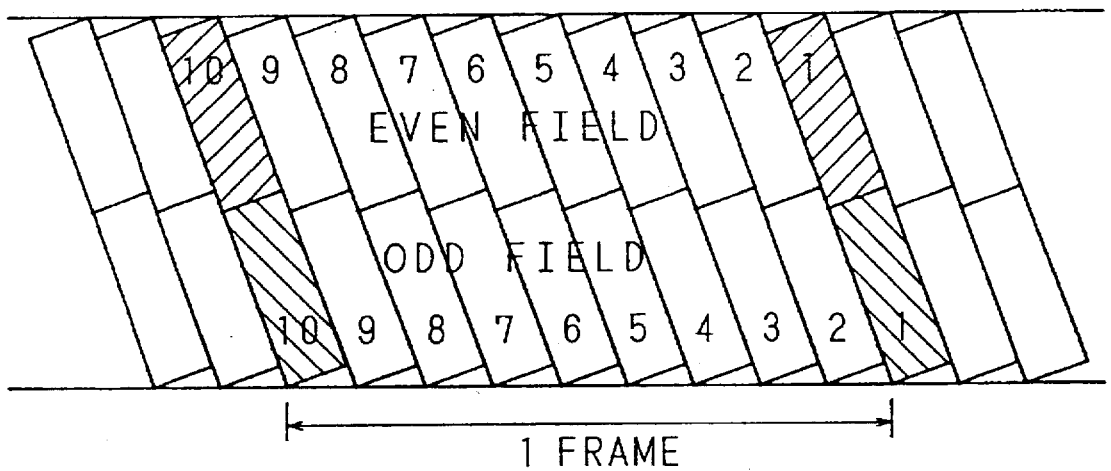
FIG. 46 is a track recording pattern in Embodiment 12 of the digital VTR of the invention.

FIG. 46 is a recording track pattern diagram for explaining the recording format corresponding to the insert editing in the track pattern where the tape is divided into the upper and lower halves to record the odd fields in the lower part of the tape and the even fields in the upper part of the tape.

Hereinafter, referring to FIG. 46, the recording format of Embodiment 12 will be described. In the hatched area of the diagram, the peripheral data of the screen of each field is recorded, and the central data of the screen is recorded in the remaining area. In Embodiment 12, same as in the other embodiments, though the pre-recorded track may be overwritten and not reproduced correctly at the cut-in point or cut-out point in insert editing, a visually excellent reproduced image may be obtained since the macro block data of the peripheral area of the screen is recorded on the track to be overwritten in editing. The positions of the peripheral data on the screen to be recorded in the even field and in the odd field on the same track is preferred to be varied, in order to obtain a further excellent reproduced image. This is because, if the data of the same position on the screen is recorded on the same track and the track data not reproduced is interpolated by using the field memory with the data of the preceding field, the interpolated image data of one frame before causes a strange feeling especially in case of a moving image.

In Embodiment 12, one field is recorded on ten tracks as shown in FIG. 46, and the peripheral data of the screen is gathered and recorded in the first and final tracks of the ten tracks. In Embodiment 2 and Embodiment 5, the peripheral data of the screen is gathered and recorded in the beginning and final ones of the five tracks, and therefore 40% of all recorded data in one field is the peripheral area of the screen. In Embodiment 12, moreover, 20% of all recorded data in one field is the peripheral data of the screen, so that a reproduced image with less visual annoyance may be obtained. (In insert editing, needless to say, favorable insert editing may be similarly done by the same controlling as in Embodiment 7.) In Embodiment 11 and Embodiment 12, incidentally, the method of dividing the even fields and odd fields is not limited to the above-mentioned method alone, but, for example, the track may be divided into four in the widthwise direction, consisting of two even fields and two odd fields.

[Embodiment 13]

In the above-mentioned embodiments, the two-dimensional DCT and variable-length coding are employed as the band compression method (efficient coding method). The efficient coding method is not limited to the above, but the same effects are brought about by using the data compressed in band by orthogonal transform (one-dimensional or three-dimensional orthogonal transform) represented by DCT, or compressed by predictive coding, or by motion compensation coding, or coding by conversion efficient obtained by KL transform and the like, or their combination.

[Embodiment 14]

Though the above-mentioned embodiments relate to the digital VTR employing the two-channel recording system, the same effects are brought about by the VTR employing one-channel recording system, multi-channel recording system, multi-segment recording system, multi-channel multi-segment recording system, etc.

[Embodiment 15]

When reproducing the edited point in normal speed, the peripheral part of the field screen of the base track (that is, overwritten track) may not be reproduced, but this problem may be solved by replacing the overwritten track data with the peripheral data of the track in the corresponding position of the preceding field (or preceding frame).

[Embodiment 16]

As a solving method for Embodiment 15, the peripheral data of the screen may be filled up with the index data, or fixed data (gray) to display on the screen.

[Embodiment 17]

As another solving method for Embodiment 15, the central area may be expanded up to the peripheral area to reproduce the full size screen. In case of frame feed reproduction, in particular, the peripheral area data may not be reproduced at all. At this time, as shown in Embodiments 15, 16 and 17, a favorable reproduced image without causing any strange feeling may be obtained by controlling the reproduced screen.

[Embodiment 18]

In the recording format of the foregoing embodiments, the data of the peripheral area may not always be reproduced depending on reproduction speed in slow or fast reproduction, and in such a case, the previously reproduced peripheral data by normal speed may be used.

[Embodiment 19]

As a further solving method for Embodiment 18, the peripheral data of the screen which is not reproduced may be filled up with the index data to display on the screen.

[Embodiment 20]

As further another solving method for Embodiment 18, the peripheral data of the screen which is not reproduced may be filled up with the fixed data (gray) to display on the screen.

[Embodiment 21]

As further another solving method for Embodiment 18, the central area may be expanded up to the peripheral area to reproduce the full size screen.

[Embodiment 22]

Figure 47:
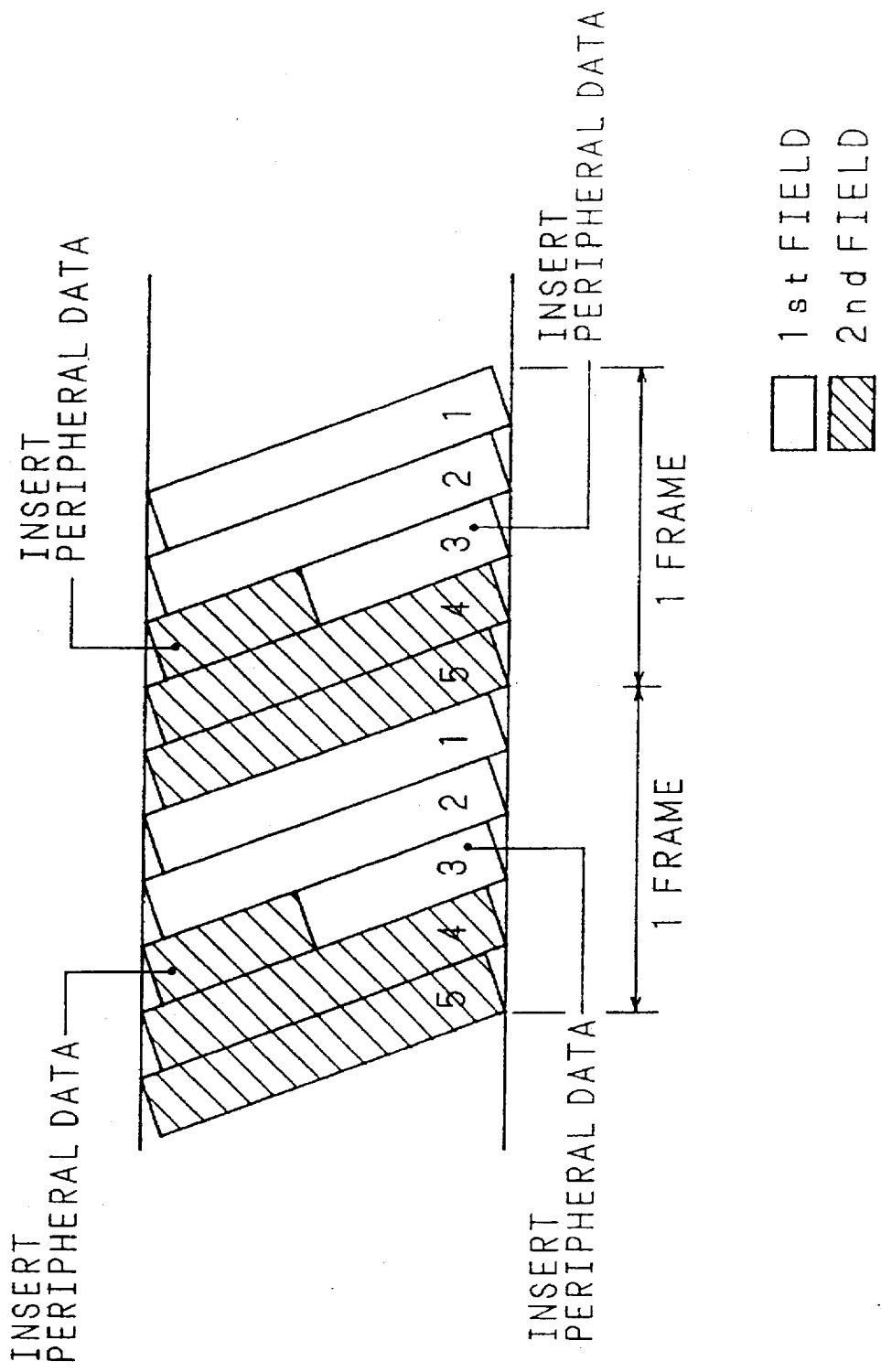
FIG. 47 is a track recording pattern in Embodiment 22 of the digital VTR of the invention.

Though the foregoing embodiments relate to recording of video data of one field in five tracks, a favorable reproduced image is obtained, as shown in FIG. 47, by recording the video data of one field in 2.5 tracks and recording the peripheral data of the screen in the remaining tracks, and arranging this remaining tracks at the insert point of editing. The recording format in editing is not limited to the recording format of the foregoing embodiments alone. The same effects are achieved in the VTR for recording video data of n fields in m tracks (m>n), by arranging the cut-in point of editing in every m tracks, and recording the peripheral data of the screen on a track immediately before the cut-in point track (as in cases of Embodiments 1 and 4). When considering insert editing, similar effects are brought about by recording the peripheral data also on a track at the cut-out point (as in cases of Embodiments 2, 3 and 5).

In this embodiment, the macro blocks in the composition shown in FIG. 7 are employed, but the composition of macro blocks is not limited to this alone.

[Embodiment 23]

Figure 16:
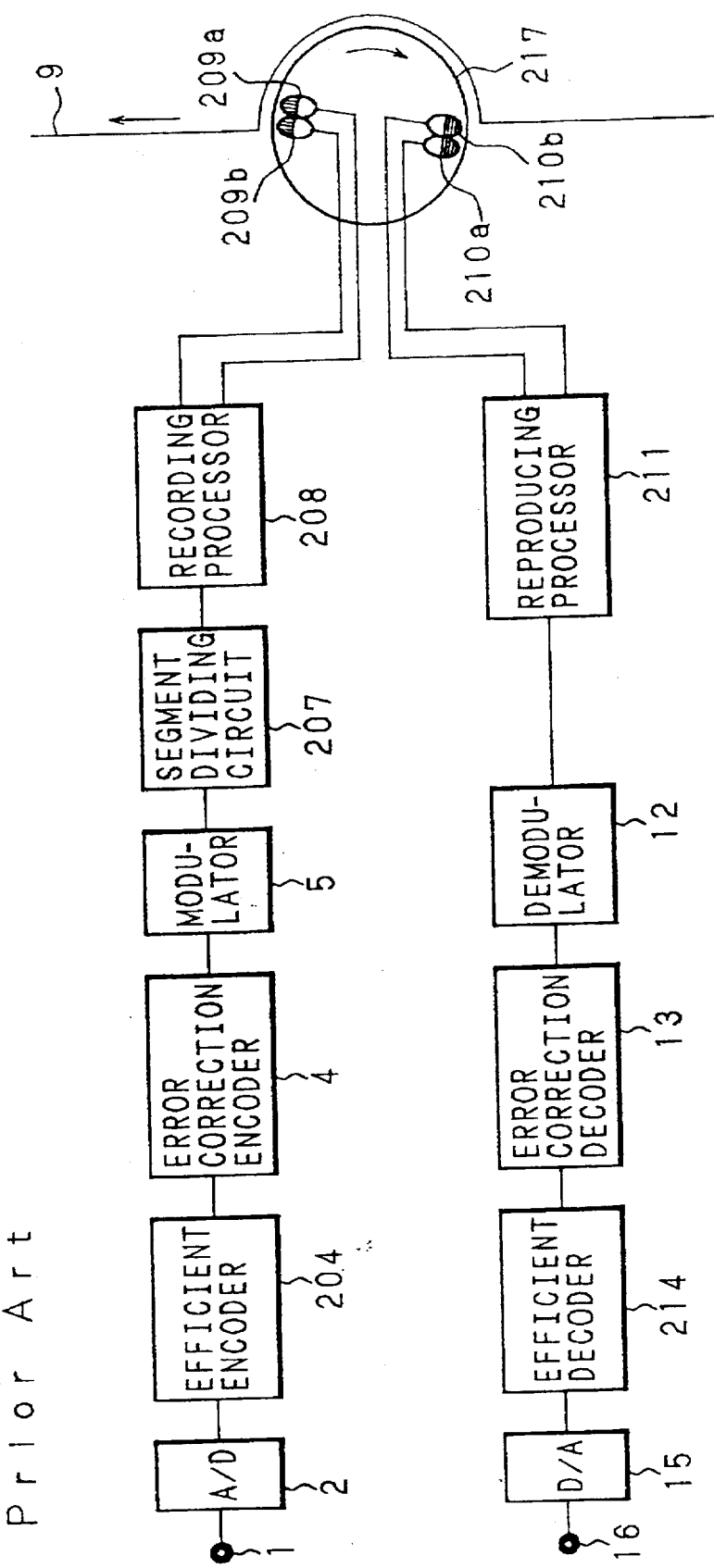
FIG. 16 is a block diagram of a recording system and a reproducing system of another conventional digital VTR.
Figure 48:
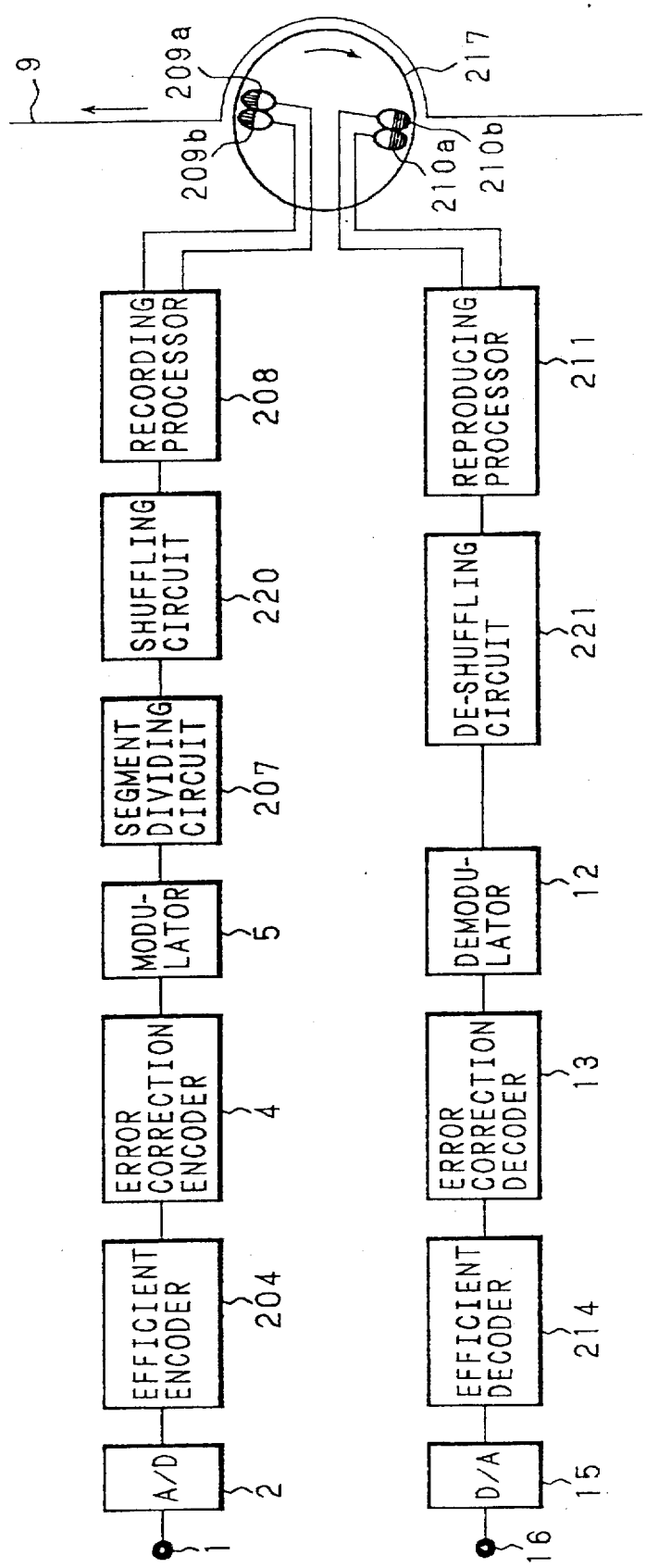
FIG. 48 is a block diagram of a recording and reproducing system in Embodiment 23 of the digital VTR of the invention.

Another embodiment of digital VTR for recording by dividing the video signals of one field into plural segments will be explained in reference to FIGS. 48 through 53. First, the recording system of the digital VTR in an embodiment of the invention and the normal speed reproducing will be described referring to FIGS. 48 through 51. FIG. 48 is a block diagram of the recording system and reproducing system of the digital VTR in an embodiment of the invention, in which the same parts as in the prior art in FIG. 16 are denoted by the same reference numerals and are not explained herein.

Numeral 220 denotes a shuffling circuit for exchanging the recording order of the segments in one field divided by a segment dividing circuit 207, and 221 denotes a deshuffling circuit for returning the order of segments exchanged by the shuffling circuit 220 back to the initial order when being reproduced.

Figure 49:
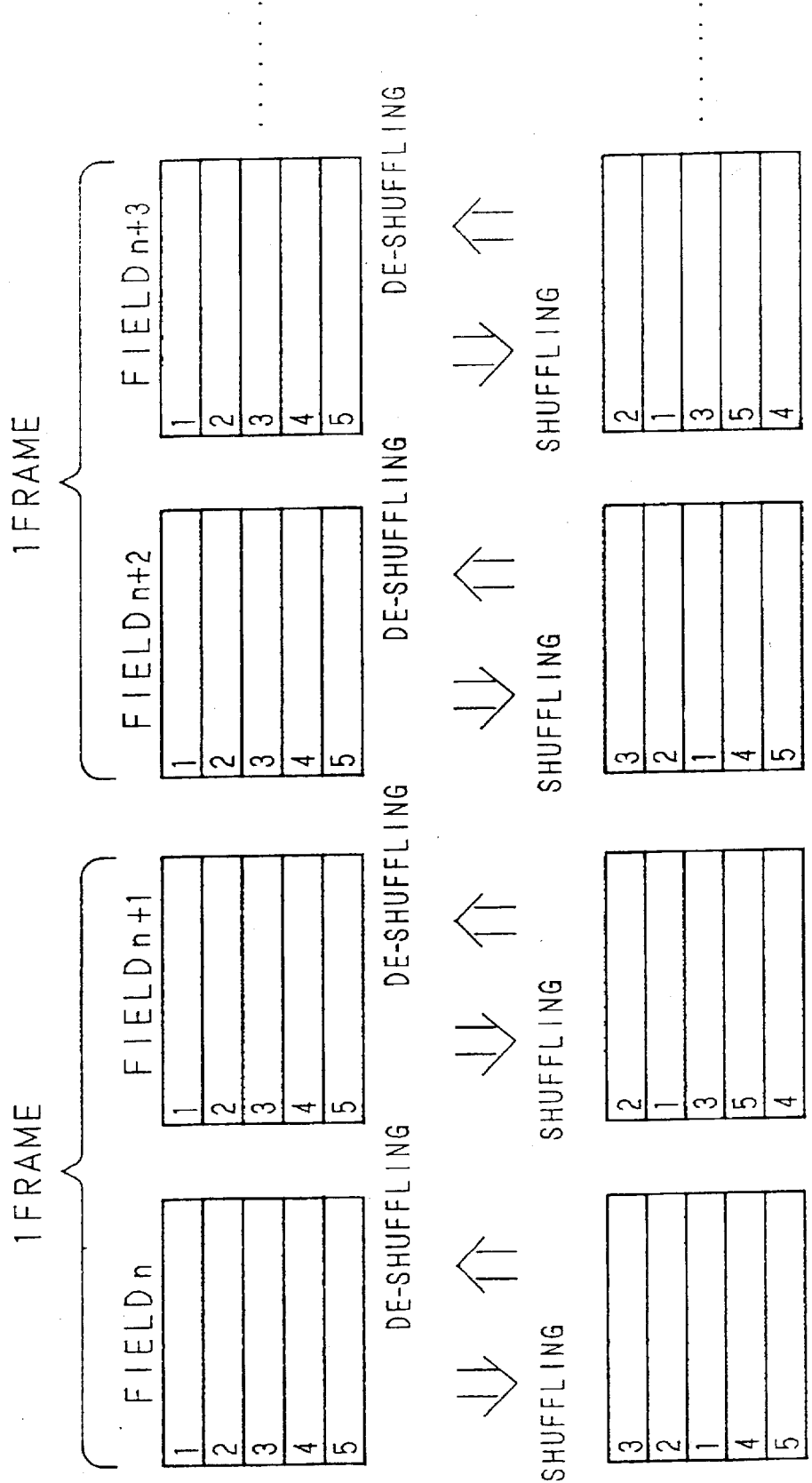
FIG. 49 is a conceptual diagram of shuffling and deshuffling in Embodiments 23 and 24 of the invention.

FIG. 49 is an example showing a manner of shuffling for exchanging the order of segments within a field according to the embodiment of the invention, and deshuffling for returning the orders of the segments to the initial orders.

Figure 51:
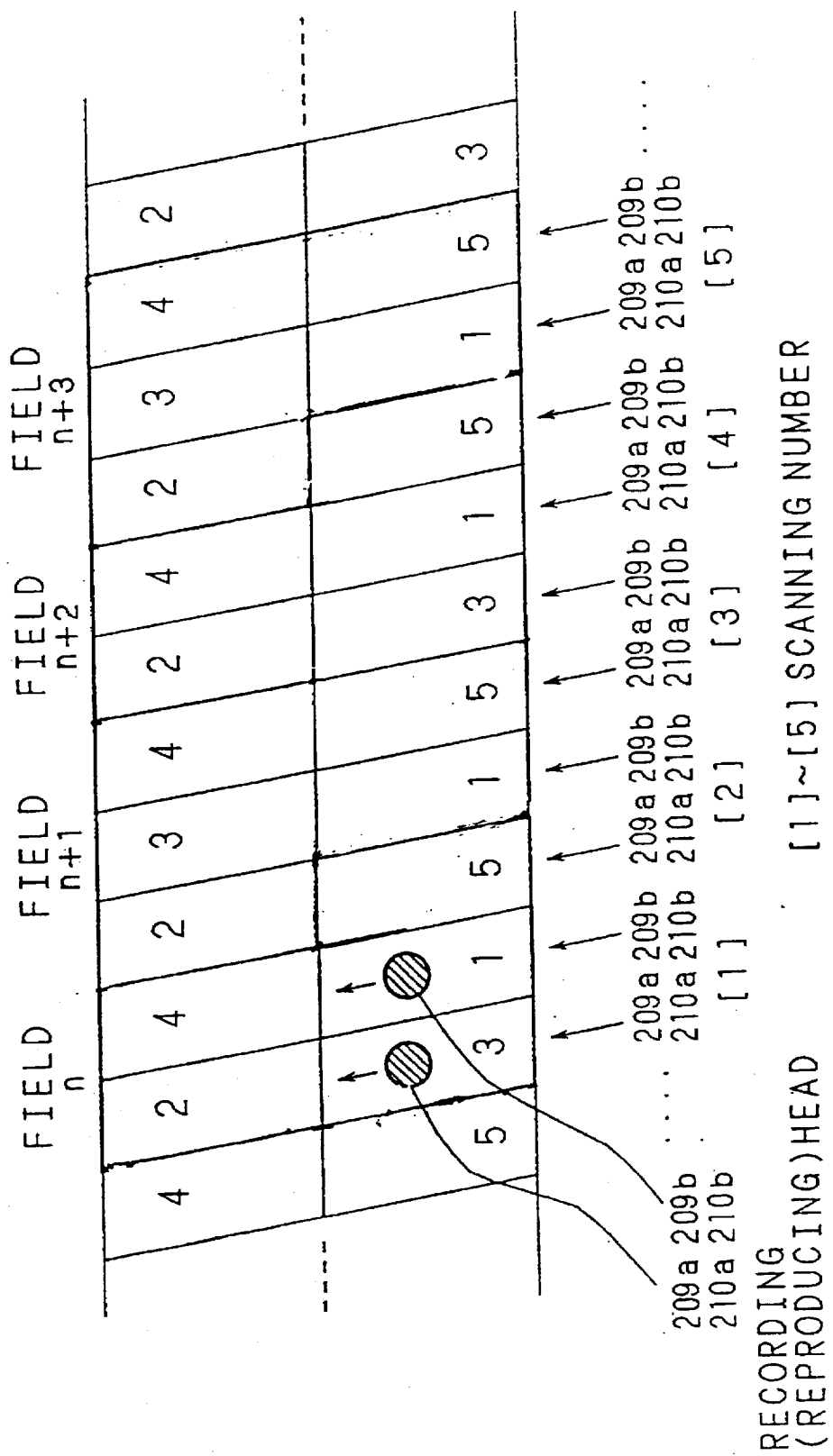
FIG. 51 is a diagram showing a head scanning trace in recording and reproducing in Embodiments 23 and 24 of the invention.

FIG. 50 is a diagram showing an example of recording format of the digital VTR of the invention. FIG. 51 is a diagram showing the scanning trace of magnetic head on the magnetic tape in recording and reproducing of the digital VTR of the invention.

Referring to FIG. 48, the operation of the recording system will be explained. Same as in the prior art, the video signal inputted from the input terminal 1 is converted into a digital video signal in the A/D converter 2, and is outputted to an efficient encoder 204. In the efficient encoder 204, the data is compressed by taking advantage of the correlation in the video data. The output of the efficient encoder 204 is inputted to an error correction encoder 4, and a check is added in order to correct transmission error in recording and reproducing. The data added with the check is converted in a modulator 5 into a recording signal suited for the magnetic tape and magnetic head, and the recording signals in one field are divided into five segments in a segment dividing circuit 207 same as in the prior art.

The recording signals of one field divided into five segments are inputted to a shuffling circuit 220.

In the shuffling circuit 220, as shown in FIG. 49, the order of the segments is exchanged within one field, for example.

Figure 52:
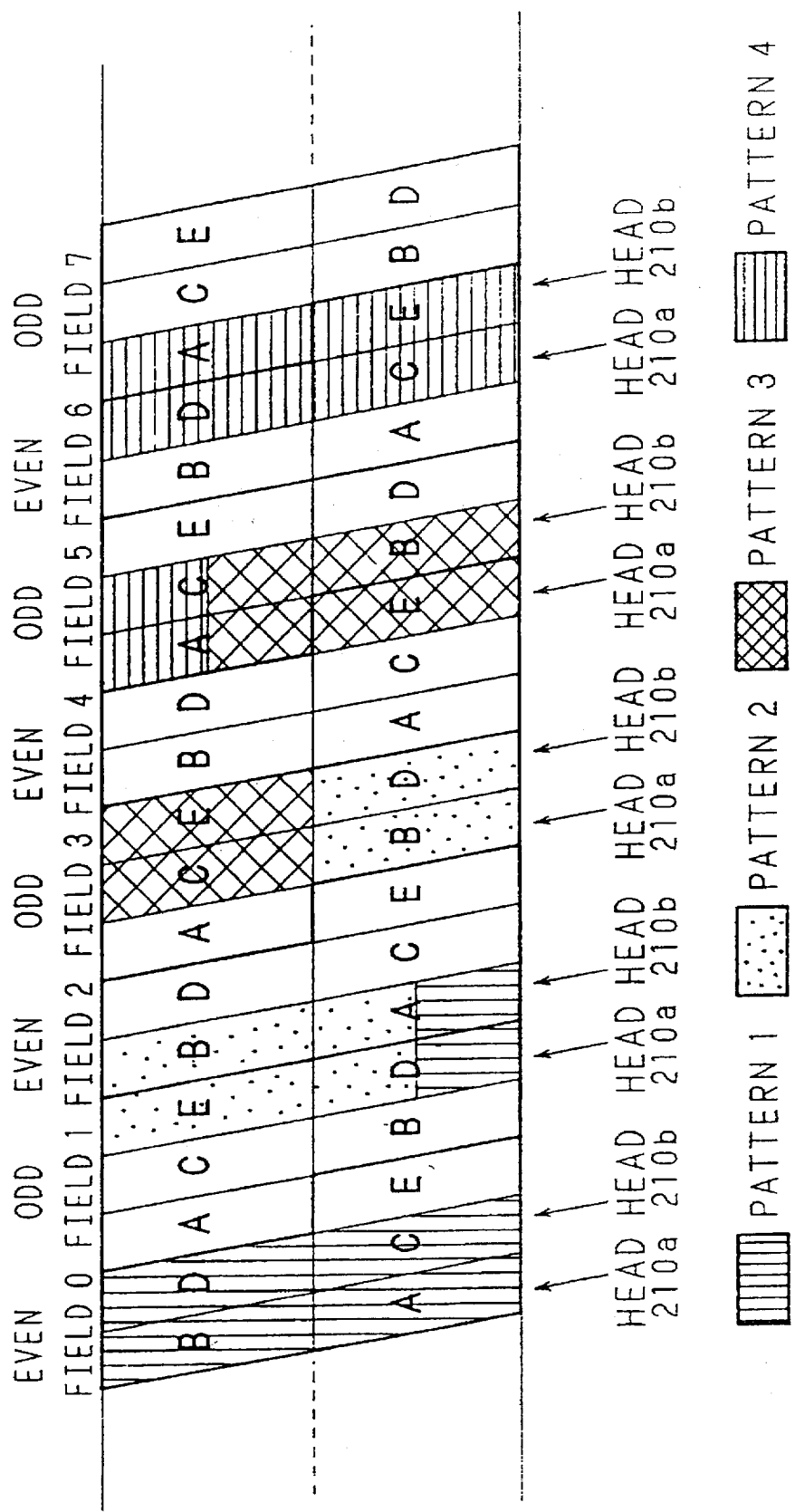
FIG. 52 is a recording format on a magnetic tape in embodiment 23 of the invention.

An example of a procedure for exchanging the orders of the segments shown in FIG. 49 will be explained in reference to FIGS. 52, 53(a)–(d) and 54. FIG. 52 shows the head scanning trace on the magnetic tape in double speed search, in which the segments are denoted by symbols A through E instead of the segment numbers. FIGS. 53(a)–(d) and 54 are diagrams explanatory of the procedure for exchanging the orders of segments, in which the segment orders are exchanged on the basis of the scanning state in double speed search shown as head scanning patterns 1 through 4. That is, patterns 1 through 4 correspond to the video data of one field, and scanning as many segments as possible within each pattern leads to excellent double speed search pictures. For example, explanation will be given on the method of determining the orders of segments in odd fields 1, 3, 5, 7 after determining the configuration of segments of even fields 0, 2, 4, 6 as A=1, B=2, C=3, D=4, and E=5.

First, determination on the pattern 1 will be explained. The head scanning state of pattern 1 is as shown in FIGS. 52 and 53(a), that is, all of the segments A, B, C, D and the lower half of the segment A in even fields are scanned, and the lower half of the segment D in an odd field is scanned. Since the segments in the even fields are assigned as mentioned above, as for the pattern 1, the data from the segment 1 through the segment 4 is already obtained only by scanning the even fields. Therefore, it is not necessary to assign the segment 1 through the segment 4 to the segment D of the odd field to obtain the entire data of one field in pattern 1, and it is necessary to assign the data of the segment 5 that was not obtained only by scanning the even fields. Hence, in FIG. 53(a), X's are marked in the columns of the segments 1 through 4 corresponding to the segment D in the odd fields.

Next, determination on the pattern 2 will be explained. The head scanning status of pattern 2 is shown in FIGS. 52 and 53(b), in which the upper half of the segment A and all of the segment B are scanned in the even field, and all of the segments B,D, E and the upper half of the segment D are scanned in the odd fields. Herein, the segments of the even field are assigned in the same way as above-mentioned, and in pattern 2, the data of the upper half of the segment 1 and all of the segment 2 is obtained only by scanning the even field. Therefore, it is not necessary to assign the segments 1 and 2 to the segments B, D, E of the odd field to obtain the data for one field within the pattern 2, and it is needed to assign the data of segments 3, 4, 5 not obtained by scanning the even fields only. Hence, in FIG. 53(b), X's are marked on the columns of the segments 1, 2 corresponding to the segments B, D, E of the odd field, Through such procedure, as for the patterns 3 and 4 in FIGS. 53(c) and 53(d), the segment numbers unnecessary to be assigned to the segments A, B, C, D, E in the odd field are marked by X's. Thereafter, the X marks of the patterns 1 through 4 are overlaid as shown in FIG. 54, from which, supposing the even fields to be A=1, B=2, C=3, D=4, and E=5, the orders of the segments of the odd field may be considered in the following combination.

A=1 or 2
B=3 or 4
C=1 or 2
D=5
E=3 or 4

On the basis of this combination, the segment orders are exchanged to, for example, A=1, B=3, C=2, D=5, and E=4 in order to reduce the segments in the odd fields that cannot be scanned in double speed search.

In this embodiment, the case of the segment order exchanged as shown in FIG. 49 by utilizing the above-mentioned technique will be explained.

The recording signals with the exchanged segment orders are divided into two channels by the recording processor 208, and recorded on the magnetic tape 9 as shown in FIG. 50 by magnetic heads 209a and 209b.

In FIG. 51, referring to an example of scanning [1], data of the segment 3 and then the segment 2 are sequentially recorded in one track by the magnetic head 209a. Data of the segment 1 and then the segment 4 are sequentially recorded in one track by the other magnetic head 209b.

In the same manner, from scanning [2] to scanning [5], data are recorded on the magnetic tape 9 by the magnetic heads 209a and 209b, and thereafter the operation of the scanning [1] through [5] is repeated.

The operation of the reproducing system will be described. The magnetic heads 210a and 210b are also mounted on the rotary drum 217 same as in the prior art, and as the rotary drum 217 rotates, the magnetic heads 210a and 210b also rotate and scan the track simultaneously to supply the reproduced signals to the reproducing processor 211.

Referring also to scanning [1] in FIG. 51, data of the segment 3 and then the segment 2 are sequentially reproduced by the magnetic head 210a. Data of the segment 1 and then the segment 4 are sequentially reproduced by the magnetic head 210b.

The reproduced data is synthesized into digital signals of one field by the reproducing processor 211, and the segments of each field are returned to the initial orders as shown in FIG. 49 by the de-shuffling circuit 221.

The digital signals are demodulated to the original digital signals by the demodulator 12, and an error is detected and corrected by the error correction decoder 13. Then the compressed codes are returned to the original digital video signals by the efficient decoder 214. The decoded digital video signals are converted into analog video signals in the D/A converter 15 to be outputted through the output terminal 16.

In the digital VTR of this embodiment, the case of the double speed search will be explained in referring to FIGS. 55 and 56.

Figure 17:
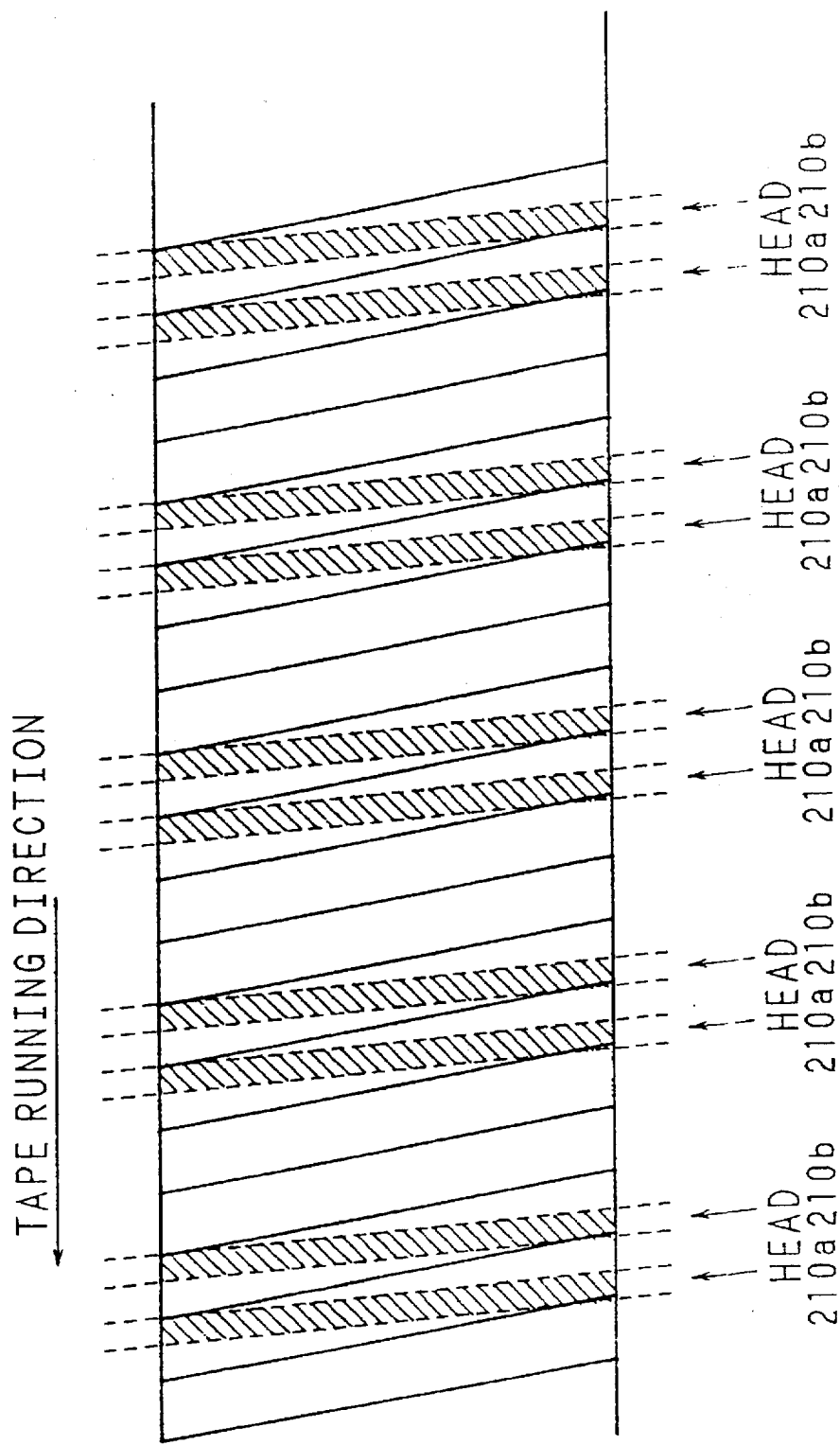
FIG. 17 is a diagram showing an actual scanning trace of magnetic heads of a digital VTR.

Same as in the prior art, in the case of double speed search by the digital VTR of the invention, the scanning trace of the magnetic heads 210a and 210b is as shown in FIG. 17.

Figure 18:
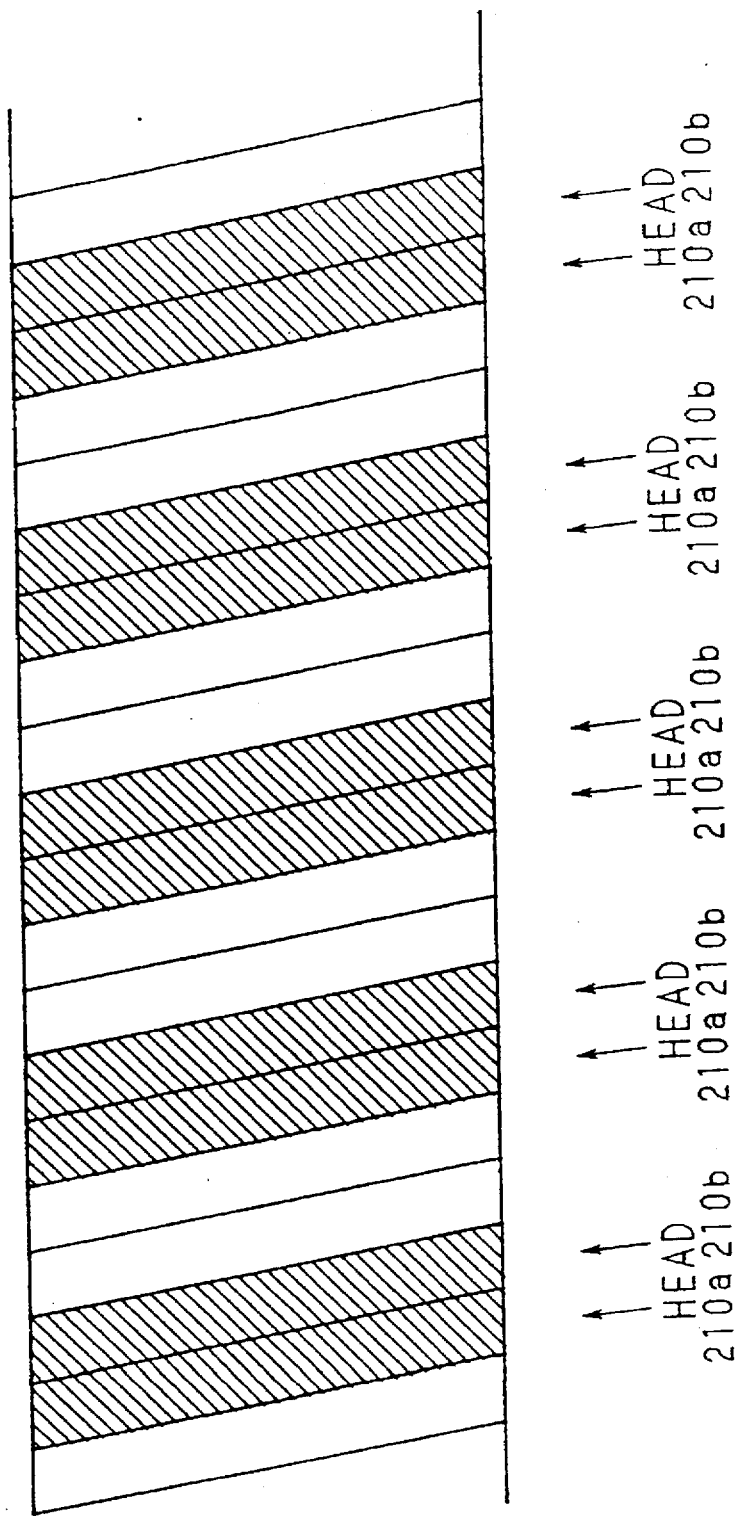
FIG. 18 is a simplified diagram of scanning trace of magnetic heads of a digital VTR.

In the case of double speed search, the head scanning trace is generally as shown in the hatched area in FIG. 17, but the data is almost completely restored by the error correction and other processes when about half of the track width is reproduced, the hatched area in FIG. 18 is hence reproduced, and therefore every second track is reproduced by the magnetic heads 210a and 210b.

Figure 19:
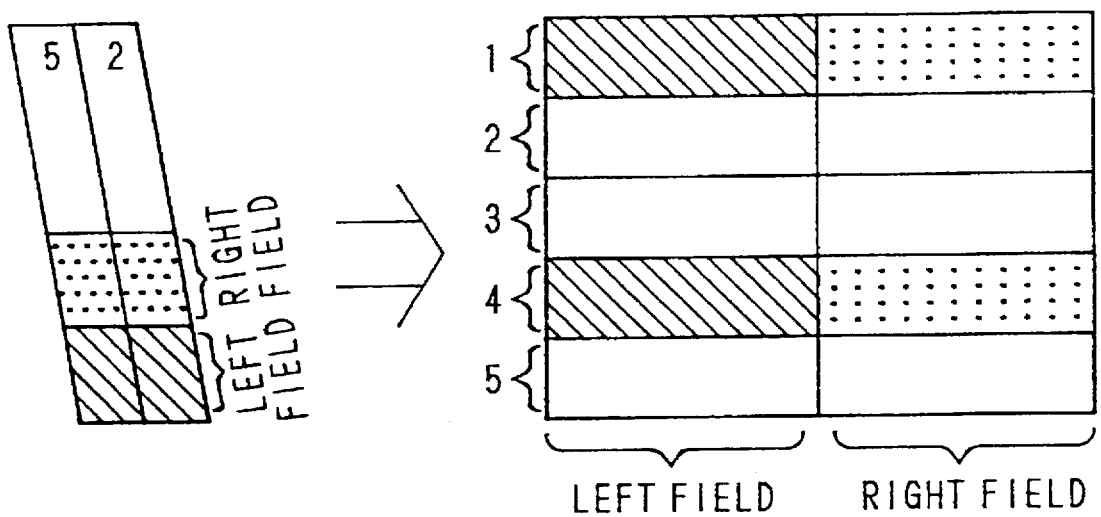
FIG. 19 is a diagram showing an example of the relation between segment and screen.
Figure 20:
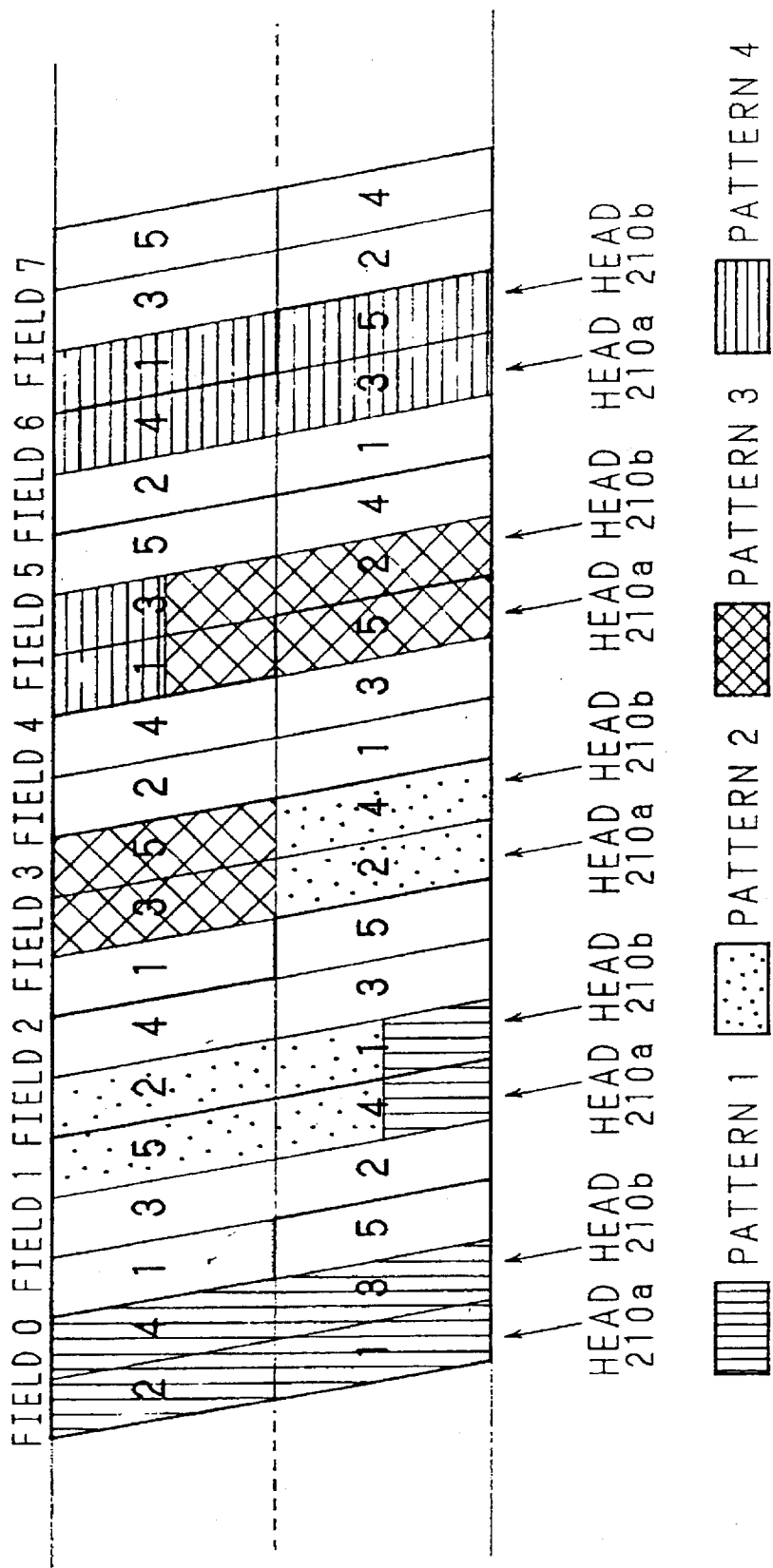
FIG. 20 is a diagram showing the head scanning trace in double speed search of the conventional digital VTR.

Also, same as the prior art, the relation between the segment and screen is as shown in FIG. 19 where the lower half of the segment corresponds to the left screen, and the upper half of the segment corresponds to the right screen.

Figure 55:
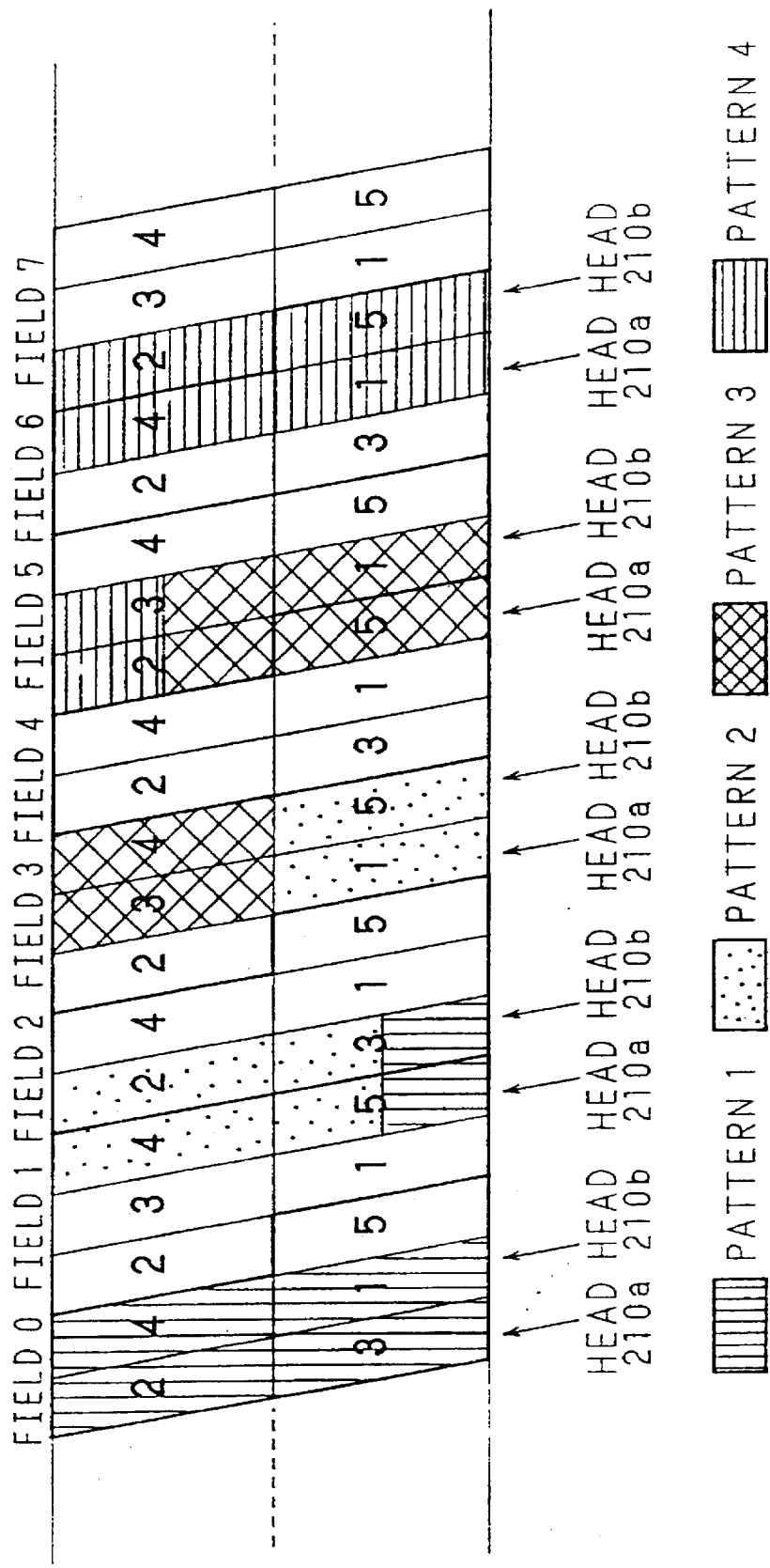
FIG. 55 is a diagram showing a head scanning trace in double speed search in Embodiments 23 and 24 of the invention.

FIG. 55 shows the head scanning trace in case of double speed search on the magnetic tape on which video data is recorded. In normal speed reproduction, the data of one field is obtained from 2.5 tracks, and it is also the same in fast or slow speed reproduction.

In case of double speed search, same as in the prior art, the video data of one field, that is, the video data of 2.5 tracks is obtained by four patterns shown as hatched patterns 1 through 4 in FIG. 55. From the field 0 to the field 7, the four patterns are repeated, and the double speed search will be explained below referring to this basic unit of 4 patterns per 8 fields.

In the first place, referring to the pattern 1 as an example, the video data of 2.5 tracks comprises the whole data of the segments 3, 2, 1, 4 in the field 0, the lower half data of the segment 5 in the field 1, and the lower half data of the segment 3 in the field 2.

At this time, the data of the segment 3 in the field 0 and the data of the segment 3 in the field 2 overlap in the lower half of the segment in the pattern 1, that is, the data overlap in the left screen as shown in FIG. 19.

Therefore, the formerly reproduced data by the magnetic heads 210a, 21b of the segment 3 in the field 0 corresponding to the left screen is replaced in the reproducing processor 211 by the data of the segment 3 in the field 2 which is reproduced later by the magnetic heads 210a, 210b.

Similarly, in the patterns 2 through 4, the segment data in the hatched scanning trace is detected as screen data of one field.

Thus, the digital signals in one field from the pattern 1 to the pattern 4 are returned to the initial segment orders by the de-shuffling circuit 221 as shown in FIG. 49, and outputted to the demodulator 12 to be demodulated into the original digital signals. An error is detected and corrected by the error correction decoder 13, and the compressed codes are returned to the original digital video signals by the efficient decoder 214. The restored digital video signals are converted to analog signals by the D/A converter 15, and outputted through the output terminal 16 as double speed search picture data.

FIG. 56 shows data of which field is reproduced on the both sides of the screen in the patterns 1 through 4. The numbers in the diagram refer to the field numbers, and the X mark indicates that the corresponding segment is not reproduced in one pattern.

As shown in FIG. 56, the X-marked portion data fixedly appears on the screen as an error pattern in double speed search since four patterns from 1 to 4 are repeated, but the number of X-marks decreases as compared with the double speed search on the magnetic tape with the conventional recording format as shown in FIG. 21.

Therefore, the error patterns fixedly appear on the reproduced screen decrease, and the picture quality by the double speed search enhances.

[Embodiment 24]

The twenty-fourth embodiment will be described. In the digital VTR of this embodiment, the recording system and ordinary reproducing operation are described in the first place.

Figure 57:
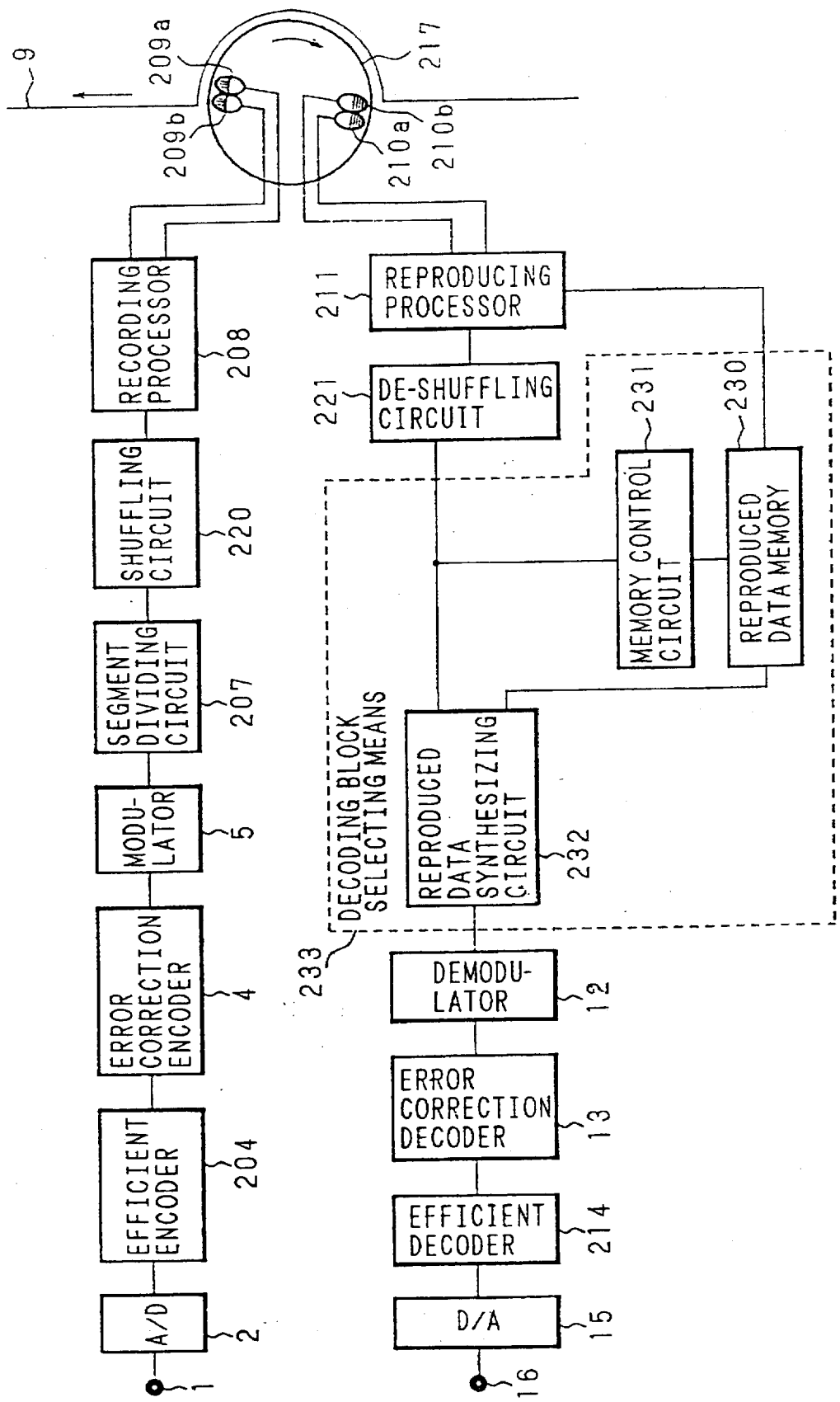
FIG. 57 is a block diagram of recording and reproducing systems in Embodiment 24 of the digital VTR of the invention.

FIG. 57 is a block diagram of a recording system and a reproducing system of the digital VTR of this embodiment. The parts same as those in Embodiment 23 shown in FIG. 48 are denoted by the same reference numerals and are not explained herein. In FIG. 57, numeral 230 denotes a reproduced data memory for temporarily storing all data produced from the magnetic heads 210a and 210b, 231 is a memory control circuit for controlling the operation of the reproduced data memory 230, and 232 designates a reproduced data synthesizing circuit for synthesizing the outputs from the de-shuffling circuit 221 and from the reproduced data memory 230. The memory control circuit 231, reproduced data memory 230, and reproduced data synthesizing circuit 232 operate as decoding block selecting means 233.

In FIG. 57, the operation of the recording system will be described. Same as in the prior art, the video signal inputted through the input terminal 1 is converted into the digital video signal in the A/D converter 2, and outputted to the efficient encoder 204. In the efficient encoder 204, the data is compressed by making use of the correlation of the video data. The output of the efficient encoder 204 is fed into the error correction encoder 4, and a check for correcting transmission error in recording and reproduction is added. The data added with the check is supplied into the modulator 5 to be modulated into the recording signal suited to the magnetic head and magnetic tape, and the recording signals of one field are divided into five segments, same as in the prior art, in the segment dividing circuit 207.

The recording signals of one field divided into seven segments are fed into the shuffling circuit 220.

In the shuffling circuit 220, as shown in FIG. 49, for example, the order of the segments in one field is exchanged.

The recording signals exchanged in the order of segments are divided into two channels by the recording processor 208, and recorded on the magnetic tape 9 as shown in FIG. 50 by the recording heads 209a and 209b.

In FIG. 51, taking an example of scanning [1] as an example, data of segment 3 and then segment 2 are sequentially recorded in one track by the recording head 209a. Data of segment 1 and then segment 4 are sequentially recorded in one track by the recording head 209b.

In the same manner, from the scanning pattern [2] to the scanning pattern [5], data are recorded on the magnetic tape 9 by the recording heads 209a and 209b, and thereafter the operation of scanning [1] to scanning [5] is repeated.

The operation of the reproducing system will be described. The reproducing heads 210a and 210b are mounted on the rotary drum 217 same as in the prior art, and as the rotary drum 217 rotates, the reproducing heads 210a and 210b also rotate, and the track is scanned at the same time, and the reproduced signals are supplied into the reproducing processor 211.

Referring also to scanning [1] in FIG. 51, data of segment 3 and then segment 2 are sequentially reproduced by the reproducing head 210a. Data of segment 1 and then segment 4 are reproduced sequentially by the reproducing head 210b.

In the reproducing processor 211, the reproduced data is synthesized into digital signals for one field, and the segments of each field are returned to the original order as shown in FIG. 49 in the de-shuffling circuit 221.

The data outputted from the de-shuffling circuit 221 is fed into the reproduced data synthesizing circuit 232, which outputs the data intact in case of ordinary reproduction, and synthesizes with the output data from the reproduced data memory 230 in case of double speed search.

The data outputted from the reproduced data synthesizing circuit 232 is demodulated in the demodulator 12 into the original digital signal, and the error is detected and corrected in the error correction decoder 13, and the compressed code is decoded into the original digital video signal in the efficient decoder 214. The decoded digital video signal is converted into analog video signal in the D/A converter 15, and outputted through the output terminal 16.

In this digital VTR, the double speed search operation will be described in reference to FIGS. 57, 58(a)–(c), and 69. In the reproducing processor 211, the digital signals of one field from the reproducing heads 210a and 210b are synthesized same as in Embodiment 23, and are outputted to the de-shuffling circuit 221, and all data reproduced from the reproducing heads 210a and 210b are outputted to the reproduced data memory 230.

In the reproduced data memory 230, as shown in FIG. 58(a), all reproduced data is stored. By the control signal from the memory control circuit 231, necessary data is outputted to the reproduced data synthesizing circuit 232 at necessary timing.

As shown in FIG. 58(b), the data outputted from the de-shuffling circuit 221 is simultaneously outputted to the reproduced data synthesizing circuit 232, and necessary parts are synthesized as shown in FIG. 58(c).

Taking pattern 1 as an example, in FIG. 58(b), for the left screen of segment 3, field 2 is selected, but in order to obtain a natural image in terms of the time, it is evidently better to produce the left screen of segment 3 of field 0 reproduced first onto the screen.

Therefore, as shown in FIG. 58(a), the data of the left screen of segment 3 of field 0 stored in the reproduced data memory 230 reproduced first is outputted by the control signal from the memory control circuit 231, and is replaced with the data of the left screen of segment 3 of field 2 in the reproduced data synthesizing circuit 232.

Referring also to pattern 1, as shown in FIG. 58(b), the data of the right screen of segment 5 is missing. In the double speed search, pattern 1 through pattern 4 are repeated cyclically, and the data of the right screen of segment 5 of pattern 4 of one cycle before is inserted and outputted on the screen.

Therefore, the data of the right screen of segment 5 of pattern 4 as the data of one cycle before stored in the reproduced data memory 230 as shown in FIG. 58(a) is outputted by the control signal from the memory control circuit 231, and inserted into the part of the right screen of segment 5 in pattern 1 in the reproduced data synthesizing circuit 232.

In this way, the screen from pattern 1 to pattern 4 is synthesized in the reproduced data synthesizing circuit 232 as shown in FIG. 58(c).

Thus, the digital signals in one field from pattern 1 to pattern 4 are outputted into the demodulator 12, and the segments in each field shown in FIG. 49 are returned to the original order in the de-shuffling circuit 221, to be demodulated into original digital signals. In the error correction decoder 13, the error is detected and corrected, and the compressed codes are decoded into the original digital video signals in the efficient decoder 214. The restored digital video signals are converted into analog video signals in the D/A converter 15. Finally the data is outputted as a double speed search picture through the output terminal 16.

FIG. 59 is an example of setting, in the case of a double speed search, the reference fields for the four patterns, and expressing the difference of the field of reproduced segments from the reference field by the number of fields, in which whether a natural image in terms of time is reproduced or not is judged.

As compared with the prior art shown in FIG. 22, there are no X-marks or parts failing to be reproduced, and when regarding the reproduced image from each of the patterns 1 through 4 as a whole, it is possible to reproduce the image so that the time intervals are nearly equal, and the time variations (field differences) between segments are minimum in the individual reproduced screens. In other words, more natural speed search pictures can be composed and reproduced.

[Embodiment 25]

Concerning sorting and configuration of the segments, another embodiment will be described below. In Embodiment 24 shown in FIG. 59, segments 1, 3, 4 are relatively stable in time, but segments 2 and 5 are known to be slightly inferior in stability, concerning the continuity of reproduced image because there are some portions of changing from 0 to −2 to +1.

Accordingly, in double speed search, the portions disposed in segments 2 and 5 are supposed to be relatively hard to watch as compared with other parts. Hence, by selecting the position less obvious in reproduction for the image position to be disposed in segments 2 and 5, it is possible to improve the quality of double speed search picture. An example of actual configuration by this concept will be explained below.

Figure 60:
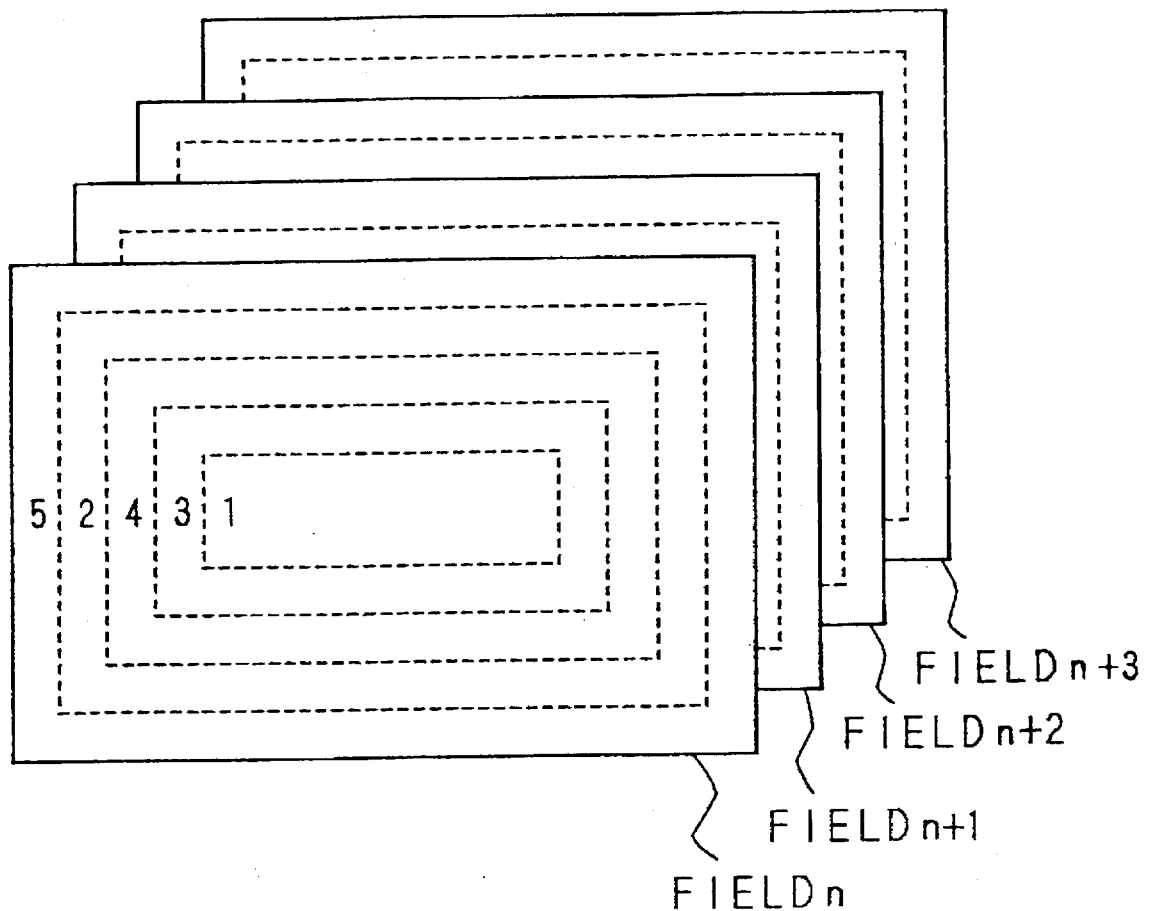
FIG. 60 is a conceptual diagram showing a method of recording on a magnetic tape by dividing video signals in one field into five segments in Embodiment 25 of the invention.
Figure 61:
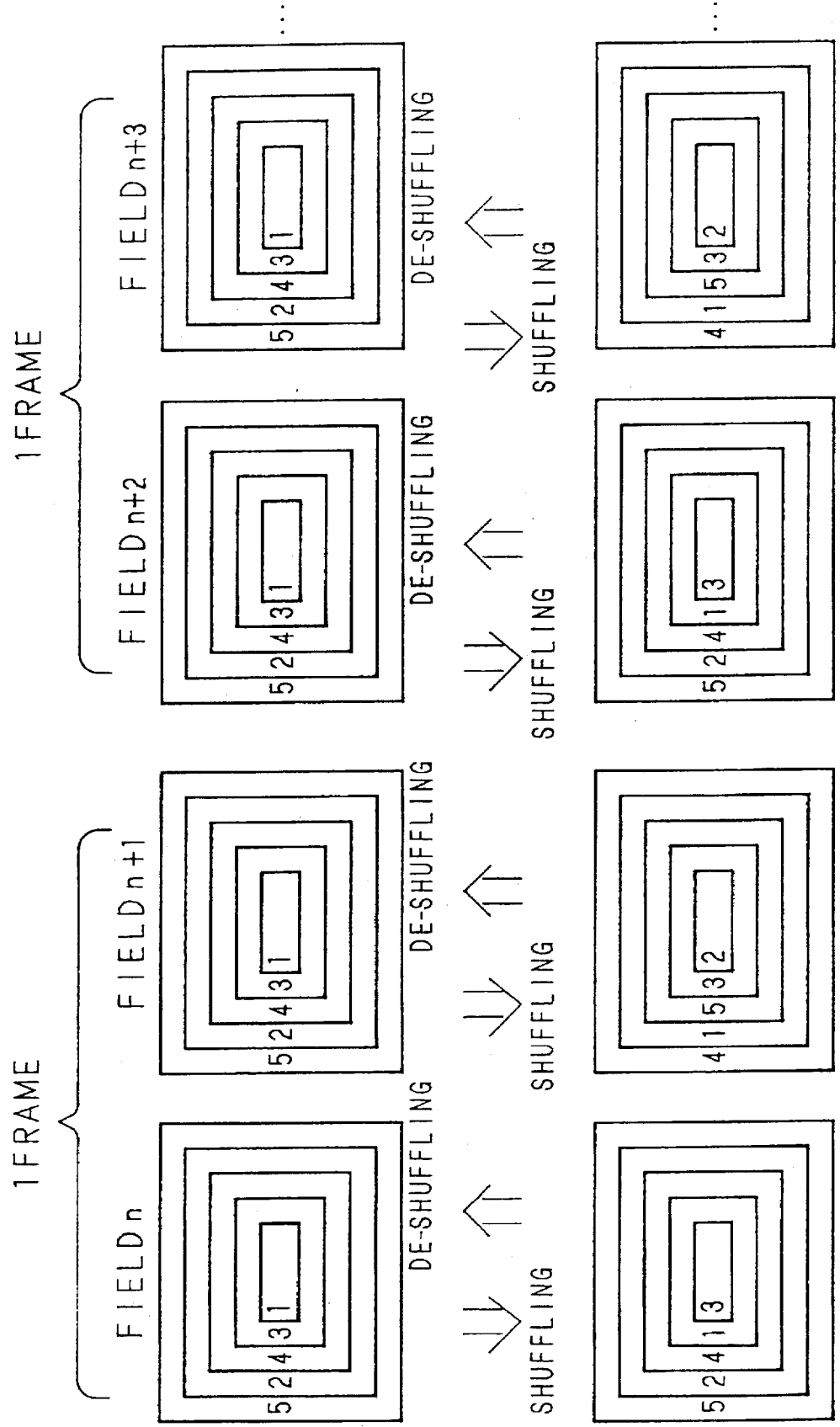
FIG. 61 is a conceptual diagram of shuffling and deshuffling in Embodiment 25 of the invention.

As shown in FIG. 60, for example, the video signals of one field are divided into five segments, and shuffled and deshuffled as shown in FIG. 61, and segment 2 and segment 5 which are inferior to other parts in continuity of reproduced image are disposed in the marginal area of the screen. This marginal area of the screen is visually inconspicuous, so that the double speed search picture may be further improved.

In the explanation of the foregoing embodiments, the double speed search will be explained as an example of special reproduction speed, but not limited to double speed, and it is evident that the same effects are brought about at other arbitrary speeds as well.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds thereof are therefore intended to be embraced by the claims.

What is claimed is:

1. A method of storing digital video data arranged in video data portions onto a video recording medium to facilitate seaming during recording comprising the steps of:
   a) dividing each video data portion into a peripheral data portion and a central data portion, said central data portion including more data than said peripheral data portion, said peripheral data portion representing video data displayed in a peripheral area of a display screen, and said central data portion representing video data displayed in a central area of said display screen; and
   b) storing each divided video data portion on a plurality of consecutive tracks including a pair of edge tracks on the video recording medium, said central data portion for each divided video data portion being stored continuously so that said central data portion is uninterrupted by said peripheral data portion.

2. The method of claim 1, wherein said step b) stores only said peripheral data portion on at least one of said pair of edge tracks.

3. The method of claim 2, wherein said step b) stores said peripheral data on both of said pair of edge tracks.

4. The method of claim 3, wherein said video data portion is a frame having a first field and a second field, and said step b) stores said peripheral data portion of said first field on a first one of said pair of edge tracks and stores said peripheral data portion of said second field on a second one of said pair of edge tracks.

5. The method of claim 1, wherein said video data portion is a field or frame.

6. The method of claim 1, wherein seaming includes producing seams by insert and assembly editing.

7. The method of claim 1, wherein said video recording medium is a video tape.

8. The method of claim 1, wherein said step a) includes band compression coding each video data portion.

9. The method of claim 8, wherein said band compression coding includes DCT and variable-length coding.

10. A method of seaming digital first and second video data sections recorded onto a video recording medium, said first and second video data sections each including at least one video data portion having a pair of video data portion edges, said method comprising the steps of:
    a) dividing each video data portion into a peripheral data portion and a central data portion, said central data portion including more data than said peripheral data portion, said peripheral data portion representing video data displayed in a peripheral area of a display screen, and said central data portion representing video data displayed in a central area of said display screen; and
    b) storing each divided video data portion on a plurality of consecutive tracks including a pair of edge tracks on the video recording medium, said central data portion for each divided video data portion being stored continuously so that said central data portion is uninterrupted by said peripheral data portion, said step b) including,
       i) recording said first video data section on said video recording medium, and
       ii) recording said second video data section on said video recording medium with the edges of said video data portions of said second video data section being in substantial alignment with the edges of said video data portions of said first video data section at a seam between said first and second video data sections.

11. The method of claim 10, wherein in said step b) ii), during editing, video data portions of said second video data section are recorded over video data portions of said first data section, and said step b) ii) does not record a final track of a final video data portion of said second video data section.

12. The method of claim 11, wherein said step b) stores only said peripheral data portion on at least one of said pair of edge tracks.

13. The method of claim 12, wherein said step b) stores said peripheral data on both of said pair of edge tracks.

14. The method of claim 13, wherein said video data portion is a frame having a first field and a second field, and said step b) stores said peripheral data portion of said first field on a first one of said pair of edge tracks and stores said peripheral data portion of said second field on a second one of said pair of edge tracks.

15. The method of claim 11, wherein said video data portion is a field or frame.

16. The method of claim 11, wherein said video recording medium is a video tape.

17. The method of claim 11, wherein said step a) includes band compression coding each video data portion.

18. The method of claim 17, wherein said band compression coding includes DCT and variable-length coding.

19. The method of claim 10, wherein said step b) stores only said peripheral data portion on at least one of said pair of edge tracks.

20. The method of claim 10, wherein said step b) stores said peripheral data on both of said pair of edge tracks.

21. An apparatus for storing digital video data arranged in video data portions onto a video recording medium to facilitate seaming during recording comprising:

a data divider dividing each video data portion into a peripheral data portion and a central data portion, said central data portion including more data than said peripheral data portion, said peripheral data portion representing video data displayed in a peripheral area of a display screen, and said central data portion representing video data displayed in a central area of said display screen; and a recording circuit storing each divided video data portion on a plurality of consecutive tracks including a pair of edge tracks on the video recording medium, said central data portion for each divided video data portion being stored continuously so that said central data portion is uninterrupted by said peripheral data portion.

22. The apparatus of claim 21, wherein said recording circuit stores only said peripheral data portion on at least one of said pair of edge tracks.

23. The apparatus of claim 22, wherein said recording circuit stores said peripheral data on both of said pair of edge tracks.

24. The apparatus of claim 23, wherein said video data portion is a frame having a first field and a second field, and said recording circuit stores said peripheral data portion of said first field on a first one of said pair of edge tracks and stores said peripheral data portion of said second field on a second one of said pair of edge tracks.

25. The apparatus of claim 21, wherein said video data portion is a field or frame.

26. The apparatus of claim 21, wherein seaming includes producing seams by insert and assembly editing.

27. The apparatus of claim 21, wherein said video recording medium is a video tape.

28. The apparatus of claim 21, wherein said data divider includes an encoder performing band compression coding on each video data portion.

29. The apparatus of claim 28, wherein said encoder includes a DCT circuit and variable-length encoder.

30. An apparatus for seaming digital first and second video data sections recorded onto a video recording medium, said first and second video data sections each including at least one video data portion having a pair of video data portion edges, said apparatus comprising:

a data divider dividing each video data portion into a peripheral data portion and a central data portion, said central data portion including more data than said peripheral data portion, said peripheral data portion representing video data displayed in a peripheral area of a display screen, and said central data portion representing video data displayed in a central area of said display screen; and a recording circuit storing each divided video data portion on a plurality of consecutive tracks including a pair of edge tracks on the video recording medium, said central data portion for each divided video data portion being stored continuously so that said central data portion is uninterrupted by said peripheral data portion;

said recording circuit recording said first video data section on said video recording medium, and recording said second video data section on said video recording medium with the edges of said video data portions of said second video data section being in substantial alignment with the edges of said video data portions of said first video data section at a seam between said first and second video data sections.

31. The apparatus of claim 30, wherein said recording circuit, during editing, stores video data portions of said second video data section over video data portions of said first data section, and does not record a final track of a final video data portion of said second video data section.

32. The apparatus of claim 31, wherein said recording circuit stores only said peripheral data portion on at least one of said pair of edge tracks.

33. The apparatus of claim 32, wherein said recording circuit stores said peripheral data on both of said pair of edge tracks.

34. The apparatus of claim 33, wherein said video data portion is a frame having a first field and a second field, and said recording circuit stores said peripheral data portion of said first field on a first one of said pair of edge tracks and stores said peripheral data portion of said second field on a second one of said pair of edge tracks.

35. The apparatus of claim 31, wherein said video data portion is a field or frame.

36. The apparatus of claim 31, wherein said video recording medium is a video tape.

37. The apparatus of claim 31, wherein said data divider includes an encoder performing band compression coding on each video data portion.

38. The apparatus of claim 37, wherein encoder includes a DCT circuit and variable-length encoder.

39. The apparatus of claim 30, wherein said recording circuit stores only said peripheral data portion on at least one of said pair of edge tracks.

40. The apparatus of claim 30, wherein said recording circuit stores said peripheral data on both of said pair of edge tracks.

41. The apparatus of claim 31, wherein said recording circuit detects a first track of a video data portion of said first video data section when an editing operation begins, and records said video data portions of said second video data section beginning at said first track.

42. A digital video signal recording and reproducing apparatus which records video signals onto S tracks of a recording medium, where S is greater than or equal to three, said apparatus comprising:

data dividing means for dividing one frame or one field of said video signals into n blocks;

data amount controlling means for forming block groups of a fixed amount of data from said n blocks by extracting a plurality of said n blocks in forming each block group;

data extracting means for extracting (2n/S) of said n blocks from one of said block groups, said extracted blocks representing one of an upper and/or lower peripheral portion and a right and/or left peripheral portion of a display screen;

halving means for dividing said extracted (2n/S) blocks into two recording block groups of (n/S) blocks;

rearranging means for rearranging data in each of said recording block groups in a fixed order; and recording format generating means for controlling said recording of said video signal so that said rearranged recording block groups are recorded on a first track and an S-th track of said S tracks, and for controlling said recording of said video signals so that data in a remaining (n–2n/S) blocks of said n blocks not extracted by said data extracting means are continuously recorded from a second track to an (S-1)-th track of said S tracks after rearranging said remaining (n–2n/s) blocks in a fixed order.

43. The apparatus of claim 42, wherein said recording format generating means controls a start of recording edited data in assemble editing or insert editing from a track storing one of said rearranged recording block groups.

44. A method of recording and reproducing digital video signals onto S tracks of a recording medium, where S is greater than or equal to three, said method comprising:

a) dividing one frame or one field of said video signals into n blocks;

b) forming block groups of a fixed amount of data from said n blocks by extracting a plurality of said n blocks in forming each block group;

c) extracting (2n/S) of said n blocks from one of said block groups, said extracted blocks representing one of an upper and/or a lower peripheral portion and a right and/or left peripheral portion of a display screen;

d) dividing said extracted (2n/S) blocks into two recording block groups of (n/S) blocks;

e) rearranging data in each of said recording block groups in a fixed order;

f) recording said video signal so that said rearranged recording block groups are recorded on a first track and an S-th track of said S tracks, and a remaining (n–2n/S) blocks of said n blocks not extracted by said data extracting means are continuously recorded from a second track to an (S–1)-th track of said S tracks after rearranging said remaining (n–2n/s) blocks in a fixed order.

45. The method of claim 44, wherein said f) includes step f1) starting to record edited data, in assemble editing or insert editing, from a track storing one of said rearranged recording block groups.

* * * * *